United States Patent
Nagaraja et al.

(10) Patent No.: US 10,027,456 B2
(45) Date of Patent: Jul. 17, 2018

(54) BEAM SWITCHING AND RECOVERY

(71) Applicant: QUALCOMM Incorporated, San Diego, CA (US)

(72) Inventors: Sumeeth Nagaraja, San Diego, CA (US); Tao Luo, San Diego, CA (US); Ajay Gupta, San Diego, CA (US); Makesh Pravin John Wilson, San Diego, CA (US); Kaushik Chakraborty, San Diego, CA (US); Sony Akkarakaran, Poway, CA (US); Vinod Viswanatha Menon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/705,126

(22) Filed: Sep. 14, 2017

(65) Prior Publication Data
US 2018/0083753 A1    Mar. 22, 2018

Related U.S. Application Data

(60) Provisional application No. 62/396,082, filed on Sep. 16, 2016, provisional application No. 62/401,814, (Continued)

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0617* (2013.01); *H04B 7/0695* (2013.01);
(Continued)

(58) Field of Classification Search
CPC ..... H04L 5/0048; H04L 5/0055; H04L 5/006; H04W 88/02; H04W 88/08
See application file for complete search history.

(56) References Cited

U.S. PATENT DOCUMENTS

| 2004/0204114 | A1* | 10/2004 | Brennan ............... H04B 7/04 |
| | | | 455/562.1 |
| 2005/0215261 | A1 | 9/2005 | Cha et al. |

(Continued)

FOREIGN PATENT DOCUMENTS

| CN | 105704769 A | 6/2016 |
| WO | 2016127403 A1 | 8/2016 |
| WO | 2016198124 A1 | 12/2016 |

OTHER PUBLICATIONS

International Search Report and Written Opinion—PCT/US2017/051867—ISA/EPO—dated Nov. 22, 2017.
(Continued)

*Primary Examiner* — Mohammad S Anwar
(74) *Attorney, Agent, or Firm* — Clint R. Morin; Arent Fox

(57) ABSTRACT

Apparatuses and methods of beam switching are presented. A beam switch message (BSM) is transmitted to a second device via a first beam set. The BSM includes a command to switch from communication via the first beam set to communication via a second beam set at a switch time. It is determined whether a response message is received from the second device via the first beam set, the response message indicating that the second device received the BSM. A communication is sent to the second device via the second beam set after the switch time when the response message is unreceived.

20 Claims, 37 Drawing Sheets

Related U.S. Application Data filed on Sep. 29, 2016, provisional application No. 62/504,412, filed on May 10, 2017, provisional application No. 62/504,428, filed on May 10, 2017.

(51) Int. Cl.
  *H04W 88/02* (2009.01)
  *H04W 88/08* (2009.01)
(52) U.S. Cl.
  CPC ............ *H04L 5/006* (2013.01); *H04L 5/0055* (2013.01); *H04W 88/02* (2013.01); *H04W 88/08* (2013.01)

(56) References Cited

U.S. PATENT DOCUMENTS

| | | |
|---|---|---|
| 2010/0075705 A1 | 3/2010 | Van et al. |
| 2013/0121185 A1 | 5/2013 | Li et al. |
| 2013/0155847 A1 | 6/2013 | Li et al. |
| 2013/0279356 A1 | 10/2013 | Park et al. |
| 2013/0286960 A1 | 10/2013 | Li et al. |
| 2014/0307654 A1 | 10/2014 | Kim et al. |
| 2015/0110074 A1 | 4/2015 | Yamasaki et al. |
| 2015/0249929 A1 | 9/2015 | Irie et al. |
| 2016/0021548 A1 | 1/2016 | Raghavan et al. |
| 2016/0183234 A1 | 6/2016 | Sung et al. |
| 2016/0353510 A1 | 12/2016 | Zhang et al. |
| 2018/0084440 A1 | 3/2018 | Nagaraja et al. |
| 2018/0084441 A1 | 3/2018 | Nagaraja et al. |

OTHER PUBLICATIONS

Cisco., et al., "Verizon 5G TF; Air Interface Working Group; Verizon 5th Generation Radio Access; Physical Layer procedures (Release 1)," Jun. 29, 2016, pp. 1-43, XP055318107, Retrieved from the Internet: URL:http://www.5gtf.org/V5G_213_v1p0.pdf [retrived on Nov. 10, 2016].

* cited by examiner

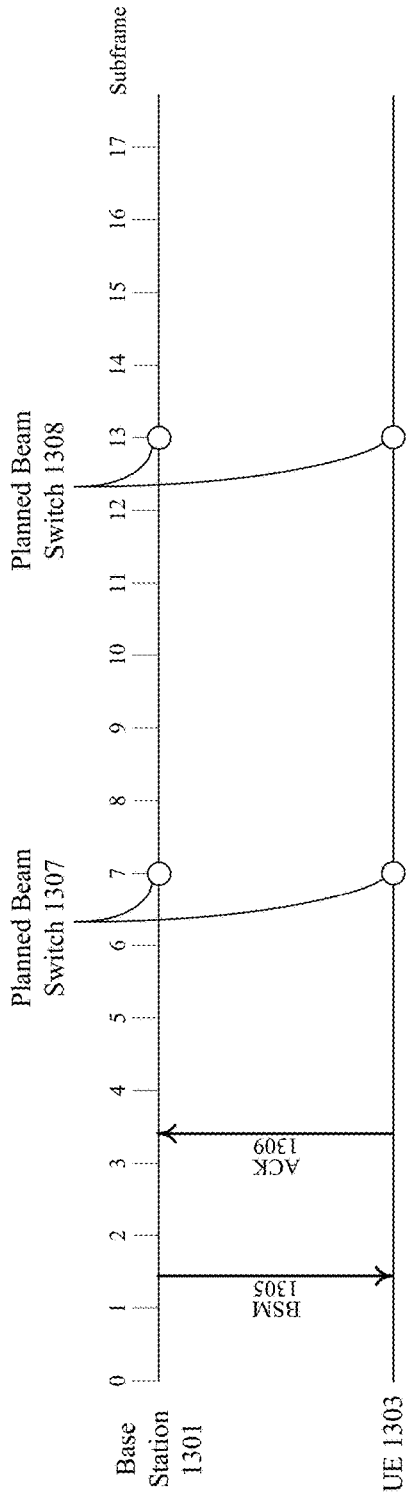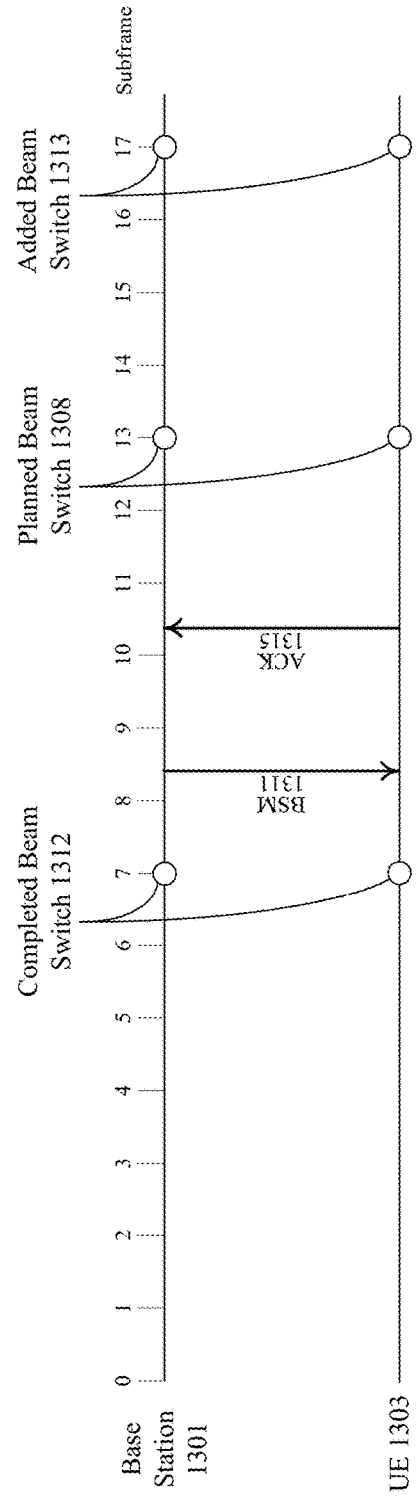

BEAM SWITCHING AND RECOVERY

CROSS-REFERENCE TO RELATED APPLICATIONS

This application claims the benefit of U.S. Provisional Application Ser. No. 62/396,082, entitled "FAST BEAM RECOVERY" and filed on Sep. 16, 2016, the benefit of U.S. Provisional Application Ser. No. 62/401,814, entitled "BEAM SWITCH MESSAGE" and filed on Sep. 29, 2016, the benefit of U.S. Provisional Application Ser. No. 62/504,412, entitled "BEAM SWITCHING AND RECOVERY" and filed on May 10, 2017, and the benefit of U.S. Provisional Application Ser. No. 62/504,428, entitled "BEAM SWITCHING WITH RESET STATES" and filed on May 10, 2017, each of which is expressly incorporated by reference herein in its entirety.

BACKGROUND

Field

The present disclosure relates generally to communication systems, and more particularly, to apparatuses and methods for beam switching in wireless communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, some wireless communications may utilize different beam pairs from different antenna subarrays at a base station and at a user equipment (UE). The wireless communication may include transmitting and receiving control and data signals. An efficient scheme for the base station and/or the UE to switch beam pairs for wireless communication may improve the overall performance of the wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Beamforming can be used to create a narrow beam pattern between, for example, a base station (e.g., gNB) and a user equipment (e.g., a cell phone) that may enhance link budget and/or signal-to-noise ratio (SNR). Beamforming can offer several benefits, particularly for technologies that can suffer from high path loss, such as millimeter wave (mmW) communication. New techniques such as hybrid beamforming (analog and digital), which are not present in 3G and 4G systems, may be used to further enhance some benefits. In single-beam implementations, beamforming can be used to create a single beam. In multi-beam implementations, multiple beams can be created and used to cover a wider area.

In multi-beam wireless communication (or simply, multi-beam communication), devices communicating via a beam pair may switch to a different beam pair for various reasons. For example, a base station and a UE communicating via a first beam pair may switch to a second beam pair because the UE is moving out of the coverage area of the first beam pair and into the coverage area of the second beam pair. The condition and environment may change such that communication via a different beam pair between the base station and the UE would be more advantageous. However, to be effective, beam switching requires a coordinated effort between the base station and the UE. In some situations, the beam switching may not be so easily confirmed or synchronized.

Apparatuses and methods for beam switching are presented below. The ideas described below may, for example, increase the efficiency of beam switching in various implementations by providing an enhanced form of messaging, may allow faster beam recovery when devices fail to switch beams properly, etc.

In various embodiments, a first device can transmit a beam switch message (BSM) to a second device via a first beam set. The BSM can include a command to switch from communication via the first beam set to communication via a second beam set at a switch time. The first device can determine whether a response message is received from the second device via the first beam set, the response message indicating that the second device received the BSM. The first device can send, to the second device, a communication via the second beam set after the switch time when the response message is unreceived. The sent communication can be, for example, data, control information, or reference signals.

In some cases, the first device can also determine whether a second response message is received from the second device in response to the sent communication and can maintain the second beam set for communication with the second device upon determining that the second response message is received. In some cases, the first device can also send, to the second device, a second communication via the first beam set upon determining that the second response message is unreceived and can determine whether a third response message is received from the second device via the first beam set, the third response message indicating that the second device received the second communication.

The response message can include, for example, a reference signal strength indicator (RSSI), reference signal received power (RSRP), reference signal received quality (RSRQ), an SNR, a signal to interference plus noise ratio (SINR), an acknowledgment (ACK), or a measurement report.

In various embodiments, a first device can monitor for a BSM from a second device via a first beam set. The BSM can include a command to switch from communication via the first beam set to communication via a second beam set at a switch time. The first device can send a response message to the second device when the BSM is received. The first device can monitor for a second communication from the second device via the first beam set when the BSM is unreceived, the second communication via the first beam set being monitored at a second time subsequent to a first time in which a first communication is sent to the first device via the second beam set.

In some cases, when the BSM from the second device is unreceived, the first device can also receive the second communication from the second device via the first beam set can send a second response message via the first beam set to the second device in response to receiving the second communication. In some cases, the first device can also receive the BSM from the second device via the first beam set, switch to the second beam set from the first beam set, receive the first communication from the first device via the second beam set, and send a second response message to the second device in response to receiving the first communication.

In various embodiments, a first device can transmit a beam switch message to a second device via a first beam set. The beam switch message can include a command to switch from communication via the first beam set to communication via a second beam set at a switch time. The first device can monitor for a response message from the second device. The response message can indicate the second device received the beam switch message. The first device can determine whether the response message was received from the second device. The first device can switch to communication via the second beam set at the switch time whether or not the response message was received. For example, switching beam sets whether or not a response message was received may avoid a time-consuming recovery process, particularly if the second device received the beam switch message and switched beam sets.

In various embodiments, a first device can transmit a beam switch message to a second device via a first beam set and can monitor for a response message from the second device. The first device can determine whether the response message was received from the second device, and can switch to communication via the second beam set at the switch time if the response message was received. The first device can determine a switch decision if the response message was not received. The switch decision can be either to continue communication via the first beam set at the switch time or to switch to communication via the second beam set at the switch time. The first device can communicate via the first beam set or the second beam set based on the switch decision. For example, if the first device determines that delivery failure of the beam switch message is more likely than delivery failure of the response message, then the second device is more likely to have remained on the first beam set at the switch time. Therefore, the first device may choose not to switch beam sets at the switch time.

In various embodiments, a first device can transmit a beam switch message to a second device via a first beam set and can switch to communication via the second beam set at the switch time without monitoring prior to the switch time for a response message indicating the second device received the beam switch message. The first device can determine after the switch time if the second device is communicating via the second beam set. In this way, for example, signaling may be reduced because a response process need not be performed. This approach may work well, particularly when the possibility of delivery failure of the beam switch message is low.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 13A-B illustrate another example implementation of a method of wireless communication in accordance with various embodiments.

DETAILED DESCRIPTION

Figure 1:
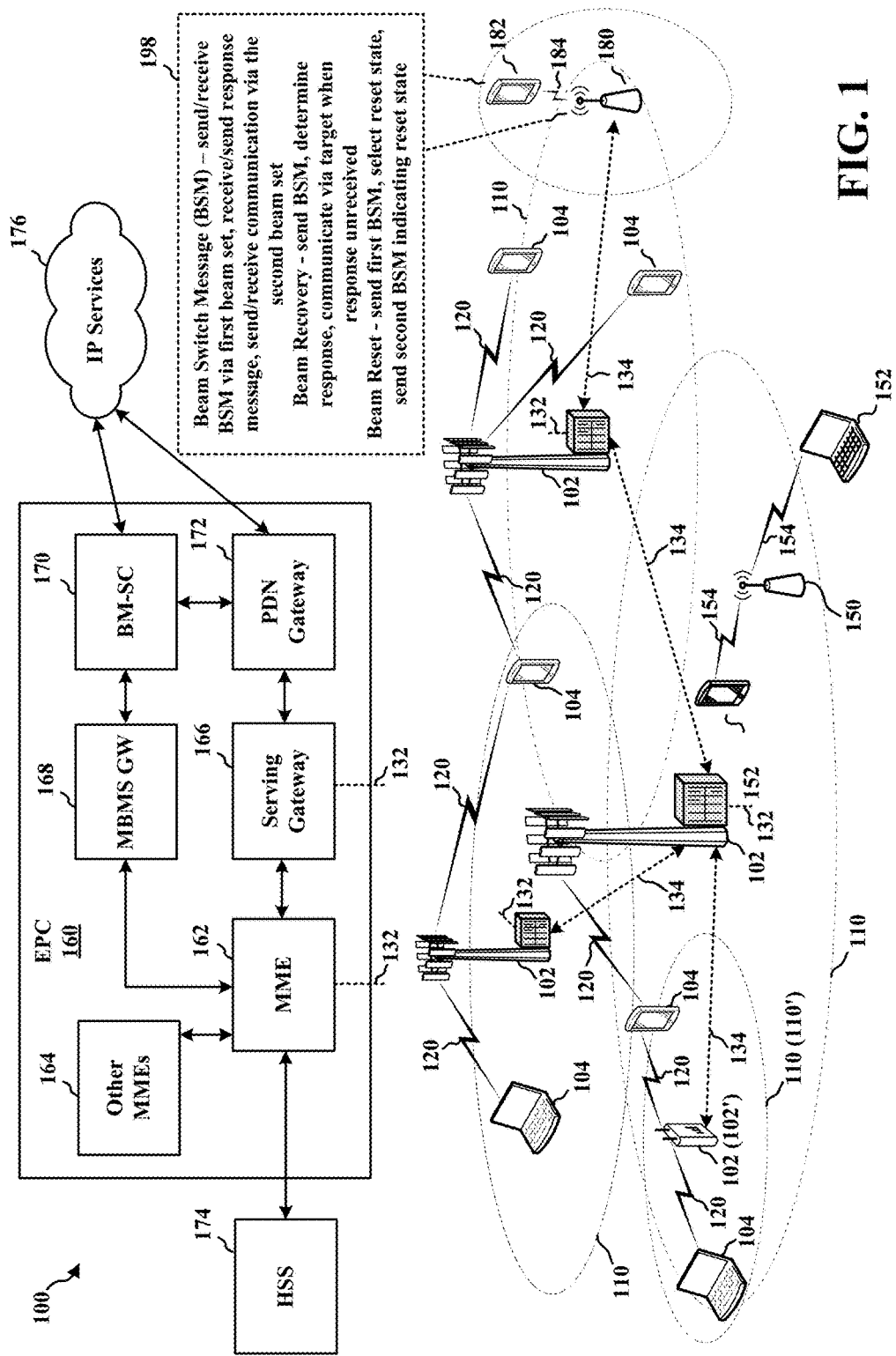
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range. The base station 180 may wirelessly communicate with UE 182 via multiple beams (not shown). The multiple beams of base station 180 may provide communication coverage for the geographic coverage area of base station 180, such that the geographic coverage area may include multiple beams emanating from base station 180. Communication link 184 between base station 180 and UE 182 can be established via a beam set (for example, a beam pair) and may include UL (also referred to as reverse link) transmissions from the UE to the base station and/or DL (also referred to as forward link) transmissions from the base station to the UE. Communication link 184 may be established by beamforming based on, for example, MIMO antenna technology, and may also include spatial multiplexing, and/or transmit diversity.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, eNB, an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, UE 182 and/or base station 180 may be configured to perform beam recovery by, for example, sending a BSM, determining whether a response is received, and communicating via a target beam when a response to the BSM is unreceived, and performing a beam switch reset by, for example, sending a first BSM, selecting a reset state, and sending a second BSM indicating the reset state (198).

Figure 2:
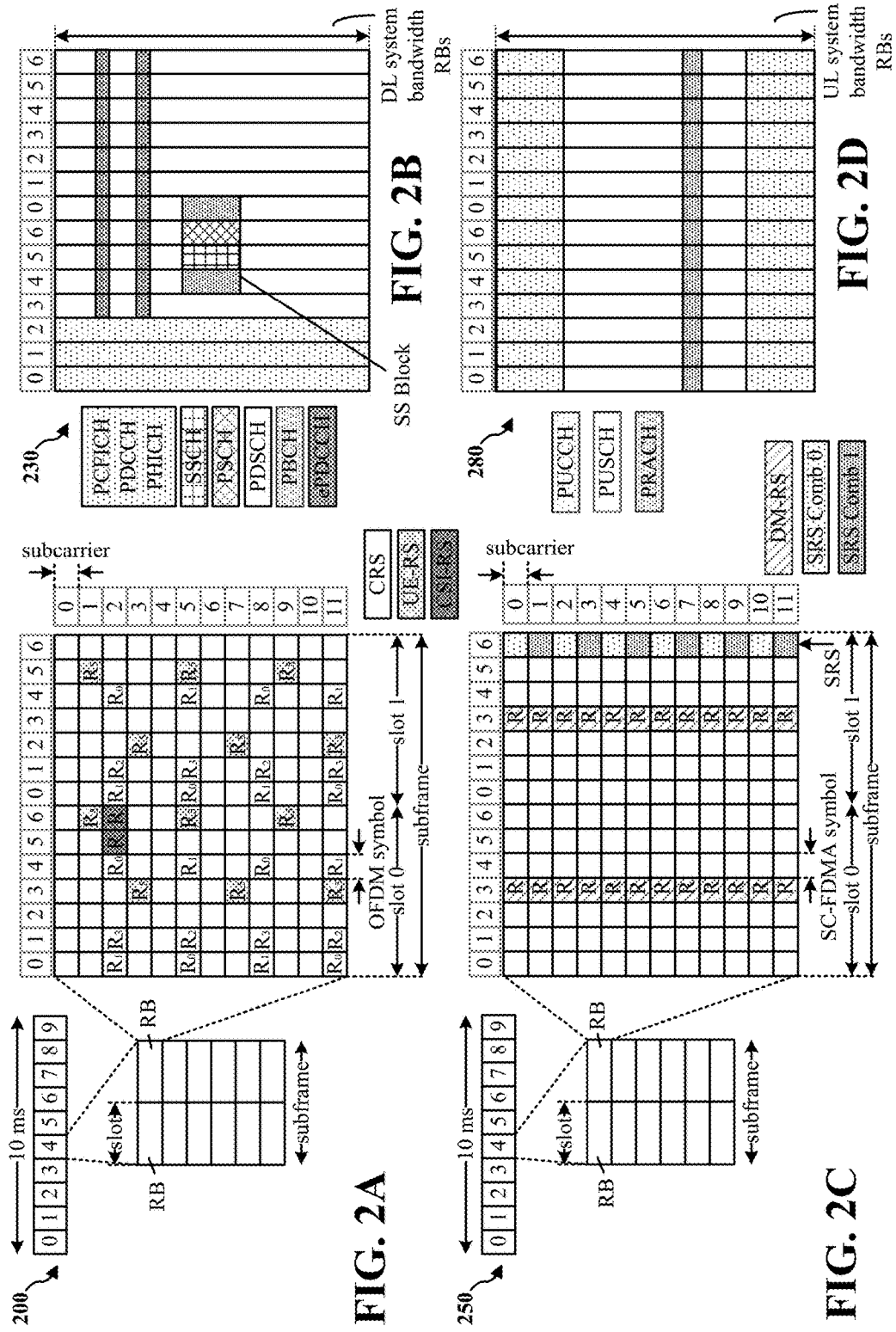
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ ACK/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
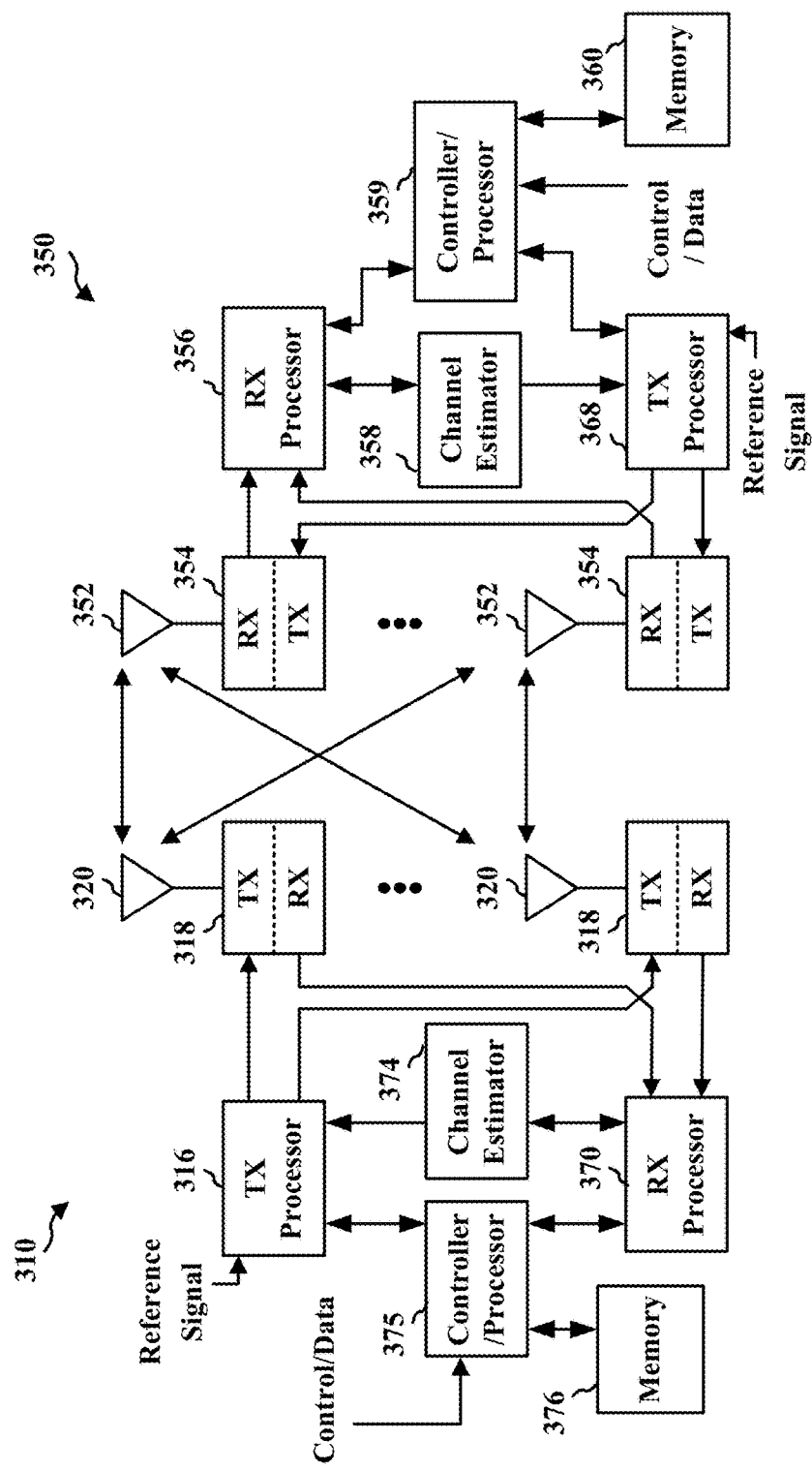
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Base station 310 may wirelessly communicate with UE 350 via multiple beams (not shown). For example, TX processor 316 of base station 310 may control antennas 320 to form a beam directed at UE 350, and RX processor 356 of UE 350 may control antennas 352 to receive communication via a beam directed at base station 310. In other words, a communication link between base station 310 and UE 350 can be established via a beam set (for example, a beam pair), which may include UL transmissions from the UE to the base station and/or DL transmissions from the base station to the UE.

Figure 4:
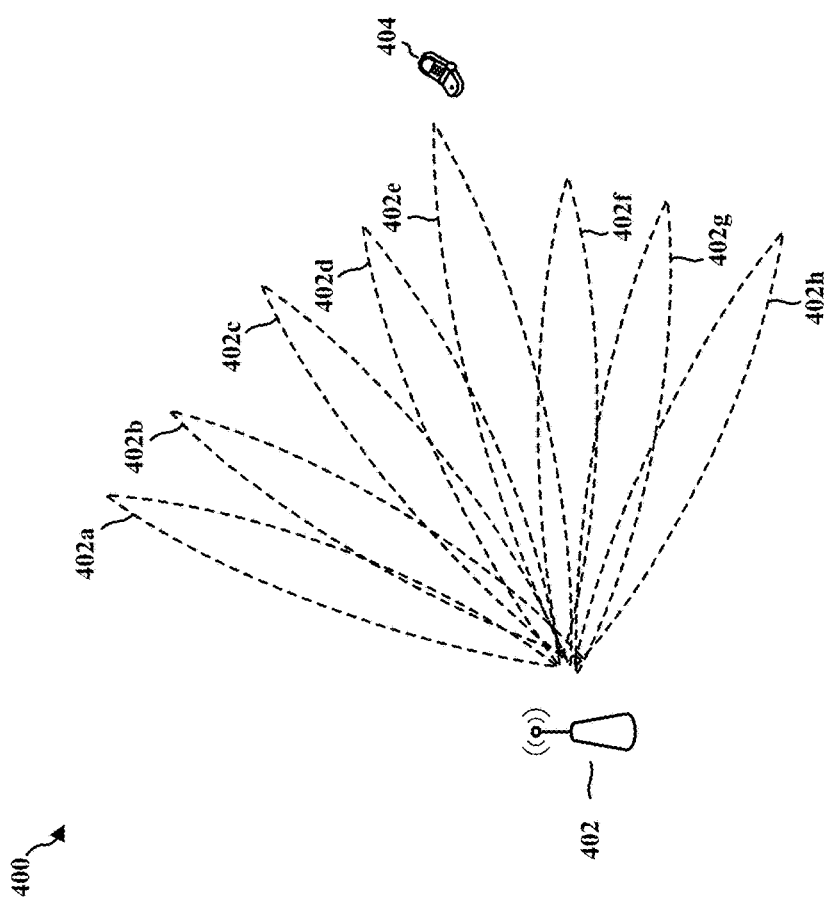
FIG. 4 is a diagram illustrating a base station in communication with a UE.

FIG. 4 is a diagram 400 illustrating multi-beam communication in which a base station 402 is in communication with a UE 404. Referring to FIG. 4, when the UE 404 turns on, the UE 404 searches for a nearby NR network. The UE 404 discovers the base station 402, which belongs to an NR network. The base station 402 transmits an SS block including the PSS, SSS, and the PBCH (including the MIB) periodically in different transmit directions 402a-402h. The UE 404 receives a transmission in transmit direction 402e, including the PSS, SSS, and PBCH. Based on the received SS block, the UE 404 synchronizes to the NR network and camps on a cell associated with the base station 402.

Figure 5:
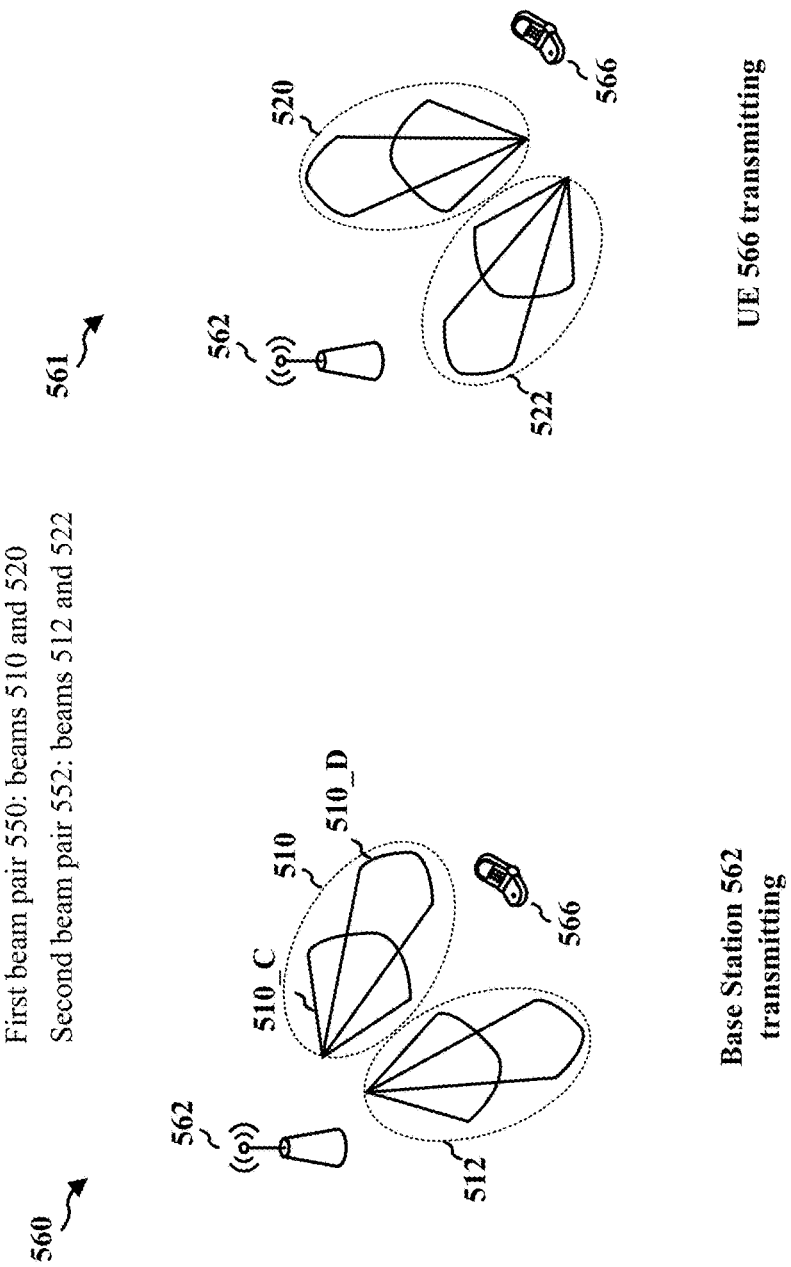
FIG. 5 includes diagrams of communications between a base station and a UE via multiple beams.

FIG. 5 includes diagrams of communications between a base station and a UE via multiple beams. In some examples, diagrams 560 and 561 depict mmW communications between base station 562 and UE 566. The diagram 560 depicts the case where base station 562 (e.g., an example of a base station) transmits to UE 566 via at least one of beam sets 510 and 512, which may be referred to simply as beams 510 and 512. The beams 510/512 may carry the DL/UL signals discussed in the previous sections. The diagram 561 depicts the case where UE 566 transmits to base station 562 via at least one of beams 520 and 522. The beams 520/522 may carry the DL/UL signals discussed in the previous sections. For example, beam 510 of first beam pair 550 and beam 512 of second beam pair 552 carry the DL signals. The beam 520 of first beam pair 550 and beam 522 of second beam 552 carry the UL signals.

Each of beams 510, 512, 520, and 522 may include more than one beam. In this regard, a beam set may include one or more beams. For example, beam 510 may include a beam 510_C to carry control signals and channels and a beam 510_D to carry data signals and channels. In some examples, the beams may be associated. For example, in one case, base station 562 and UE 566 may communicate via beam 510 and beam 520. That is, base station 562 may transmit to UE 566 via beam 510 and receive from UE 566 via beam 520. The beams 510 and 520 are thus associated and may be referred to as a beam pair. For example, beam 510 and associated beam 520 may be referred to as first beam pair 550, and beam 512 and associated beam 522 may be referred to as second beam pair 552.

The base station (e.g., a gNB) 562 and UE 566 may communicate over active beam pairs (e.g., first beam pair 550 and or second beam pair 552). Active beam pairs may be base station 562 and UE 566 beam pairs that carry data and control channels such as PDSCH, PDCCH, PUSCH, and PUCCH. In one aspect, base station 562 may monitor active beam pairs using reported measurements of signals (e.g., reported by UE 566 by the beams from the base station (e.g., the base station can monitor the beams from the UE by measuring such beams directly)) such as measurement reference signal (MRS), CSI-RS, primary synchronization signal and Secondary synchronization signal (SYNC). To do so, base station 562 may send a measurement request, for example, a beam state information request to UE 566. UE 566 may, in response, measure the measurement signals and send a report that contains beam identifications and beam quality for each beam measured. Base station 562 may then signal a beam switch to the UE. The beam switch signal (e.g., message) may contain the target beam identifier (e.g., identify the target beam pair) and/or time to switch base station 562 and UE 566 beam pairs. The time may be indicated in terms of, for example, subframes, slots, or mini-slots (e.g., specifying a subframe, slot, or mini-slot identifier or an offset). In some examples, base station 562 may signal to switch the beam pairs without explicit beam identifiers. For example, the beam switch may be based on an agreement prior to the transmission of the signal to switch the beam pairs. At such a time, both base station 562 and UE 566 can switch beam pairs (e.g., switch from a source first beam pair 550 to target second beam pair 552).

UE 566 may transmit to base station 562 a response message for the beam switch. In some examples, UE 566 may signal the beam switch, and base station 562 may transmit the response message as described above. Where the embodiment provided relates to base station 562 initiating the beam switch (and UE 566 confirms the beam switch), it is understood the example likewise applies to the example in which UE 566 initiates the beam switch (and base station 562 confirms the beam switch).

Figure 6:
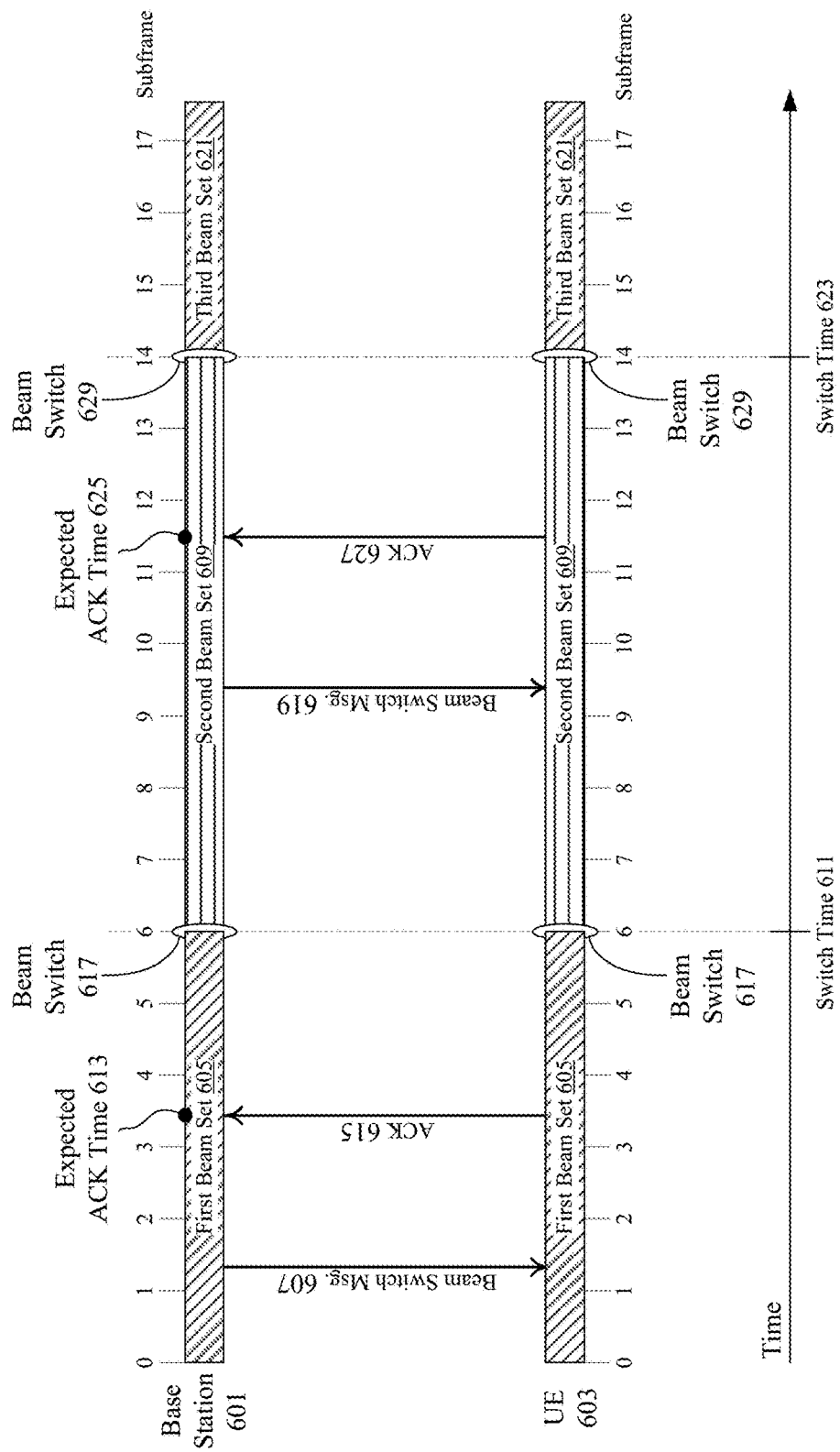
FIG. 6 illustrates an example of single-switch beam switch messages according to various embodiments.

FIG. 6 illustrates an example of single-switch beam switch messages according to various embodiments. In FIG. 6, a base station 601 is communicating with a UE 603 via a first beam set 605 at subframe 0. The base station 601 and UE 603 may be, for example, base station 562 and UE 566, respectively, in FIG. 5 above. At subframe 1, base station 601 transmits a BSM 607 to UE 603 via first beam set 605. The BSM 607 includes an instruction for UE 603 to switch from communication via first beam set 605 to communication via a second beam set 609 at a switch time 611. The BSM 607 is an example of a single-switch BSM because BSM 607 instructs UE 603 to perform only one beam switch. In this example, base station 601 expects to receive a response message, e.g., an ACK, from the UE at an expected ACK time 613, and therefore, the base station is monitoring for the response message. In various embodiments of the current example and other examples presented herein, a response message may be any indication that a BSM or other signal has been received. For example, a response message may be an ACK, a Received Signal Strength Indicator (RSSI), a SNR, a measurement report, etc., that is in response to a BSM or other signal. Monitoring for a response message may be done actively or passively. For example, a base station may take active measures to monitor, such as tuning to a particular frequency or channel on which the response message is expected. On the other hand, a base station may monitor passively by, for example, merely expecting to receive a response message in the normal course of operation.

UE 603 receives BSM 607 and transmits an ACK 615 for base station 601 to receive at expected ACK time 613. The base station 601 receives ACK 615 at expected ACK time 613, and as a result, base station 601 knows that UE 603 will perform the beam switch. At switch time 611, base station 601 and UE 603 perform a beam switch 617 from first beam set 605 to second beam set 609.

At subframe 9, base station 601 may decide to switch beams again and can transmit a BSM 619 to UE 603 via second beam set 609. The BSM 619 includes an instruction for UE 603 to switch from communication via second beam set 609 to communication via a third beam set 621 at a switch time 623. BSM 619 is another example of a single-switch BSM because BSM 619 instructs UE 603 to perform only one beam switch. The base station 601 monitors for an ACK at expected ACK time 625. UE 603 receives BSM 619 and transmits an ACK 627 for base station 601 to receive at expected ACK time 625. The base station 601 receives ACK 627 at expected ACK time 625, and as a result, base station 601 knows that UE 603 will perform the beam switch. At switch time 623, base station 601 and UE 603 perform a beam switch 629 from second beam set 609 to third beam set 621. Thus, in the example of FIG. 6, BSM 607 and BSM 619 are examples of single-switch BSMs.

Figure 7:
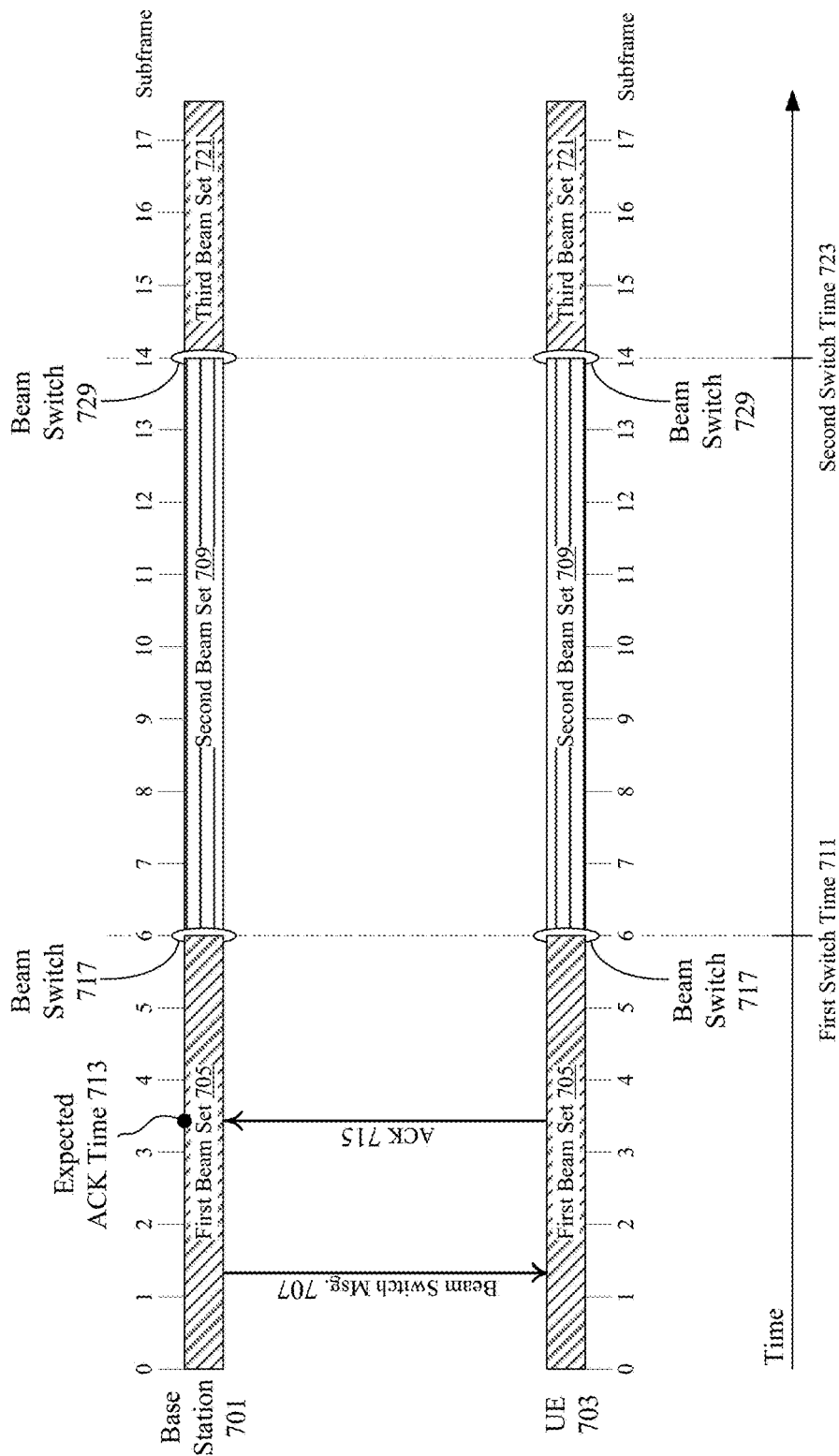
FIG. 7 illustrates an example of multiple-switch BSMs according to various embodiments.

FIG. 7 illustrates an example of multiple-switch BSMs according to various embodiments. In FIG. 7, a base station 701 is communicating with a UE 703 via a first beam set 705 at subframe 0. At subframe 1, base station 701 transmits a BSM 707 to UE 703 via first beam set 705. The BSM 707 includes an instruction for UE 703 to switch from communication via first beam set 705 to communication via a second beam set 709 at a first switch time 711, and to switch from communication via second beam set 709 to communication via a third beam set 721 at a second switch time 723. The BSM 707 is an example of a multiple-switch BSM because BSM 707 instructs UE 703 to perform multiple beam switches. In this example, base station 701 expects to receive a response message, e.g., an ACK, from the UE at an expected ACK time 713, and therefore, the base station is monitoring for the response message.

UE 703 receives BSM 707 and transmits an ACK 715 for base station 701 to receive at expected ACK time 713. The base station 701 receives ACK 715 at expected ACK time 713, and as a result, base station 701 knows that UE 703 will perform the beam switches. At first switch time 711, base station 701 and UE 703 perform a beam switch 717 from first beam set 705 to second beam set 709. At second switch time 723, base station 701 and UE 703 perform a beam switch 729 from second beam set 709 to third beam set 721. Thus, BSM 707 is an example of a multiple-switch BSM because BSM 707 includes instructions to perform multiple beam switches.

In various embodiments, multiple-switch BSMs may be useful. For example, as a comparison of FIGS. 6 and 7 shows, using a multiple-switch BSM to signal multiple beam switches can reduce the amount of signaling by eliminating the need for additional BSMs and ACKs for each beam switch after the first beam switch. Also, by reducing the number of BSMs and ACKs required for multiple beam switches, a multi-switch BSM can reduce the number of instances in which signal failure can occur. Therefore, systems that use multi-switch BSMs may be less susceptible to the effects of signal failure.

Multiple-switch BSMs can be used, for example, when multiple beam switches can be determined prior to transmission of a BSM. For example, in communication systems in which a UE moves through the coverage areas of multiple beam sets in a predictable way, a base station may be able to predict at one time the multiple beam switches will be necessary to stay in communication with the UE. For example, a base station may serve a rail line on which trains travel at a known speed through multiple beam sets of the base station. The base station may know, for example, when a UE traveling on a southbound train reaches the coverage area of the base station, the UE will establish a connection with a first beam set of the base station. The base station may also know that it takes the southbound train a first amount of time to pass through the first beam set and reach a second beam set, and a second amount of time to pass through the second beam set and reach a third beam set, and so on. Therefore, when the base station determines a new UE has established a connection via the first beam set, the base station may predict that a first beam switch from the first beam set to the second beam set should occur after the first amount of time and that a second beam switch from the second beam set to the third beam set should occur after the second amount of time after the first beam switch. Thus, the base station may send a multi-switch BSM to each southbound UEs, for example, immediately after the connection with the first beam set is established. In this way, for example, the base station may be able to reduce significantly the number of BSMs and corresponding ACKs, along with the potential signal errors associated with the multiple BSMs and ACKs.

However, regardless of whether single-switch or multi-switch BSMs are used, signal error can occur. In some examples, a base station does not receive an expected response message from the UE in a timely fashion.

Figure 8:
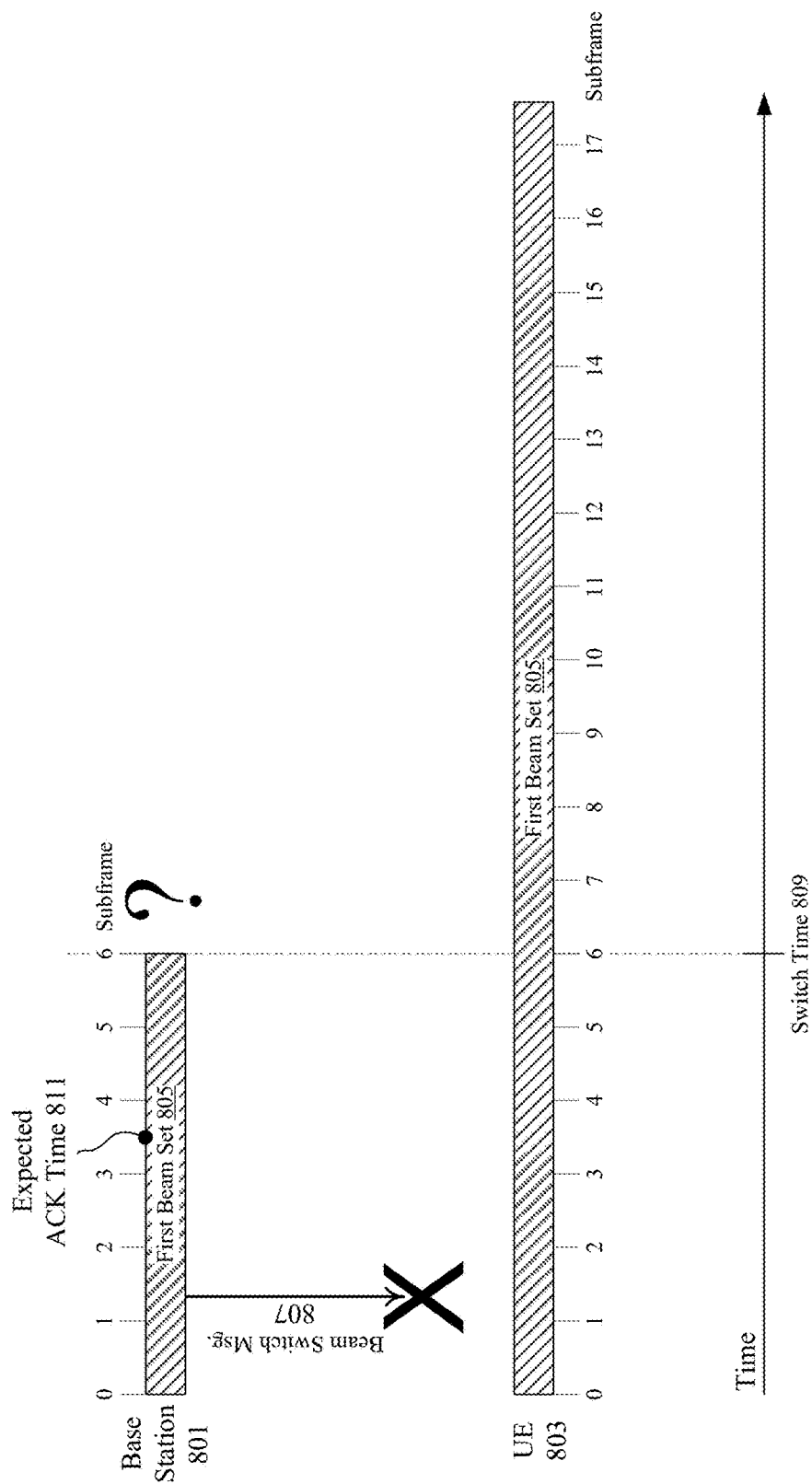
FIG. 8 illustrates an example situation of signal error in multi-beam wireless communication.

FIG. 8 illustrates an example situation of signal error in multi-beam wireless communication. In this example, a base station 801 and a UE 803 are communicating via a first beam set 805, and base station 801 transmits a BSM 807 instructing UE 803 to switch beams at a switch time 809. However, UE 803 does not receive BSM 807. Because UE 803 does not receive BSM 807, UE 803 does not transmit an ACK, and base station 801 does not receive an ACK at an expected ACK time 811. The base station 801 does not know whether UE 803 will switch beams at switch time 809 because the base station 801 does not know whether the UE 803 failed to receive the BSM 807 or the UE 803 received the BSM 807 and sent an ACK that was not received by the base station 801. In this case, UE 803 will not switch beam sets at switch time 809, but will continue communicating via first beam set 805.

Figure 9:
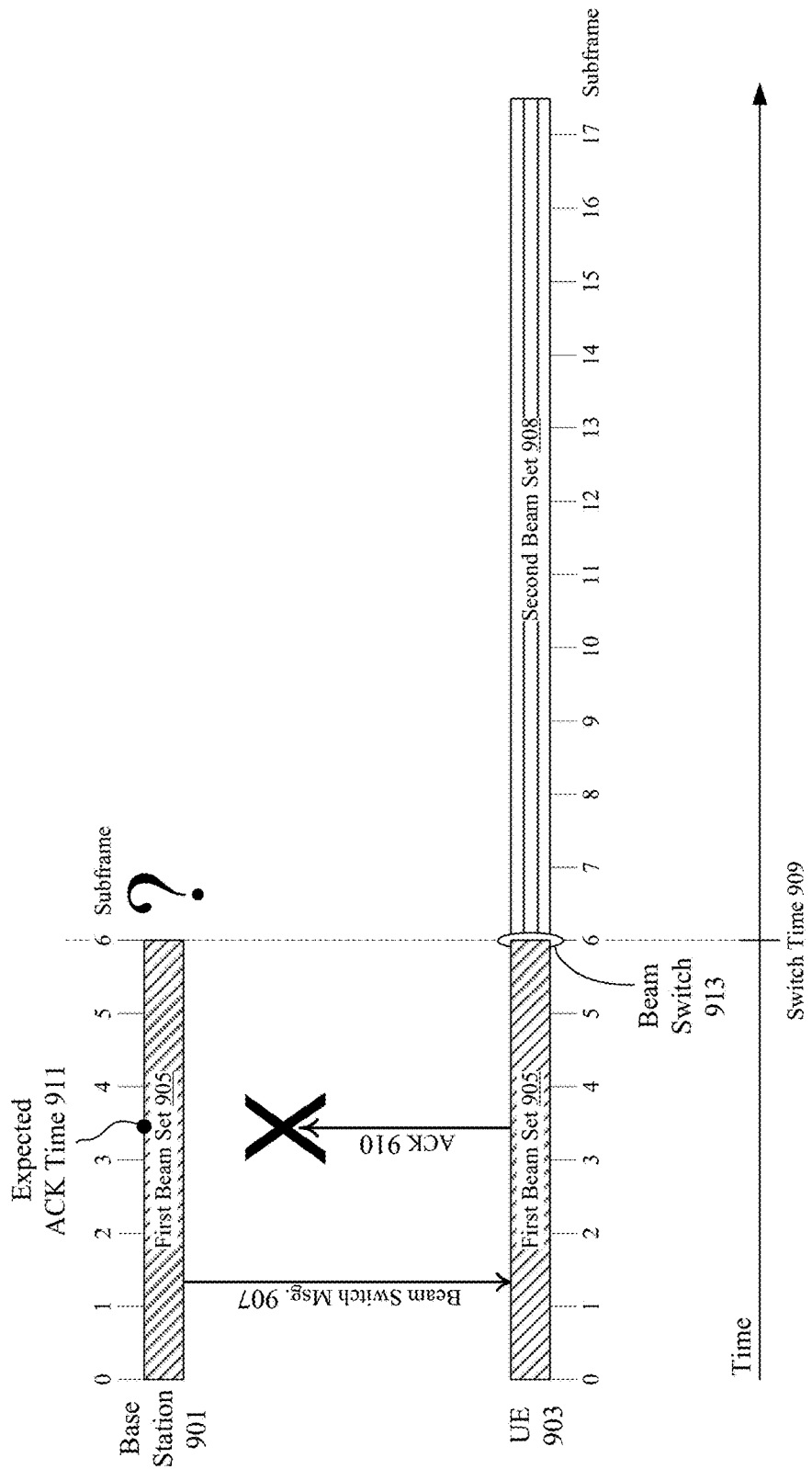
FIG. 9 illustrates another example situation of signal error in multi-beam wireless communication.

FIG. 9 illustrates another example situation of signal error in multi-beam wireless communication. In this example, a base station 901 and a UE 903 are communicating via a first beam set 905, and base station 901 transmits a BSM 907 instructing UE 903 to switch beams to a second beam set 908 at a switch time 909. In this example, UE 903 receives BSM 907 and transmits an ACK 910. However, base station 901 does not receive ACK 910 at an expected ACK time 911. As in the example of FIG. 8, base station 901 does not know whether UE 903 will switch beams at switch time 909 because the base station 901 does not know whether the UE 903 failed to receive the BSM 907 or the UE 903 received the BSM 907 and sent an ACK that was not received by the base station 901. In this case, UE 903 does perform a beam switch 913 to switch to communication via second beam set 908 at switch time 909.

Both scenarios described with respect to FIGS. 8 and 9 result in the base station not receiving the response message (e.g., an ACK from the UE), and hence the base station may not know if the UE will switch to the target beam set. If the base station switches to the target beam set at the switch time, but the UE does not switch, beam misalignment may result (e.g., the transmitting apparatus and the receiving apparatus communicating via different beam pairs). Likewise, if the UE switches to the target beam set at the switch time, but the base station does not switch, beam misalignment may result.

It is noted that some implementations of various embodiments described herein may help avoid or help mitigate the affects of beam misalignment due to, for example, signaling errors such as BSM or ACK delivery failure as described above. In particular, FIGS. 11 and 12 illustrate example beam switch methods that may be implemented before a switch time. FIGS. 14-18 illustrate example beam switch methods that may be implemented after a switch time. FIG. 19 illustrates an example beam switch method that may be implemented to avoid BSM and ACK signaling errors altogether.

Turning first to FIGS. 10-13, these figures describe various examples of systems and methods in which a beam switch message can indicate a beam reset state, which may provide advantages to beam switching in multi-beam systems. FIG. 10 illustrates two reset states in which a BSM can either indicate to continue execution of a previous beam switch instruction or can indicate to disregard the previous beam switch instruction. FIGS. 11 and 12 illustrate two example ways in which a BSM indicating a reset state may help avoid a time-consuming beam recovery procedure and mitigate instances of beam misalignment. FIG. 13 illustrates an example use of beam reset states in a multiple-switch BSM, such as described above with respect to FIG. 7.

Figure 10A:
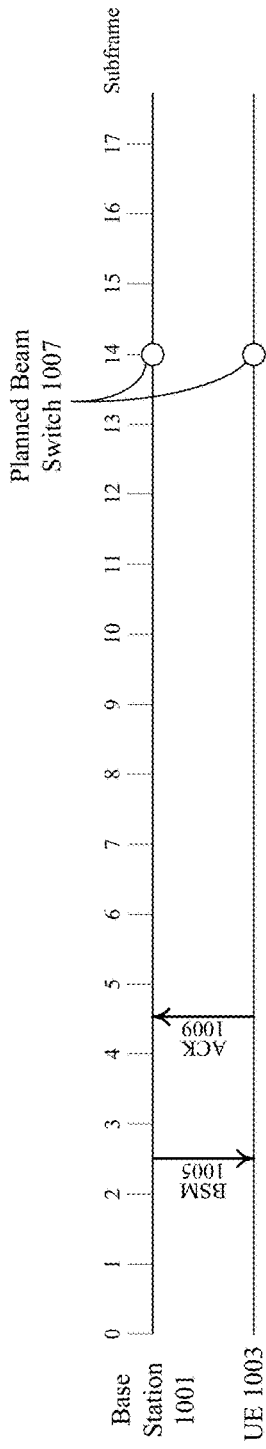
FIGS. 10A-C illustrate an example implementation of a method of wireless communication in accordance with various embodiments.
Figure 10B:
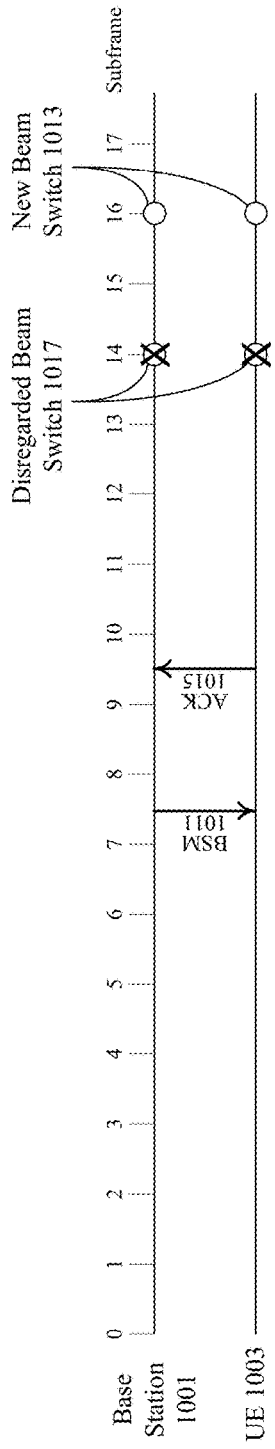
Figure 10C:
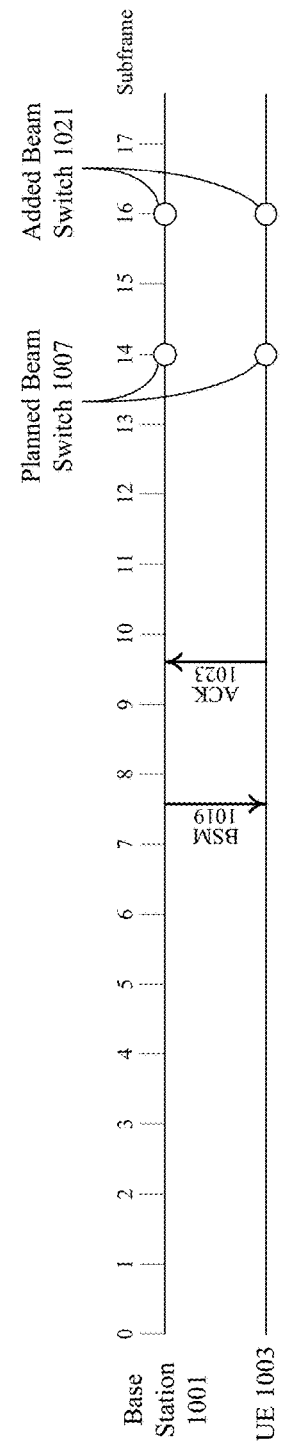

FIGS. 10A-C illustrate an example implementation of a method of wireless communication in accordance with various embodiments. FIG. 10A shows the state of communication between a base station 1001 and a UE 1003 at a first time. FIG. 10B shows the state of communication between base station 1001 and UE 1003 at a later time in the case that a first reset state is selected. FIG. 10C shows the state of communication between base station 1001 and UE 1003 at the later time in the case that a second reset state is selected. Turning first to FIG. 10A, base station 1001 can transmit a BSM 1005 including a first instruction for switching beams to UE 1003, which can establish a planned beam switch 1007. For example, base station 1001 and UE 1003 may be communicating via a first beam set, and BSM 1005 instructs UE 1003 to switch to a second beam set. The UE 1003 receives BSM 1005 and transmits an ACK 1009, and base station receives ACK 1009.

The base station 1001 decides to transmit a second BSM to UE 1003, and the base station 1001 selects a reset state to be indicated by the second BSM. FIG. 10B and FIG. 10C illustrate communication resulting from selection of, respectively, a first reset state and a second reset state.

FIG. 10B illustrates communication based on a first reset state, in which UE 1003 disregards the first instruction sent in BSM 1005. The base station 1001 transmits a BSM 1011 to UE 1003. BSM 1011 includes a second instruction for switching beams, which can establish a new beam switch 1013, and indicates the selected reset state in which UE 1003 disregards the first instruction. The UE 1003 receives BSM 1011 and transmits an ACK 1015, and base station receives ACK 1015. In this example, UE 1003 has not completed execution of the first instruction because UE 1003 has not executed planned beam switch 1007. Therefore, UE 1003 disregards planned beam switch 1007, which is represented as disregarded beam switch 1017 in FIG. 10, and executes only new beam switch 1013.

On the other hand, FIG. 10C illustrates communication based on a second reset state, in which UE 1003 maintains execution of the first instruction sent in BSM 1005, thus, UE 1003 augments the first instruction with a second instruction. The base station 1001 transmits a BSM 1019 to UE 1003. BSM 1019 includes a second instruction for switching beams, which can establish an added beam switch 1021, and indicates the selected reset state in which UE 1003 maintains execution of the first instruction. The UE 1003 receives BSM 1019 and transmits an ACK 1023, and base station receives ACK 1023. In this example, UE 1003 has not completed execution of the first instruction because UE 1003 has not executed planned beam switch 1007. UE 1003 maintains execution of the first instruction by executing planned beam switch 1007, and augments the first instruction with the second instruction by also executing added beam switch 1021.

In various embodiments, the second BSM can indicate which of the reset states was selected by setting a bit to 0 or 1, such as a flag. For example, a bit set to 0 may indicate maintaining execution of the first instruction, and the bit set to 1 may indicate disregarding the first instruction. In various embodiments, the second BSM may indicate one of the selected states by not providing an indicator. In other words, the second BSM may indicate one of the selected states by excluding information that one of the reset states was selected. For example, if no indicator is provided, the UE may default to one of the reset states, such as defaulting to disregarding the first instruction. In some examples, the reset state field may operate similarly to the new data indicator or NDI bit for HARQ operation. In some examples, the reset state information may be an empty field (e.g., the reset state indicates a null flag or no reset state information is provided in the beam switch message).

FIGS. 11 and 12 will now be discussed. These figures illustrate various embodiments that may be implemented before a switch time to help avoid potential beam misalignment due to signal errors such as described above, thus helping to avoid potentially time-consuming beam recovery procedures.

Figure 11A:
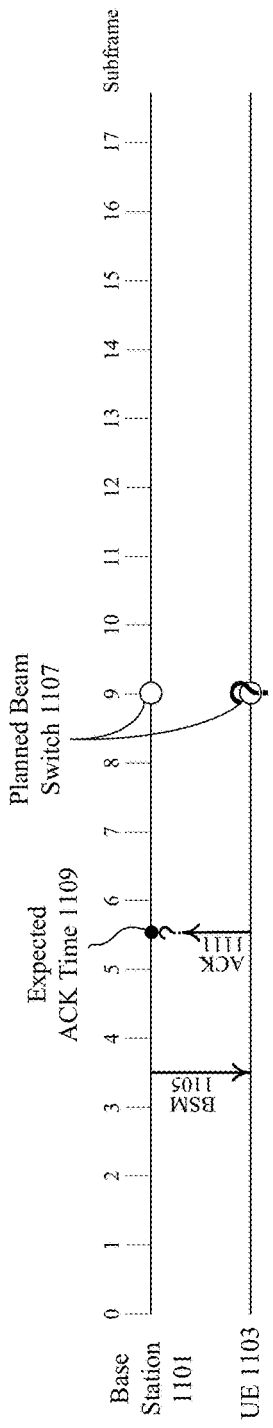
FIGS. 11A-C illustrates an example implementation of a method of wireless communication in accordance with various embodiments.
Figure 11B:
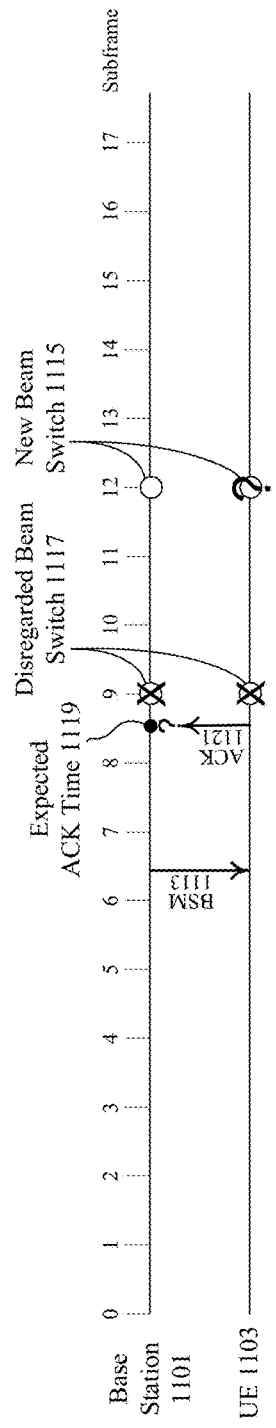
Figure 11C:
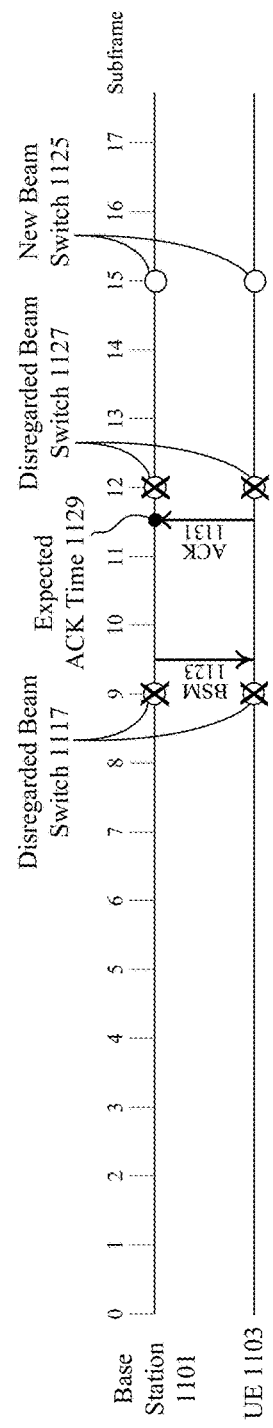

FIGS. 11A-C illustrates an example implementation of a method of wireless communication in accordance with various embodiments. FIG. 11A shows the state of communication between a base station 1101 and a UE 1103 at a first time, FIG. 11B shows the state of communication between base station 1101 and UE 1103 at a second time later than the first time, and FIG. 11C shows the state of communication between base station 1101 and UE 1103 at a third time later than the second time. Turning first to FIG. 11A, base station 1101 can transmit a BSM 1105 to UE 1103. For example, base station 1101 and UE 1103 may be communicating via a first beam set, and BSM 1105 instructs UE 1103 to switch to a second beam set. Thus, BSM 1105 establishes a planned beam switch 1107. In this example, base station 1101 expects a response message from UE 1103 at an expected ACK time 1109. The UE 1103 receives BSM 1105 and transmits an ACK 1111. However, base station 1101 does not receive ACK 1111, and therefore, the base station does not know whether UE 1103 will perform planned beam switch 1107.

Turning to FIG. 11B, because insufficient time exists between expected ACK time 1109 and planned beam switch 1107, base station 1101 transmits a BSM 1113 to UE 1103 that establishes a new beam switch 1115 at a later time than planned beam switch 1107. The UE 1103 receives BSM 1113, and because the default behavior of UE 1103 is to cancel execution of any instructions in previous BSMs if the UE receives a new BSM, planned beam switch 1107 becomes disregarded beam switch 1117. The base station 1101 monitors for a response message at an expected ACK time 1119. UE 1103 transmits an ACK 1121. However, base station 1101 does not receive ACK 1121, and therefore, the base station does not know whether UE 1103 will perform new beam switch 1115. However, because BSM 1113 instructed UE 1103 to delay the beam switch, base station 1101 is able to transmit another BSM and potentially receive a response message before new beam switch 1115.

Turning to FIG. 11C, because insufficient time again exists before the beam switch (i.e., new beam switch 1115), base station 1101 transmits a BSM 1123 to UE 1103 that establishes a new beam switch 1125 at a later time than new beam switch 1115. The UE 1103 receives BSM 1123, and new beam switch 1115 becomes disregarded beam switch 1127. The base station 1101 monitors for a response message at an expected ACK time 1129. UE 1103 transmits an ACK 1131. This time, base station 1101 receives ACK 1131, and both base station 1101 and UE 1103 can switch beams according to new beam switch 1125. Thus, by delaying the planned beam switch, a base station and a UE may continue communication on a source beam set until a response is received. In contrast, if base station 1101 had not delayed the planned beam switch, a time-consuming beam recovery process may have been initiated at the time of planned beam switch 1107, for example.

Figure 12A:
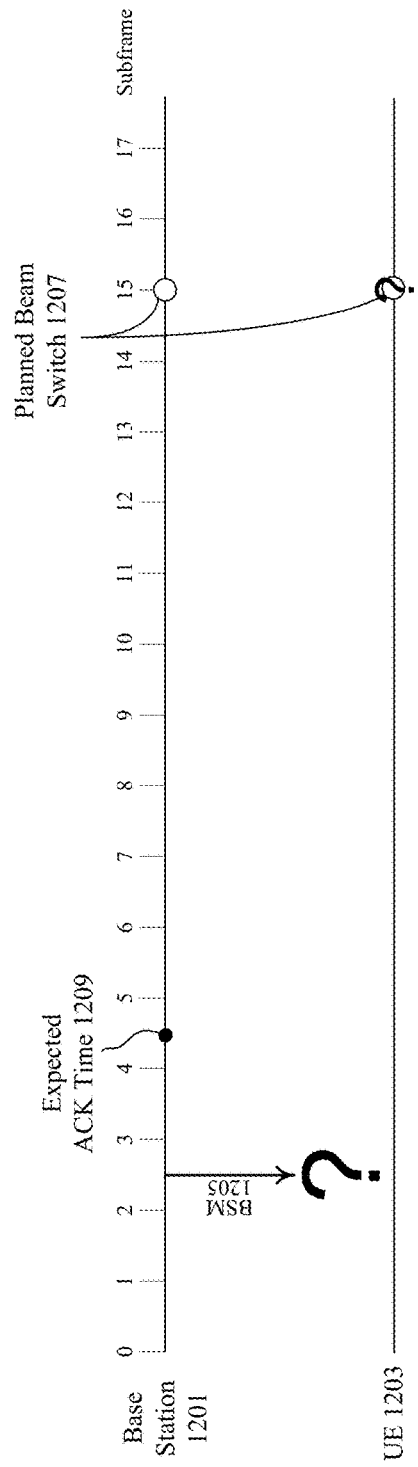
FIG. 12A-B illustrate an example implementation of a method of wireless communication in accordance with various embodiments.
Figure 12B:
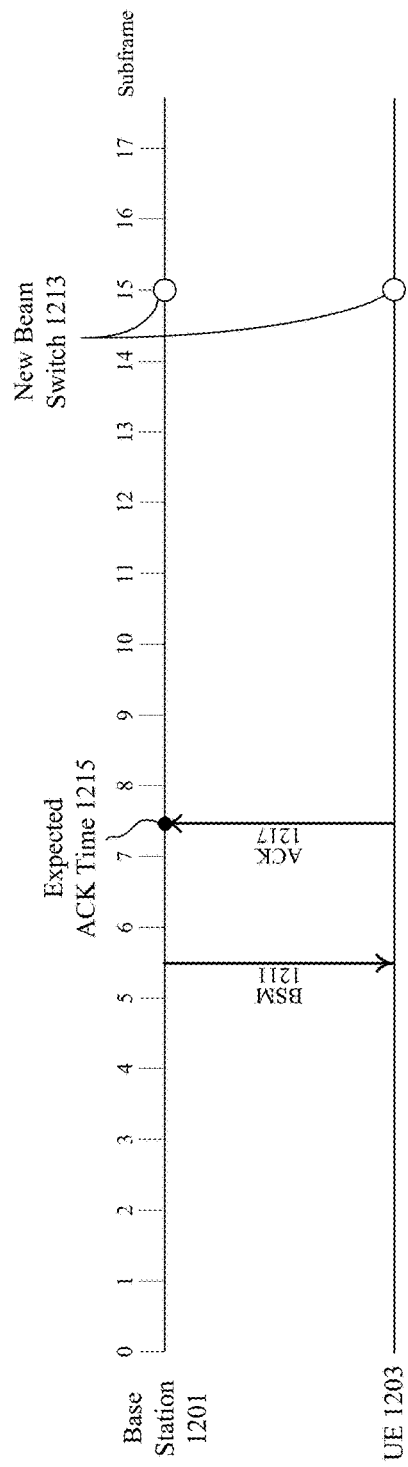

FIG. 12A-B illustrate an example wireless communication via multiple beams according to various embodiments. In particular, FIG. 12A shows the state of communication between a base station 1201 and a UE 1203 at a first time, and FIG. 12B shows the state of communication between base station 1201 and UE 1203 at a later time. Turning first to FIG. 12A, base station 1201 can transmit a BSM 1205 to UE 1203. For example, base station 1201 and UE 1203 may be communicating via a first beam set, and BSM 1205 instructs UE 1203 to switch to a second beam set. Thus, BSM 1205 establishes a planned beam switch 1207. In this example, base station 1201 expects a response message from UE 1203 at an expected ACK time 1209. However base station 1201 does not receive a response message, and therefore, the base station does not know whether UE 1203 will perform planned beam switch 1207.

Turning to FIG. 12B, because sufficient time exists between expected ACK time 1209 and planned beam switch 1207, base station 1201 transmits another BSM 1211 to UE 1203. BSM 1211 establishes a new beam switch 1213. In this example, new beam switch 1213 is the same as planned beam switch 1207, i.e., the same target beam set and the same switch time. The base station 1201 monitors for a response message at an expected ACK time 1215. In this example, UE 1203 receives BSM 1205 and transmits an ACK 1217, which is received by base station 1201. In this example, the default behavior of UE 1203 is to cancel execution of any instructions in previous BSMs if the UE receives a new BSM. In this case, base station 1201 and UE 1203 can both switch to the target beam set and continue communicating. This approach can work well if there is sufficient time between the first BSM and the planned beam switch because the base station and UE can continue communication via the source beam set. However, in some cases, the base station might not have sufficient time before a planned beam switch to communicate effectively with the UE.

FIGS. 13A-B illustrate another example implementation of a method of wireless communication in accordance with various embodiments. In particular, FIGS. 13A-B illustrate an example use of reset states in an implementation with multiple-switch BSMs. FIG. 13A shows the state of communication between a base station 1301 and a UE 1303 at a first time, and FIG. 13B shows the state of communication between base station 1301 and UE 1303 at later time in the case that a first reset state is selected. Turning first to FIG. 13A, base station 1301 can transmit a BSM 1305 including a first instruction for switching beams to UE 1303. In this case, the first instruction includes multiple beam switches, such as BSM 707 described above with respect to FIG. 7. BSM 1305 establishes two planned beam switches, i.e., planned beam switch 1307 and planned beam switch 1308. For example, base station 1301 and UE 1303 may be communicating via a first beam set, and BSM 1305 instructs UE 1303 to switch to a second beam set for planned beam switch 1307 and to switch to a third beam set for planned beam switch 1308. The UE 1303 receives BSM 1305 and transmits an ACK 1309, and base station receives ACK 1309.

The base station 1301 decides to transmit a second BSM to UE 1303, and the base station 1301 selects a reset state to be indicated by the second BSM. FIG. 13B illustrates the communication resulting from selection of a reset state in which UE 1303 maintains execution of the first instruction. Unlike the example of FIG. 10C, base station 1301 transmits the second BSM after UE 1303 has started execution of the first instruction for beam switching. However, the second BSM is transmitted before UE 1303 completes execution of the first instruction.

FIG. 13B illustrates communication based on a first reset state, in which UE 1303 maintains execution of the first instruction sent in BSM 1305. The base station 1301 transmits a BSM 1311 to UE 1303 after planned beam switch 1307 has been completed. The completion of planned beam switch 1307 is illustrated in FIG. 13B by completed beam switch 1312. BSM 1311 includes a second instruction for switching beams, which can establish an added beam switch 1313, and indicates the selected reset state in which UE 1303 maintains execution of the first instruction. In this case, UE 1303 has not completed execution of the first instruction because the UE has not completed planned beam switch 1308. The UE 1303 receives BSM 1305 and transmits an ACK 1315, and base station receives ACK 1315. In this example, UE 1303 has not completed execution of the first instruction because UE 1303 has not executed planned beam switch 1308. Therefore, UE 1303 augments planned beam switch 1308 with added beam switch 1313.

In various embodiments, the BSM 1311 could indicate a reset state in which UE 1303 disregards the first instruction, similar to the example of FIG. 10B. In this case, even though completed beam switch 1312 has already been executed, UE 1303 can disregard planned beam switch 1308. In other words, UE 1303 can disregard the unexecuted portion of the first instruction.

Now turning to FIGS. 14-18, these figures illustrate example beam switch methods that may be implemented after a switch time to recover from potential beam misalignment due to signal errors such as described above.

Figure 14:
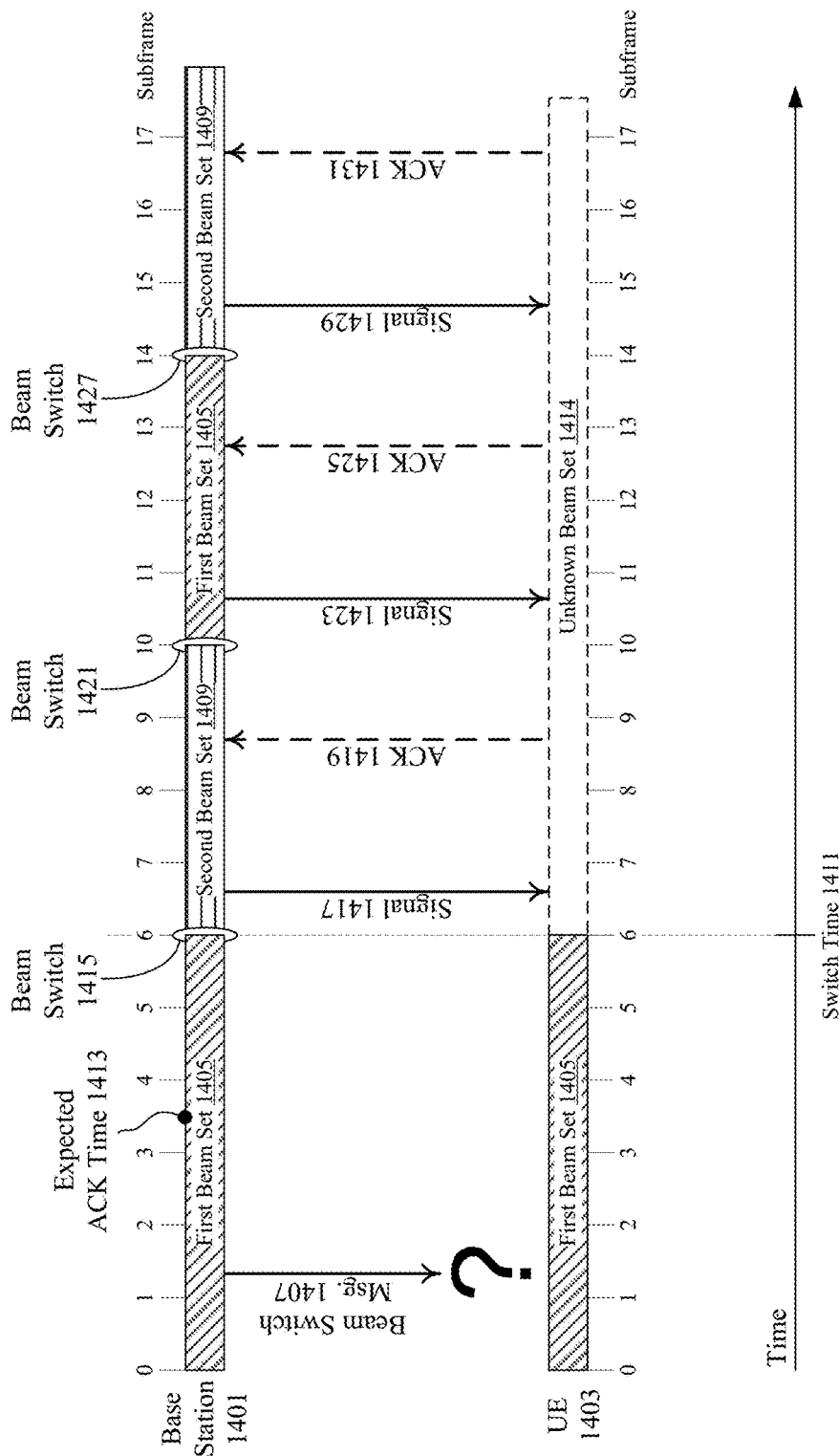
FIG. 14 illustrates an example implementation of a method of wireless communication in accordance with various embodiments.

FIG. 14 illustrates an example implementation of a method of wireless communication in accordance with various embodiments. Initially, a base station 1401 and a UE 1403 can be communicating via a first beam set 1405 using, for example, mmW communications. The base station 1401 and UE 1403 may, for example, correspond to base station 562 and UE 566 in FIG. 5 above, and base station 1401 may transmit various DL signals and channels to UE 1403 via first beam set 1405, such as beam or beams 510. UE 1403 may transmit various UL signals and channels to base station 1401 via first beam set 1405, such as beam or beams 520 (which are associated with beam or beams 510 in first beam pair 550, e.g., first beam set 1405).

The base station 1401 can transmit a BSM 1407 including an instruction to switch to communication via a second beam set 1409 at a switch time 1411. The BSM 1407 may include information of a beam identifier for second beam set 1409, also referred to as the target beam, which could be, e.g., second beam pair 552. In some examples, BSM 1407 may not include a beam identifier. In some examples, BSM 1407 may be transmitted as part of a MAC or RRC message. The base station 1401 may expect a response message, e.g., an ACK, from UE 1403 at an expected ACK time 1413 and, therefore, may be monitoring for a response indicating receipt of BSM 1407. UE 1403 may include the target beam (second beam set) identifiers in the UL transmission to echo back the target beam identifiers. In one aspect, UE 1403 may generate a sequence from the target beam identifiers, and include the sequence in the UL transmission. The base station 1401 may determine and confirm the target beam pair from the sequence in the UL transmission. In some examples, both the source beam pair (first beam set) and the target beam pair may be of sufficient quality for communication, the mechanism may help base station 1401 to determine which of the source beam pair and the target beam pair to use.

However, in this example, when the base station determines whether a response message was received, base station 1401 determines that no ACK was received, i.e., the response message is unreceived. Therefore, the beam set on which UE 1403 will be communicating after the switch time is unknown to base station 1401, and this situation is represented in FIG. 14 by an unknown beam set 1414 on which UE 1403 is communicating after switch time 1411. Even though base station 1401 does not know whether UE 1403 will switch beams, base station 1401 performs a beam switch 1415 to second beam set 1409 at switch time 1411.

The base station 1401 can then transmit a signal 1417 to UE 1403 via second beam set 1409 after performing beam switch 1415. In various embodiments, signal 1417 can be, for example, a request for a response that UE 1403 is communicating via second beam set 1409. In various embodiments, signal 1417 can be, for example, merely the continuation of normal communications between base station 1401 and UE 1403 (e.g., control and data signals). In this regard, base station 1401 may monitor for an ACK in response to signal 1417, may monitor for normal communication in response to signal 1417, etc. In some embodiments, base station might not transmit a signal, such a signal 1417, after switching beams, but may simply switch beams and then await communication from UE 1403 via the second beam set.

In the example of FIG. 14, base station 1401 monitors for an ACK to signal 1417. If UE 1403 had received BSM 1407 and had switched to communication via second beam set 1409, then UE 1403 can send an ACK 1419 to base station 1401. In this case, base station 1401 can receive ACK 1419 and can continue communication with UE 1403 via second beam set 1409. In other words, the unknown beam set 1414 is now known to be second beam set 1409, and the remaining beam switches, signals, and potential ACKs shown in FIG. 14 can be disregarded.

However, if UE 1403 did not receive BSM 1407 and did not switch to second beam set 1409, UE 1403 would not have switched to the second beam set and, therefore, would not receive signal 1417 from base station 1401. In this case, UE 1403 would not transmit ACK 1419. Because ACK 1419 may or may not be transmitted, ACK 1419 is shown as a dashed arrow. This dashed arrow representation will be used herein for other signals that may or may not be transmitted.

If base station 1401 does not receive ACK 1419, base station 1401 can perform a beam switch 1421 to switch communication back to first beam set 1405. In other words, if UE 1403 is not communicating via second beam set 1409 after switch time 1411, base station 1401 can assume that UE 1403 did not receive BSM 1407 and is, therefore, still communicating via first beam set 1405. After beam switch 1421, base station 1401 can transmit a signal 1423 to UE 1403 via first beam set 1405 and monitor for an ACK. UE 1403 may or may not transmit an ACK 1425. If base station 1401 receives ACK 1425, base station 1401 and UE 1403 can continue communication, as described above, on first beam set 1405 (i.e., the unknown beam set 1414 is now know to be first beam set 1405). However, if base station 1401 does not receive ACK 1425, base station 1401 can repeat the switching back and forth between the first and second beam sets, e.g., by performing a beam switch 1427, transmitting a signal 1429, and monitoring for an ACK 1431.

It should be noted that in some embodiments, base station 1401 might not transmit signal 1423 after switching back to first beam set 1405, because the probability can be high that UE 1403 did not switch beams and is, therefore, communicating on the first beam set. Thus, it may be more efficient for base station 1401 to simply continue normal communications when switching back to the first beam set after determining that UE 1403 did not switch beams.

Figure 15:
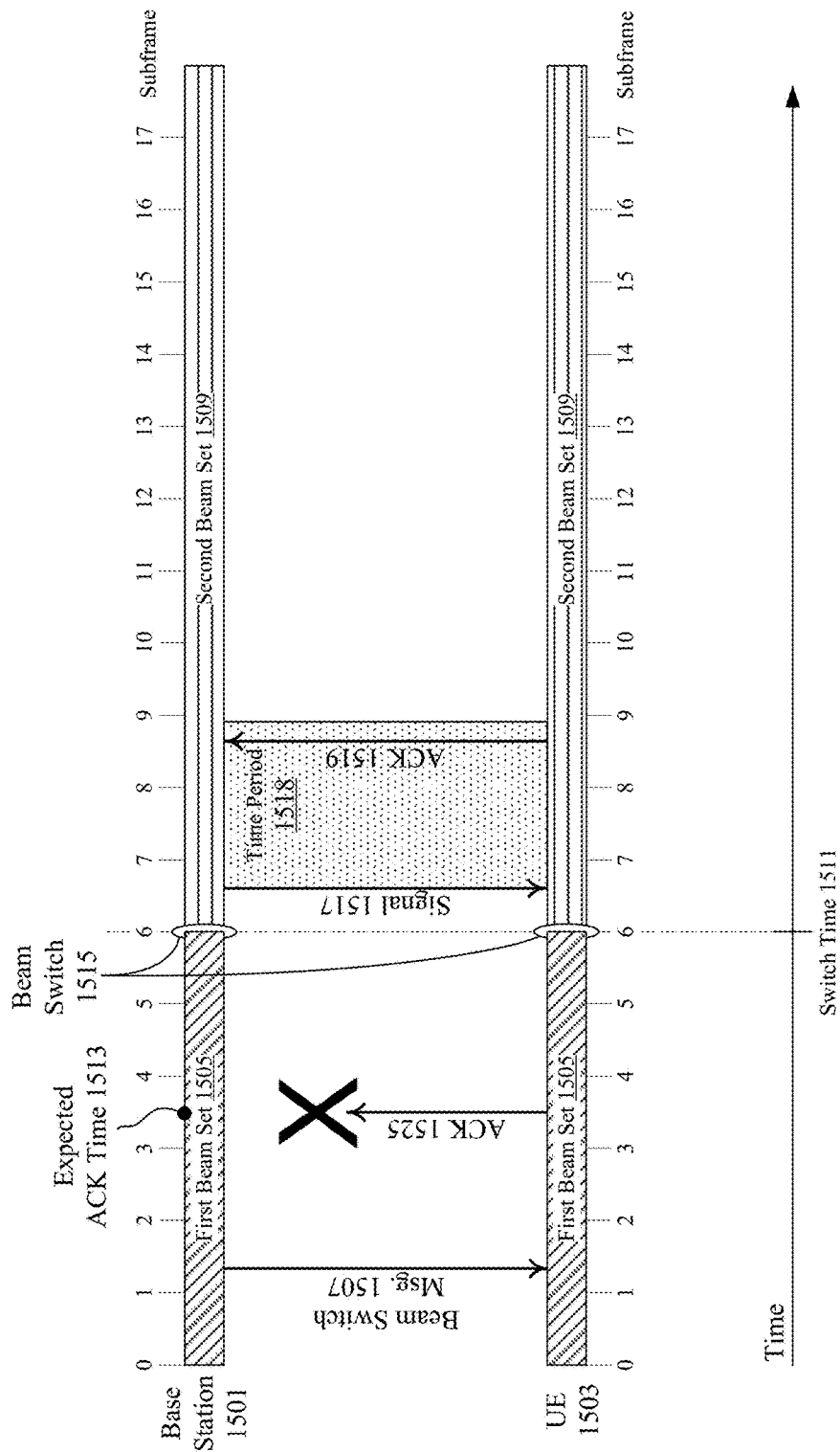
FIG. 15 illustrates an implementation of FIG. 14 in a situation that a response to a BSM is lost.
Figure 16:
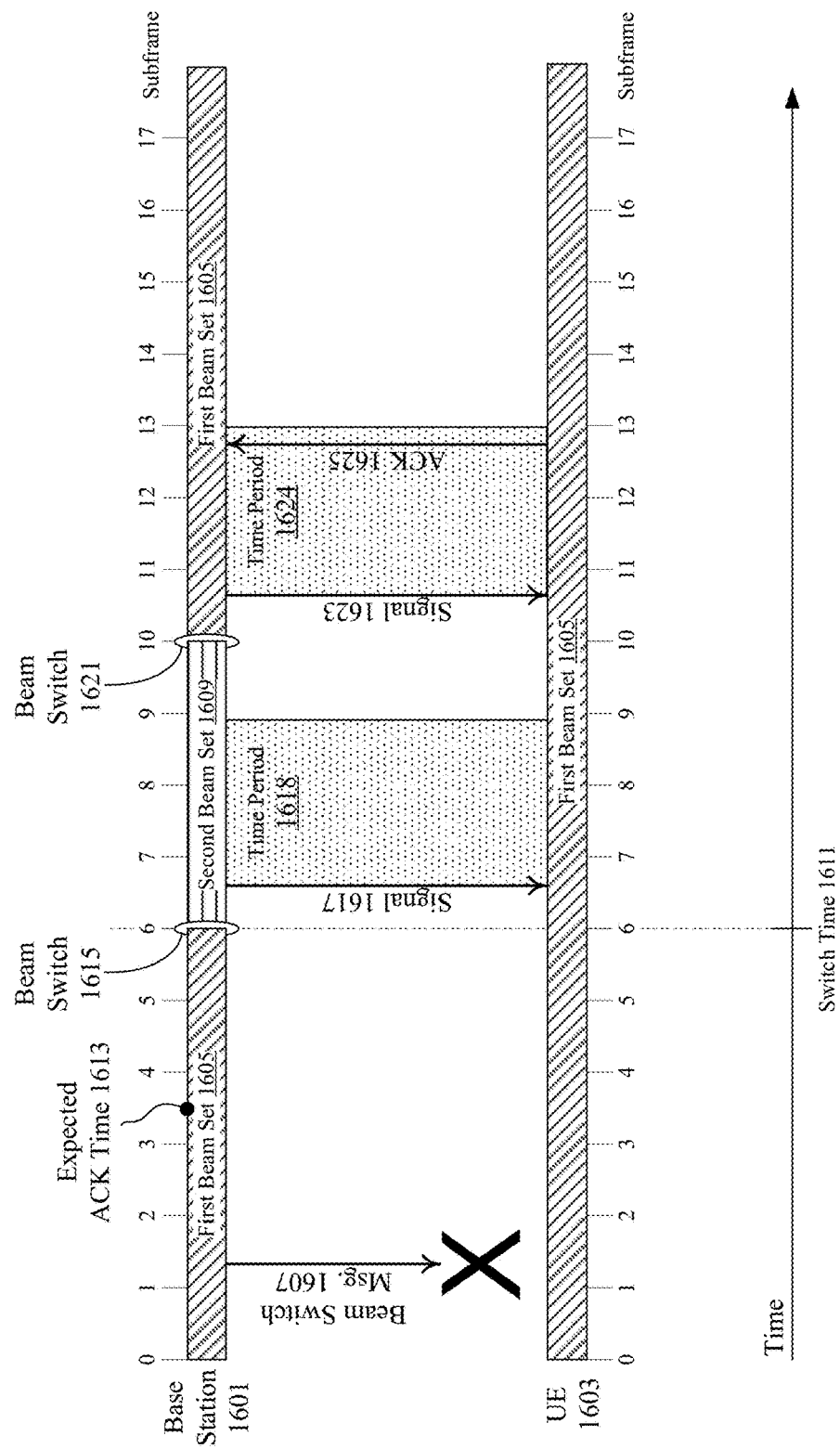
FIG. 16 illustrates an implementation of FIG. 14 in a situation that a BSM is lost.

FIGS. 15 and 16 illustrate the example shown in FIG. 14 in two different signaling error situations.

FIG. 15 illustrates an implementation of FIG. 14 in a situation that a response to a BSM is lost. Initially, a base station 1501 and a UE 1503 can be communicating via a first beam set 1505 using, for example, mmW communications. The base station 1501 can transmit a BSM 1507 including an instruction to switch to communication via a second beam set 1509 at a switch time 1511. The base station 1501 may expect a response message, e.g., an ACK, from UE 1503 at an expected ACK time 1513 and, therefore, may be monitoring for a response indicating receipt of BSM 1507. In this example, UE 1503 receives BSM 1507 and transmits a response message, e.g., ACK 1525. The UE 1503 prepares to switch to communication via second beam set 1509 at switch time 1511.

However, in this example, ACK 1525 is lost, e.g., is not received by base station 1501. Therefore, base station 1501 determines that no ACK was received, i.e., the response message is unreceived. Therefore, the beam set on which UE 1503 will be communicating after the switch time is unknown to base station 1501. Even though base station 1501 does not know whether UE 1503 will switch beams, base station 1501 performs a beam switch 1515 to second beam set 1509 at switch time 1511.

The base station 1501 can then transmit a signal 1517 to UE 1503 via second beam set 1509 after performing beam switch 1515. In this example, signal 1517 can be a request for a response that UE 1503 is communicating via second beam set 1509. Base station 1501 can monitor for an ACK to signal 1517. As described above with respect to FIG. 14, if the base station does not receive an ACK to the signal sent on the second beam set, the base station can switch back to communication via the first beam set and attempt to communicate with the UE. In the example of FIG. 15, base station 1501 remains on second beam set 1509 for a time period 1518 during which an ACK should be received from UE 1503. In other words, base station 1501 can set time period 1518 as an amount of time to remain on second beam set 1509 in order to determine if UE 1503 is communicating via the second beam set. In this case, time period 1518 can be am amount of time required for an ACK to be received from UE 1503. In various embodiments, time period 1518 can be set in other ways. For example, the base station may send multiple ACK requests and set the time period to begin at the time of sending the first ACK request and to end at a time after an ACK to the last ACK request is expected to be received. In various embodiments, the base station might not send an ACK request, but may simply attempt normal communication via the second beam set, and may set the time period based on, e.g., a confidence determination that normal communication would be established within a particular time period if the UE is communicating via the second beam set. For example, the time period may be set based on a SNR of the environment, e.g., a shorter time period may set in a high-SNR environment and a longer time period may be set in a low-SNR environment.

In this example, because UE 1503 received BSM 1507 and switched to communication via second beam set 1509, then UE 1503 receives signal 1517 and sends an ACK 1519 to base station 1501. In this case, base station 1501 can receive ACK 1519 and can continue communication with UE 1503 via second beam set 1509.

FIG. 16 illustrates an implementation of FIG. 14 in a situation that a BSM is lost. Initially, a base station 1601 and a UE 1603 can be communicating via a first beam set 1605 using, for example, mmW communications. The base station 1601 can transmit a BSM 1607 including an instruction to switch to communication via a second beam set 1609 at a switch time 1611. The base station 1601 may expect a response message, e.g., an ACK, from UE 1603 at an expected ACK time 1613 and, therefore, may be monitoring for a response indicating receipt of BSM 1607. In this example, BSM 1607 is lost, e.g., not received by UE 1603. Therefore, UE 1603 does not transmit a response message and does not prepare to switch to communication via second beam set 1609 at switch time 1611. Instead, UE 1603 continues to communicate via first beam set 1605 after switch time 1611.

Base station 1601 determines that no ACK was received, i.e., the response message is unreceived. Therefore, the beam set on which UE 1603 will be communicating after the switch time is unknown to base station 1601. Even though base station 1601 does not know whether UE 1603 will switch beams, base station 1601 performs a beam switch 1615 to second beam set 1609 at switch time 1611.

Base station 1601 can then transmit a signal 1617 to UE 1603 via second beam set 1609 after performing beam switch 1615. In this example, signal 1617 can be a request for a response that UE 1603 is communicating via second beam set 1609. Base station 1601 can monitor for an ACK to signal 1617 and can remain on second beam set 1609 for a time period 1618 during which an ACK should be received from UE 1603. For example, base station 1601 can set time period 1618 as described above for time period 1518 of FIG. 15.

In this example, because UE 1603 did not receive BSM 1607 and did not switch to communication via second beam set 1609, UE 1603 does not send an ACK to base station 1601. In this case, base station 1601 can wait until time period 1618 ends and then can perform a beam switch 1621 to switch back to communication via first beam set 1605. Base station 1601 can then transmit a signal 1623 to UE 1603 via first beam set 1605 after performing beam switch 1621. In this example, signal 1623 can be a request for a response that UE 1603 is communicating via first beam set 1605. Base station 1601 can monitor for an ACK to signal 1623 and can remain on first beam set 1605 for a time period 1624 during which an ACK should be received from UE 1603. For example, base station 1601 can set time period 1624 as described above for time period 1518 of FIG. 15. In this example, UE 1603 receives signal 1623 and sends an ACK 1625 to base station 1601. In this case, base station 1601 can receive ACK 1525 and can continue communication with UE 1603 via first beam set 1505.

Accordingly, FIGS. 14-16 illustrate examples of beam switch methods that may be implemented after a switch time to recover from potential beam misalignment, including switching to a target beam set when a response to a BSM is unreceived and communicating via the target beam set for a time period during which communication is expected to be established.

Figure 17:
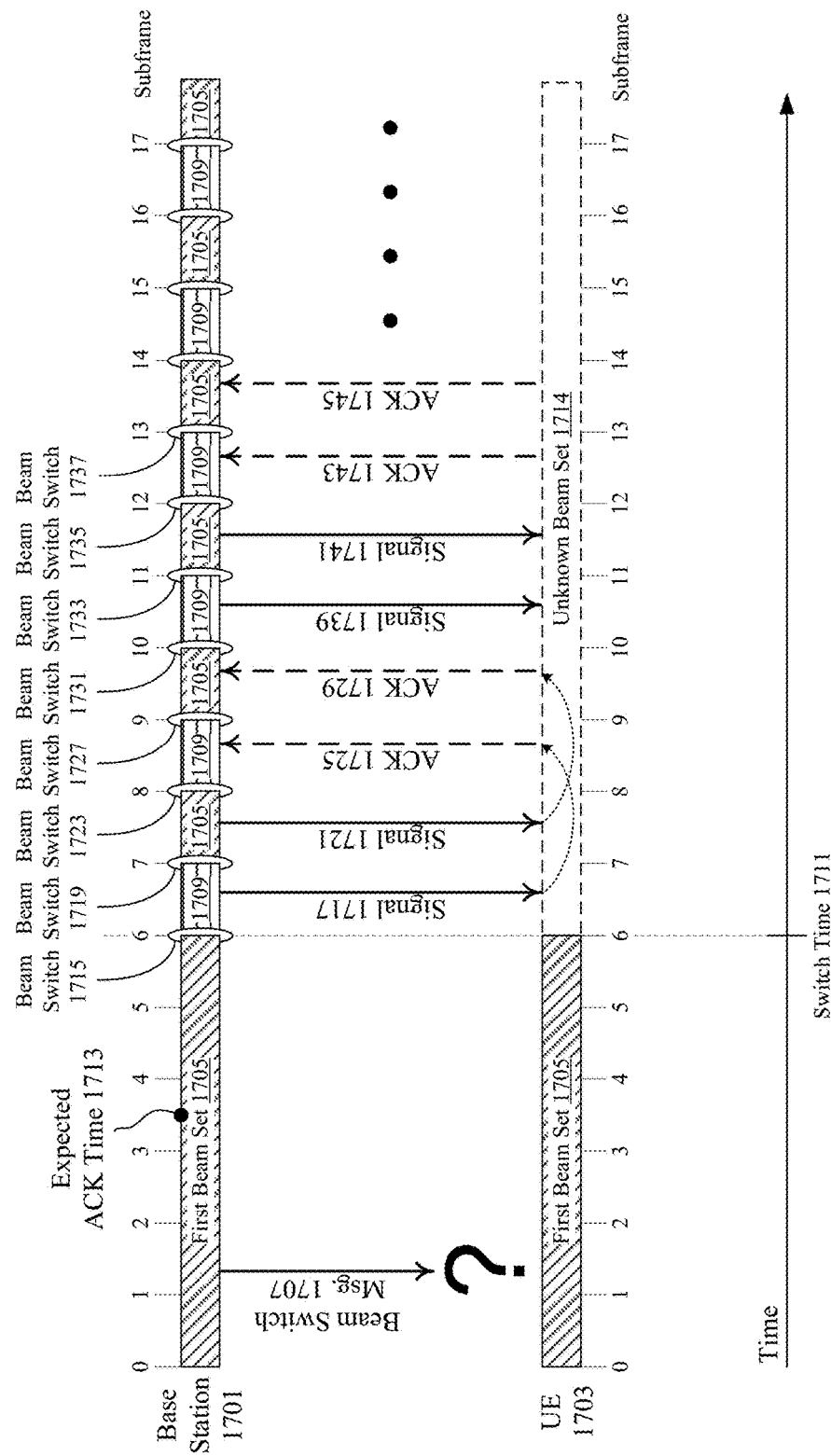
FIG. 17 illustrates another example implementation of a method of wireless communication in accordance with various embodiments.

FIG. 17 illustrates another example implementation of a method of wireless communication in accordance with various embodiments. A base station 1701 and a UE 1703 can be communicating via a first beam set 1705 using, for example, mmW communications. The base station 1701 and UE 1703 may, for example, correspond to base station 562 and UE 566 in FIG. 5 above, and base station 1701 may transmit various DL signals and channels to UE 1703 via first beam set 1705, such as beam or beams 510. UE 1703 may transmit various UL signals and channels to base station 1701 via first beam set 1705, such as beam or beams 520 (which are associated with beam or beams 510 in first beam pair 550, e.g., first beam set 1705).

The base station 1701 can transmit a BSM 1707 including an instruction to switch to communication via a second beam set 1709 at a switch time 1711. The BSM 1707 may include information of a beam identifier for second beam set 1709, also referred to as the target beam, which could be, e.g., second beam pair 552. In some examples, BSM 1707 may not include a beam identifier. In some examples, BSM 1707 may be transmitted as part of a MAC or RRC message. The base station 1701 may expect a response message, e.g., an ACK, from UE 1703 at an expected ACK time 1713 and, therefore, may be monitoring for a response indicating receipt of BSM 1707. UE 1703 may include the target beam (second beam set) identifiers in the UL transmission to echo back the target beam identifiers. In one aspect, UE 1703 may generate a sequence from the target beam identifiers, and include the sequence in the UL transmission. The base station 1701 may determine and confirm the target beam pair from the sequence in the UL transmission. In some examples, both the source beam pair (first beam set) and the target beam pair may be of sufficient quality for communication, the mechanism may help base station 1701 to determine which of the source beam pair and the target beam pair to use.

However, in this example, when the base station determines whether a response message was received, base station 1701 determines that no ACK was received, i.e., the response message is unreceived. Therefore, the beam set on which UE 1703 will be communicating after the switch time is unknown to base station 1701, and this situation is represented in FIG. 17 by an unknown beam set 1714 on which UE 1703 is communicating after switch time 1711. Even though base station 1701 does not know whether UE 1703 will switch beams, base station 1701 performs a beam switch 1715 to second beam set 1709 at switch time 1711.

The base station 1701 can then transmit a signal 1717 to UE 1703 via second beam set 1709 after performing beam switch 1715. In various embodiments, signal 1717 can be, for example, a request for a response that UE 1703 is communicating via second beam set 1709.

However, unlike the example of FIG. 14 above, base station 1701 does not continuously maintain communication via second beam set 1709 to monitor for an ACK in response to signal 1717. Instead, base station 1701 performs a beam switch 1719 to switch to first beam set 1705, transmits a signal 1721 to UE 1703 via first beam set 1705, and performs a beam switch 1723 to switch back to second beam set 1709 before an expected ACK time for receiving a possible ACK 1725 to signal 1717. In other words, in this example there is enough time in between transmission of signal 1717 and the expected ACK time of ACK 1725 in response to signal 1717, that base station 1701 can switch to the first beam set, send another signal, and switch back to the second beam set to monitor for ACK 1725. In this way, for example, base station 1701 may recover from beam misalignment more quickly. More specifically, by transmitting signal 1721 on the first beam set during the time the base station is waiting for ACK 1725, a response to signal 1721 can be received sooner (because the base station does not have to wait to determine if ACK 1725 was received before switching to first beam set 1705 and transmitting signal 1721). Thus, base station 1701 can determine sooner if UE 1703 did not switch beams.

After base station 1701 switches back to second beam set 1709 at beam switch 1723, base station 1701 monitors for ACK 1725. If base station 1701 receives ACK 1725, communication with UE 1703 can continue via second beam set 1709. In other words, unknown beam set 1714 can become second beam set 1709, and the remaining beam switches, signals, and potential ACKs shown in FIG. 17 can be disregarded.

If base station 1701 does not receive ACK 1725, base station 1701 can perform a beam switch 1727 to switch to communication via first beam set 1705 and monitor for an ACK 1729 in response to signal 1721. If base station 1701 receives ACK 1729, communication with UE 1703 can continue via first beam set 1705. In other words, unknown beam set 1714 can become first beam set 1705, and the remaining beam switches, signals, and potential ACKs shown in FIG. 17 can be disregarded. If base station 1701 does not receive ACK 1729, base station can continue switching back and forth between the first and second beam sets with beam switches 1731, 1733, 1735, and 1737, sending signals 1739 and 1741, and monitoring for potential ACKs 1743 and 1745 as shown in FIG. 17. Of course, base station 1701 might change the recovery method, for example, after a time period, after a number of failed attempts, etc. For example, after 6 failed attempts at receiving an ACK, base station 1701 may switch to using a method similar to the one described with respect to FIG. 14 above, or may switch to another recovery method.

It should be noted that in some embodiments, base station 1701 might not transmit signal 1721 after switching back to first beam set 1705, because the probability can be high that UE 1703 did not switch beams and is, therefore, communicating on the first beam set. Thus, it may be more efficient for base station 1701 to simply continue normal communications when switching back to the first beam set after determining that UE 1703 did not switch beams.

Accordingly, FIG. 17 illustrates an example beam switch method that may be implemented after a switch time to recover from potential beam misalignment, including performing multiple switches between a target beam set and a source beam set in the event that a response to a BSM is unreceived, where some of the beam switches are performed between a time of sending a signal and an expected time of response to the signal.

Figure 18:
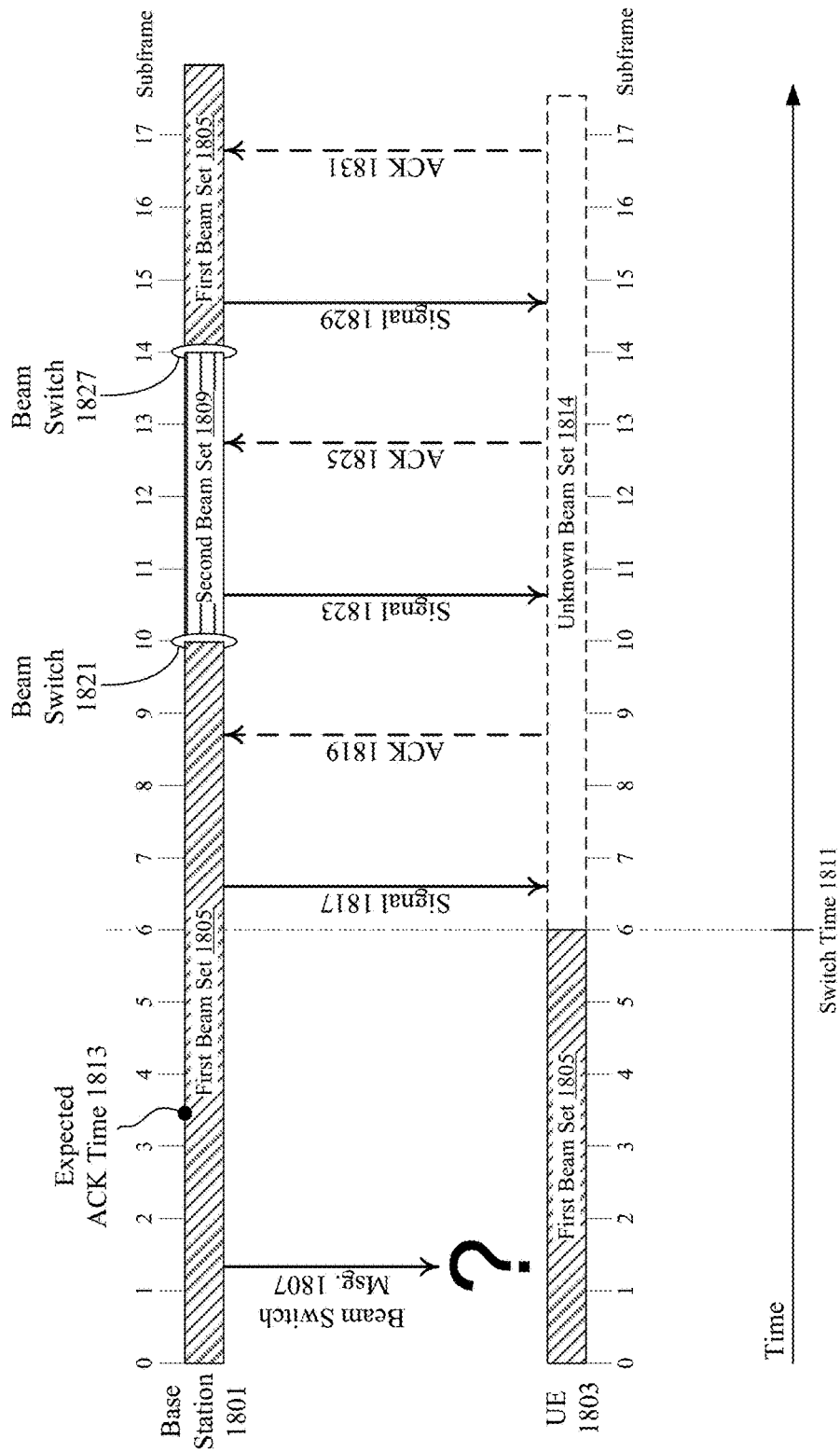
FIG. 18 illustrates an example implementation of a method of wireless communication in accordance with various embodiments.
Figure 19:
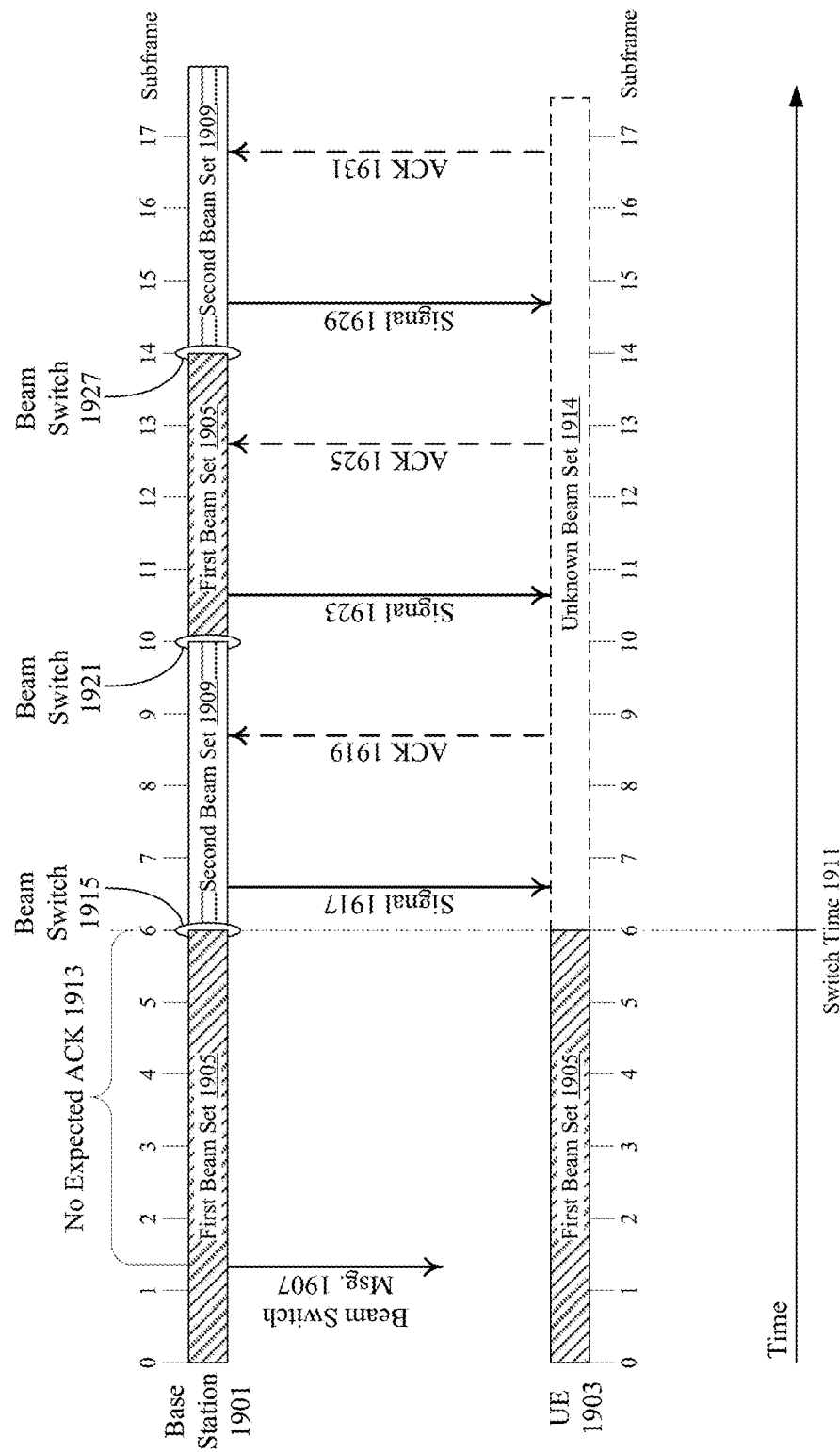
FIG. 19 illustrates an example implementation of a method of wireless communication in accordance with various embodiments.

FIG. 18 illustrates an example implementation of a method of wireless communication in accordance with various embodiments. Initially, a base station 1801 and a UE 1803 can be communicating via a first beam set 1805 using, for example, mmW communications. The base station 1801 and UE 1803 may, for example, correspond to base station 562 and UE 566 in FIG. 5 above, and base station 1801 may transmit various DL signals and channels to UE 1803 via first beam set 1805, such as beam or beams 510. UE 1803 may transmit various UL signals and channels to base station 1801 via first beam set 1805, such as beam or beams 520 (which are associated with beam or beams 510 in first beam pair 550, e.g., first beam set 1805).

The base station 1801 can transmit a BSM 1807 including an instruction to switch to communication via a second beam set 1809 at a switch time 1811. The BSM 1807 may include information of a beam identifier for second beam set 1809, also referred to as the target beam, which could be, e.g., second beam pair 552. In some examples, BSM 1807 may not include a beam identifier. In some examples, BSM 1807 may be transmitted as part of a MAC or RRC message. The base station 1801 may expect a response message, e.g., an ACK, from UE 1803 at an expected ACK time 1813 and, therefore, may be monitoring for a response indicating receipt of BSM 1807. UE 1803 may include the target beam (second beam set) identifiers in the UL transmission to echo back the target beam identifiers. In one aspect, UE 1803 may generate a sequence from the target beam identifiers, and include the sequence in the UL transmission. The base station 1801 may determine and confirm the target beam pair from the sequence in the UL transmission. In some examples, both the source beam pair (first beam set) and the target beam pair may be of sufficient quality for communication, the mechanism may help base station 1801 to determine which of the source beam pair and the target beam pair to use.

However, in this example, when the base station determines whether a response message was received, base station 1801 determines that no ACK was received, i.e., the response message is unreceived. Therefore, the beam set on which UE 1803 will be communicating after the switch time is unknown to base station 1801, and this situation is represented in FIG. 18 by an unknown beam set 1814 on which UE 1803 is communicating after switch time 1811. The base station 1801 can determine whether to switch to second beam set 1809 at switch time 1811. In this example, base station 1801 determines not to switch to second beam set 1809 at switch time 1811. Therefore, at switch time 1811, base station 1801 continues communication via first beam set 1805. The base station 1801 can send a signal 1817 via first beam set 1805. In this example, signal 1817 can be a request for a response that UE 1803 is communicating via first beam set 1805. In this case, base station 1801 may be expecting to receive a response message, and can monitor for an ACK. In various embodiments, signal 1817 can be normal communication (e.g., data signals, control signals, etc.) with UE 1803, and base station 1801 can simply determine if UE 1803 is communicating via first beam set 1805 based on receiving communications from UE 1803 via the first beam set. In some embodiments, base station might not transmit a signal, such a signal 1817, after switch time 1811, but may await communication from UE 1803 via the first beam set.

In the example of FIG. 18, base station 1801 monitors for an ACK to signal 1817. If UE 1803 had not received BSM 1807 and had not switched beams, then UE 1803 can send an ACK 1819 to base station 1801 via first beam set 1805. In this case, base station 1801 can receive ACK 1819 and can continue communication with UE 1803 via first beam set 1805. In other words, the unknown beam set 1814 is now known to be first beam set 1805, and the remaining beam switches, signals, and potential ACKs shown in FIG. 18 can be disregarded.

However, if UE 1803 did receive BSM 1807 and switched to second beam set 1809 at switch time 1811, UE 1803 would not have received signal 1817 from base station 1801. In this case, UE 1803 would not transmit ACK 1819. Because ACK 1819 may or may not be transmitted, ACK 1819 is shown as a dashed arrow.

If base station 1801 does not receive ACK 1819, base station 1801 can perform a beam switch 1821 to switch communication to second beam set 1809. In other words, if UE 1803 is not communicating via first beam set 1805 after switch time 1811, base station 1801 can assume that UE 1803 received BSM 1807 and is, therefore, communicating via second beam set 1809. After beam switch 1821, base station 1801 can transmit a signal 1823 to UE 1803 via second beam set 1809 and monitor for an ACK. UE 1803 may or may not transmit an ACK 1825. If base station 1801 receives ACK 1825, base station 1801 and UE 1803 can continue communication, as described above, on second beam set 1809 (i.e., the unknown beam set 1814 is now know to be second beam set 1809). However, if base station 1801 does not receive ACK 1825, base station 1801 can repeat the switching back and forth between the first and second beam sets, e.g., by performing a beam switch 1827, transmitting a signal 1829, and monitoring for an ACK 1831.

It should be noted that in some embodiments, base station 1801 might not transmit signal 1823 after switching to second beam set 1809, because the probability can be high that UE 1803 switched beams and is, therefore, communicating on the second beam set. Thus, it may be more efficient for base station 1801 to simply continue normal communications when switching to the second beam set after determining that UE 1803 is not communicating on first beam set 1805.

Accordingly, FIG. 18 illustrates an example beam switch method that may be implemented after a switch time to recover from potential beam misalignment, including sending a BSM to switch from a source beam set to a target beam set at a switch time, determining that a response to the BSM is unreceived, and determining whether to perform a beam switch to the target beam set at the switch time or to maintain communication via the source beam set at the switch time.

Now turning to FIG. 19, this figure illustrates an example beam switch method that may be implemented to avoid signaling errors such as described above. In various embodiments, for example, a method according to FIG. 19 can use a fast beam recovery procedure in place of a conventional ACK procedure.

FIG. 19 illustrates an example implementation of a method of wireless communication in accordance with various embodiments. Initially, a base station 1901 and a UE 1903 can be communicating via a first beam set 1905 using, for example, mmW communications. The base station 1901 and UE 1903 may, for example, correspond to base station 562 and UE 566 in FIG. 5 above, and base station 1901 may transmit various DL signals and channels to UE 1903 via first beam set 1905, such as beam or beams 510. UE 1903 may transmit various UL signals and channels to base station 1901 via first beam set 1905, such as beam or beams 520 (which are associated with beam or beams 510 in first beam pair 550, e.g., first beam set 1905).

The base station 1901 can transmit a BSM 1907 including an instruction to switch to communication via a second beam set 1909 at a switch time 1911. The BSM 1907 may include information of a beam identifier for second beam set 1909, also referred to as the target beam, which could be, e.g., second beam pair 552. In some examples, BSM 1907 may not include a beam identifier. In some examples, BSM 1907 may be transmitted as part of a MAC or RRC message. The base station 1901 does not expect a response message and does not monitor for a response message, and this is represented in FIG. 19 by a period of time labeled no expected ACK 1913, which is the time period between the sending of BSM 1907 and switch time 1911. Because base station 1901 does not monitor for a response, base station 1901 does not know whether UE 1903 received BSM 1907. Therefore, the beam set on which UE 1903 will be communicating after the switch time is unknown to base station 1901, and this situation is represented in FIG. 19 by an unknown beam set 1914 on which UE 1903 is communicating after switch time 1911. The base station 1901 performs a beam switch 1915 to second beam set 1909 at switch time 1911.

The base station 1901 can then transmit a signal 1917 to UE 1903 via second beam set 1909 after performing beam switch 1915. In various embodiments, signal 1917 can be, for example, a request for a response that UE 1903 is communicating via second beam set 1909. In various embodiments, signal 1917 can be, for example, merely the continuation of normal communications between base station 1901 and UE 1903 (e.g., control and data signals). In this regard, base station 1901 may monitor for an ACK in response to signal 1917, may monitor for normal communication in response to signal 1917, etc. In some embodiments, base station might not transmit a signal, such a signal 1917, after switching beams, but may simply switch beams and then await communication from UE 1903 via the second beam set.

In the example of FIG. 19, base station 1901 monitors for an ACK to signal 1917. If UE 1903 had received BSM 1907 and had switched to communication via second beam set 1909, then UE 1903 can send an ACK 1919 to base station 1901. In this case, base station 1901 can receive ACK 1919 and can continue communication with UE 1903 via second beam set 1909. In other words, the unknown beam set 1914 is now known to be second beam set 1909, and the remaining beam switches, signals, and potential ACKs shown in FIG. 19 can be disregarded.

However, if UE 1903 did not receive BSM 1907 and did not switch to second beam set 1909, UE 1903 would not have switched to the second beam set and, therefore, would not receive signal 1917 from base station 1901. In this case, UE 1903 would not transmit ACK 1919. Because ACK 1919 may or may not be transmitted, ACK 1919 is shown as a dashed arrow.

If base station 1901 does not receive ACK 1919, base station 1901 can perform a beam switch 1921 to switch communication back to first beam set 1905. In other words, if UE 1903 is not communicating via second beam set 1909 after switch time 1911, base station 1901 can assume that UE 1903 did not receive BSM 1907 and is, therefore, still communicating via first beam set 1905. After beam switch 1921, base station 1901 can transmit a signal 1923 to UE 1903 via first beam set 1905 and monitor for an ACK. UE 1903 may or may not transmit an ACK 1925. If base station 1901 receives ACK 1925, base station 1901 and UE 1903 can continue communication, as described above, on first beam set 1905 (i.e., the unknown beam set 1914 is now know to be first beam set 1905). However, if base station 1901 does not receive ACK 1925, base station 1901 can repeat the switching back and forth between the first and second beam sets, e.g., by performing a beam switch 1927, transmitting a signal 1929, and monitoring for an ACK 1931.

It should be noted that in some embodiments, base station 1901 might not transmit signal 1923 after switching back to first beam set 1905, because the probability can be high that UE 1903 did not switch beams and is, therefore, communicating on the first beam set. Thus, it may be more efficient for base station 1901 to simply continue normal communications when switching back to the first beam set after determining that UE 1903 did not switch beams. Furthermore, although the process performed after beam switch 1915 in FIG. 19 is similar to the process performed with respect to the example of FIG. 14, it should be understood that any of the forgoing methods of beam recovery after a planned beam switch could be implemented in the example of FIG. 19. For example, in some embodiments, after beam switch 1915, base station 1901 could perform a recovery process similar to the example of FIG. 17 to quickly switch between beam sets. In some embodiments, base station 1901 could determine a likelihood of delivery failure of BSM 1907 and determine if beam switch 1915 should be performed or if base station 1901 should continue to communicate via first beam set 1905, similar to the approach of FIG. 18. Other forms of beam recovery could be implemented, and various combinations could be implemented, in the example of FIG. 19.

Figure 20:
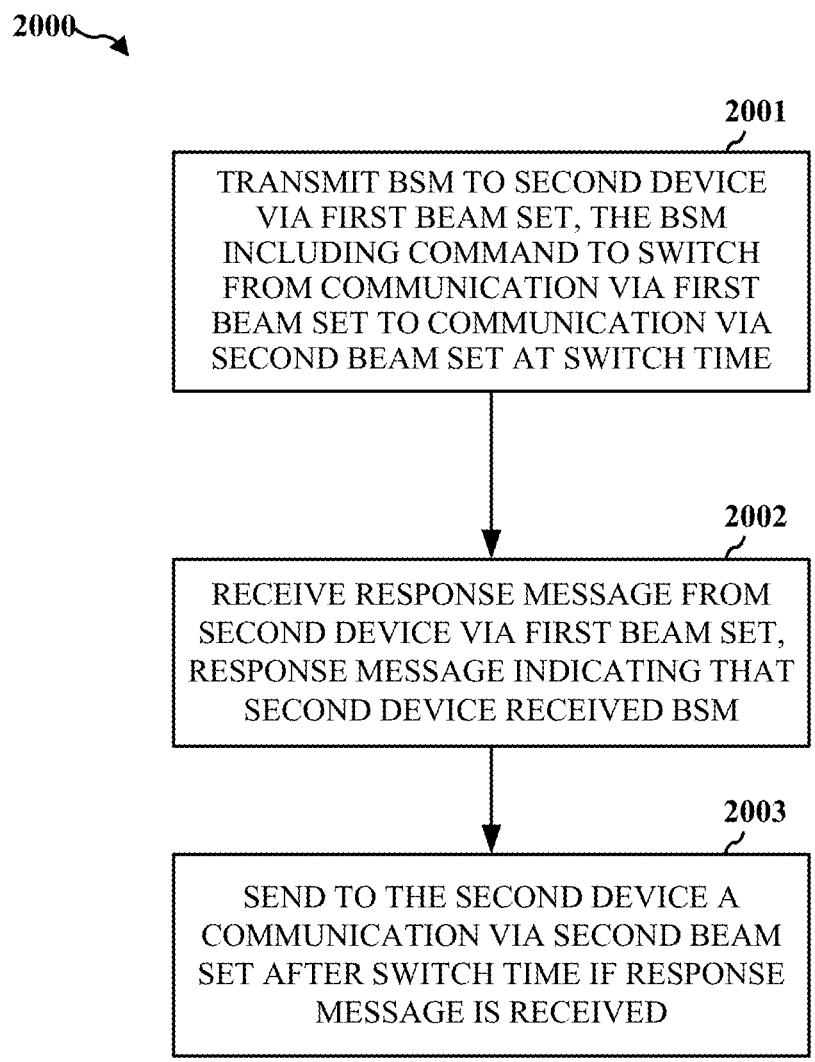
FIG. 20 is a flowchart illustrating an example method of wireless communication via multiple beams in accordance with various embodiments.

FIG. 20 is a flowchart 2000 illustrating an example method of wireless communication via multiple beams in accordance with various embodiments. A first device can transmit (2001) a BSM to a second device via a first beam set (such as a source beam set, also referred to simply as a source beam), the BSM including a command to switch from communication via the first beam set to communication via a second beam set (such as a target beam set, also referred to simply as a target beam) at a switch time. Referring to FIG. 6, for example, base station 601 can send BSM 607 to UE 603 via first beam set 605. The first device can receive (2002) a response message from the second device via the first beam set, the response message indicating that the second device received the BSM. For example, the first device can monitor for an acknowledgement message via the source beam and can determine whether an acknowledgement message is received. For example, base station 601 can monitor for ACK 615 at expected ACK time 613. The first device can send (2003), to the second device, a communication via the second beam set after the switch time if the response message is received.

Figure 21:
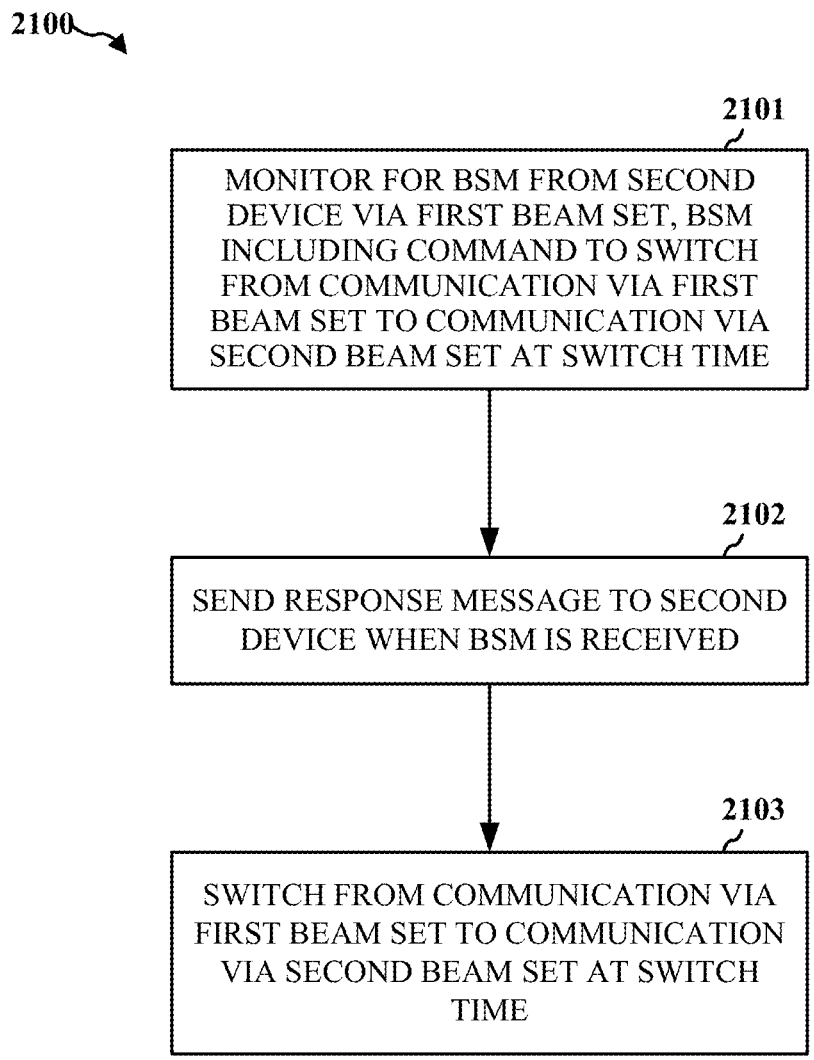
FIG. 21 is a flowchart illustrating an example method of wireless communication via multiple beams in accordance with various embodiments.

FIG. 21 is a flowchart 2100 illustrating an example method of wireless communication via multiple beams in accordance with various embodiments. A first device can monitor (2101) for a BSM from a second device via a first beam set, the BSM including a command to switch from communication via the first beam set to communication via a second beam set at a switch time. Referring to FIG. 6, for example, UE 603 can monitor for BSM 607 to from base station 601 via first beam set 605. The first device can send (2102) send a response message to the second device when the BSM is received. For example, UE 603 can send ACK 615 at expected ACK time 613. The first device can switch (2103) switch from communication via the first beam set to communication via the second beam set at the switch time. For example, UE 603 can perform beam switch 617.

Figure 22:
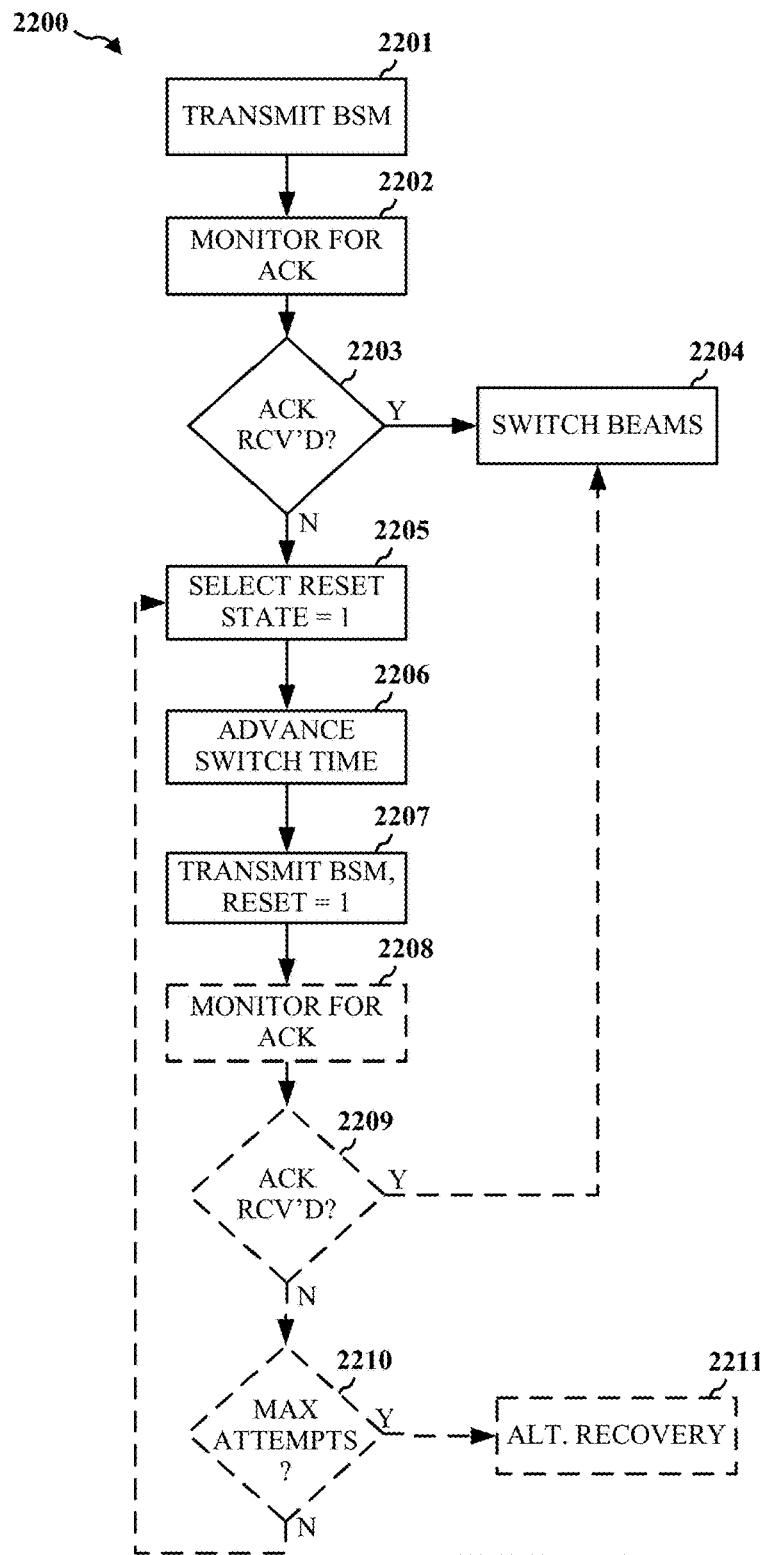
FIG. 22 is a flowchart illustrating an example method of wireless communication via multiple beams in accordance with various embodiments.

FIG. 22 is a flowchart 2200 illustrating an example method of wireless communication via multiple beams in accordance with various embodiments. A first device can transmit (2201) a first BSM to a second device. The first BSM can include a first instruction for switching beams. Referring to FIG. 11A, for example, base station 1101 can transmit BSM 1105 to UE 1103, and the BSM can instruct the UE to execute planned beam switch 1107 at a particular switch time. The first device can monitor (2202) for an ACK from the second device, the ACK acknowledging receipt of the BSM. For example, base station 1101 monitors for an ACK at expected ACK time 1109. The first device can determine (2203) if an ACK is received. If an ACK is received, the first device can switch beams (2204) in accordance with the BSM that the ACK is in response to, which in this case is the first BSM.

However, if the first device determines at 2203 that an ACK was not received, the first device can select a reset state from a plurality of reset states including a first state for the second device to disregard the first instruction and a second state for the second device to maintain execution of the first instruction. For example, the first device can select (2205) a reset state of 1, which can indicate that the second device should disregard the beam switch instruction of the first BSM. The first device can also advance (2206) the switch time to a later time, which can allow the beam switch to occur after the first device receives an ACK from the second device, for example. The first device can transmit a second BSM to the second device before the second device completes execution of the first instruction. The second BSM can include a second instruction for switching beams and can indicate which of the reset states is selected. For example, the first device can transmit (2207) the second BSM indicating a reset state of 1 and indicating the advanced switch time. Referring to FIG. 11B, for example, base station 1101 can transmit BSM 1113, which indicates to disregard planned beam switch 1107 and to execute new beam switch 1115 at the later time shown in the figure. Base station 1101 can transmit BSM 1113 before the time that planned beam switch 1107 is scheduled to be executed, which is shown as subframe 9 in FIG. 11A. Therefore, BSM 1113 is transmitted before UE 1103 completes execution of the first instruction, i.e., the beam switch instruction in BSM 1105.

The first device can again monitor (2208) for an ACK and determine (2209) whether an ACK is received. If an ACK to the second BSM is received, the first device can switch beams (2204) in accordance with the BSM that the ACK is in response to, which in this case is the second BSM. However, if the first device determines at 2209 that an ACK was not received, the first device can determine (2210) whether a maximum number of attempts at beam recovery have been performed. In other words, the first device might limit the number of attempts of sending BSMs with reset of 1 and advanced switch time. For example, the first device might try sending a maximum of 10 such BSMs. If the first device determines at 2210 that the maximum number of attempts has been tried, the first device can attempt (2211) an alternative recovery procedure. However, if the first device determines at 2210 that the maximum number of attempts has not been tried, the process can proceed to 2205 to repeat selecting (2205) the reset state of 1, advancing (2206) the switch time, transmitting (2207) the BSM, monitoring (2208) for an ACK, and determining (2209) whether an ACK is received. For example, as shown in FIGS. 11B-C, base station 1101 can transmit BSM 1123 after failing to receive an ACK from UE 1103 at expected ACK time 1119.

Figure 23:
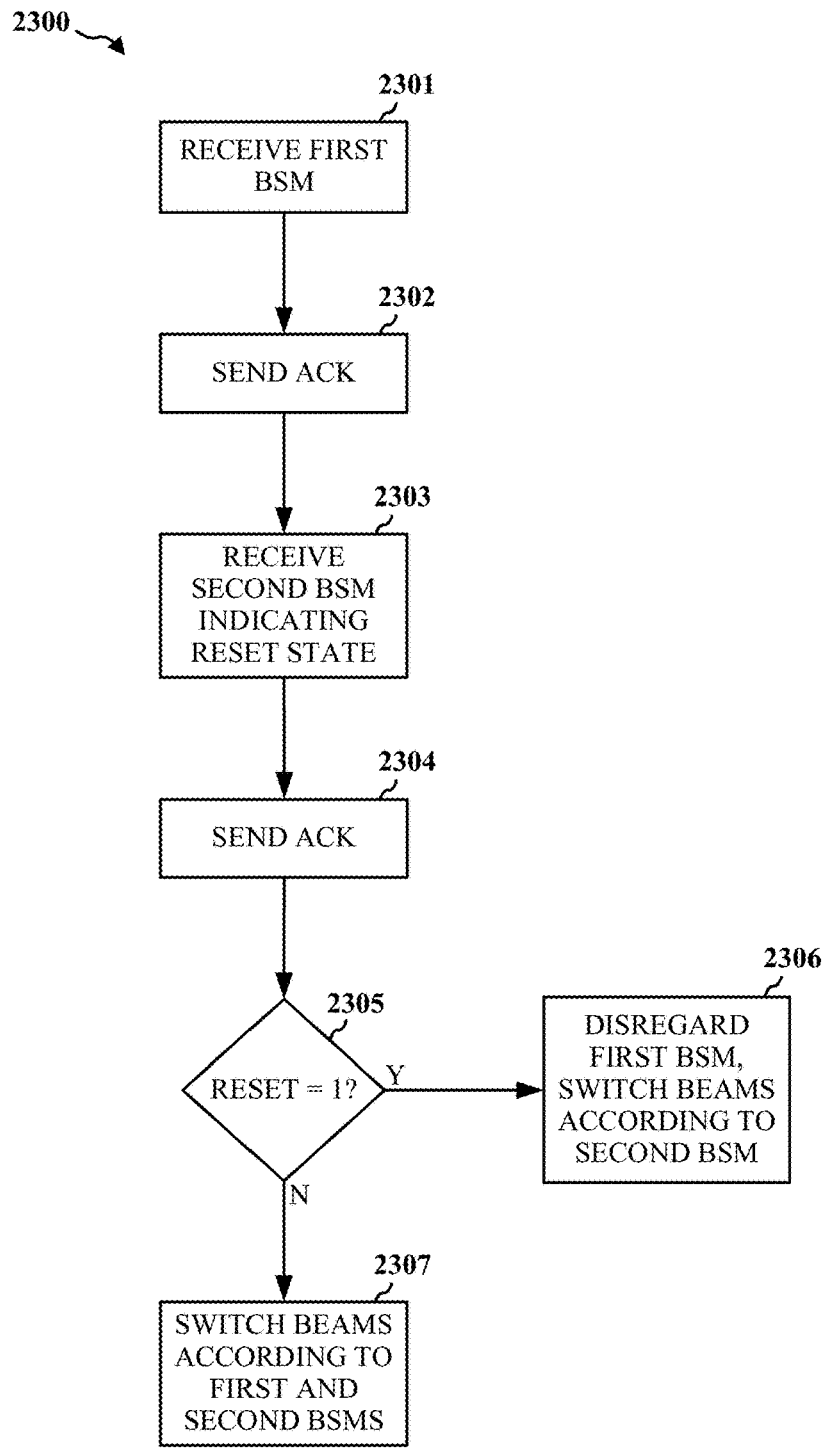
FIG. 23 is a flowchart illustrating an example method of wireless communication via multiple beams in accordance with various embodiments.

FIG. 23 is a flowchart 2300 illustrating an example method of wireless communication via multiple beams in accordance with various embodiments. A first device can receive (2301) a first BSM from a second device and can send (2302) an acknowledgement message. The first BSM can include a first instruction for switching beams. Referring to FIG. 10A, for example, UE 1003 can receive BSM 1005 from base station 1001 and can send ACK 1009 to base station 1001. The first device can receive (2303) a second BSM from the second device, the second BSM including a second instruction for switching beams and indicating a reset state associated with the first BSM. Referring to FIGS. 10B-C, for example, UE 1003 can receive a second BSM, i.e., BSM 1011 (indicating a first reset state, which is to disregard the beam switch instruction of BSM 1005) or BSM 1019 (indicating a second reset state, which is to maintain execution of the beam switch instruction of BSM 1005). The first device can send (2304) an acknowledgement message. In FIGS. 10B-C, for example, UE 1003 can send ACK 1015 or ACK 1023.

The first device can determine whether to disregard the first instruction or to maintain execution of the first instruction based on the indicated reset state. For example, the first device can determine (2305) which selected reset state the second BSM indicates. In FIG. 10B, for example, UE 1003 determines that BSM 1011 indicates the first reset state, e.g., reset state=1. On the other hand, in FIG. 10C, UE 1003 determines that BSM 1019 indicates the second reset state, e.g., reset state=0. If the indicated reset state is 1, for example, the first device can disregard (2306) the beam switch instruction of the first BSM and can switch beams according to the beam switch instruction of the second BSM. In FIG. 10B, for example, UE 1003 disregards planned beam switch 1007 (i.e., disregarded beam switch 1017) and executes only new beam switch 1013. On the other hand, if the indicated reset state is 0, for example, the first device can switch beams (2307) according to the instructions of the first and second BSMs. In FIG. 10C, for example, UE 1003 executes both planned beam switch 1007 and added beam switch 1021.

Figure 24:
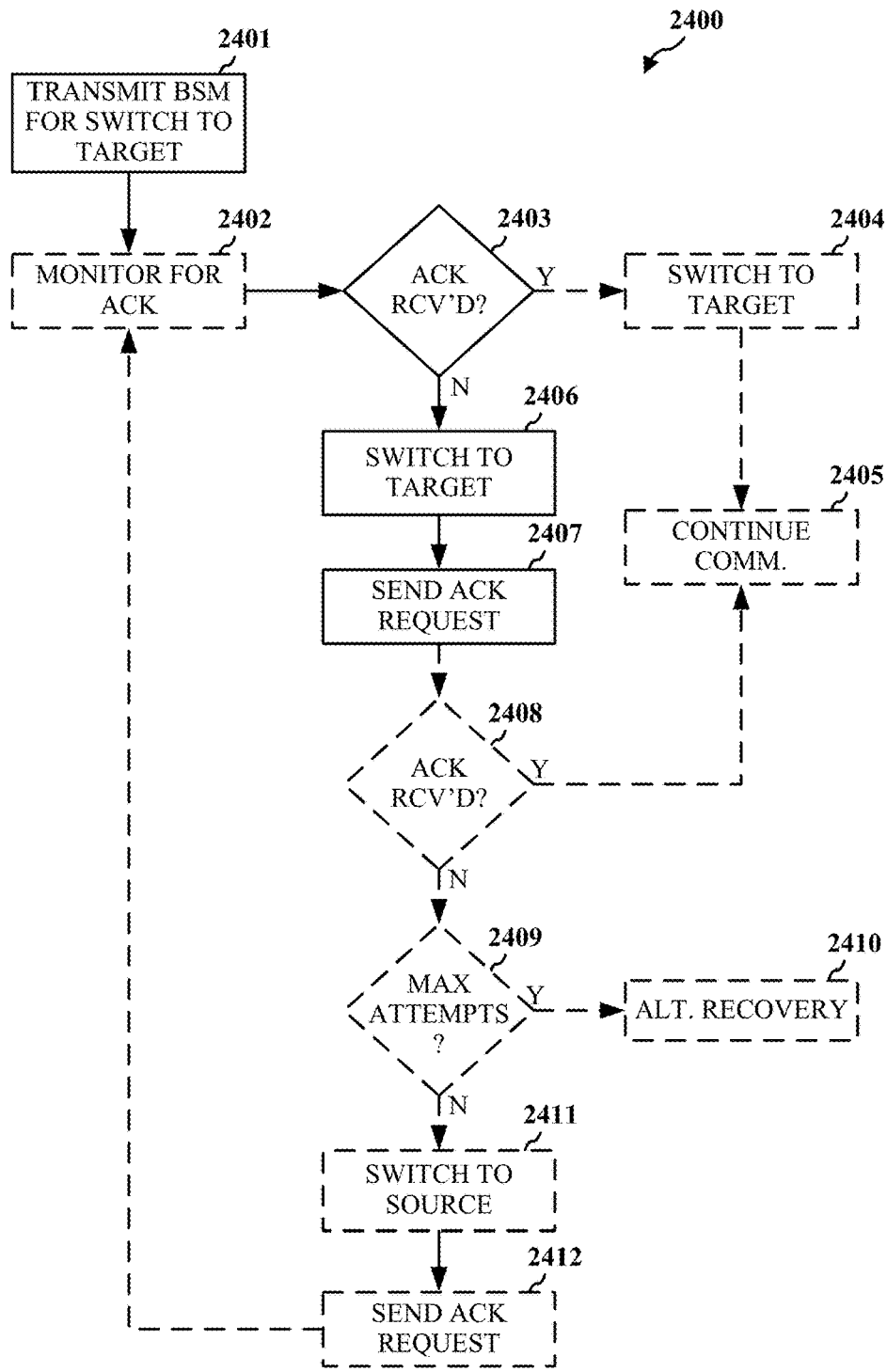
FIG. 24 is a flowchart illustrating an example method of wireless communication via multiple beams in accordance with various embodiments.

FIG. 24 is a flowchart 2400 illustrating an example method of wireless communication via multiple beams in accordance with various embodiments. A first device can transmit (2401) a BSM to a second device via a first beam set (such as a source beam set, also referred to simply as a source beam), the BSM including a command to switch from communication via the first beam set to communication via a second beam set (such as a target beam set, also referred to simply as a target beam) at a switch time. Referring to FIG. 14, for example, base station 1401 can send BSM 1407 to UE 1403 via first beam set 1405. The first device can determine whether a response message is received from the second device via the first beam set, the response message indicating that the second device received the BSM. For example, the first device can monitor (2402) for an acknowledgement message via the source beam and can determine (2403) whether an acknowledgement message is received. For example, base station 1401 can monitor for a ACK at expected ACK time 1413. If a response message, such as an ACK, is received the first device can switch (2404) beams to the target beam at the switch time and can continue (2405) to communicate with the second device.

If a response message is unreceived, the first device can still switch (2406) beams to the target beam at the switch time. For example, base station 1401 can execute beam switch 1415 at switch time 1411 to switch to communication via second beam set 1409. The first device can then send, to the second device, a communication via the target beam after the switch time. For example, the first device can send (2407) an ACK request to the second device via the target beam. In FIG. 14, for example, base station 1401 can send signal 1417 via second beam set 1409. The first device can monitor (2408) for an ACK via the target beam and, if an ACK is received can continue (2405) communications with the second device via the target beam. On the other hand, if an ACK is not received via the target beam, the first device can determine (2409) whether a maximum number of attempts at beam recovery have been performed. In other words, the first device might limit the number of attempts of switching beams and sending ACK requests. For example, the first device might try switching beams a maximum of 10 times. If the first device determines at 2409 that the maximum number of attempts has been tried, the first device can attempt (2410) an alternative recovery procedure. However, if the first device determines at 2409 that the maximum number of attempts has not been tried, the first device can switch beams (2411) to the source beam and can send (2412) an ACK request via the source beam, and the process can proceed to 2402 to monitor for an ACK. For example, base station 1401 can execute beam switch 1421 to switch back to first beam set 1405 and can send signal 1423 via the first beam set. In this way, for example, the first device can simply proceed with the planned beam switch even though an ACK to the BSM is unreceived, which may potentially avoid time-consuming beam recovery procedures.

Figure 25:
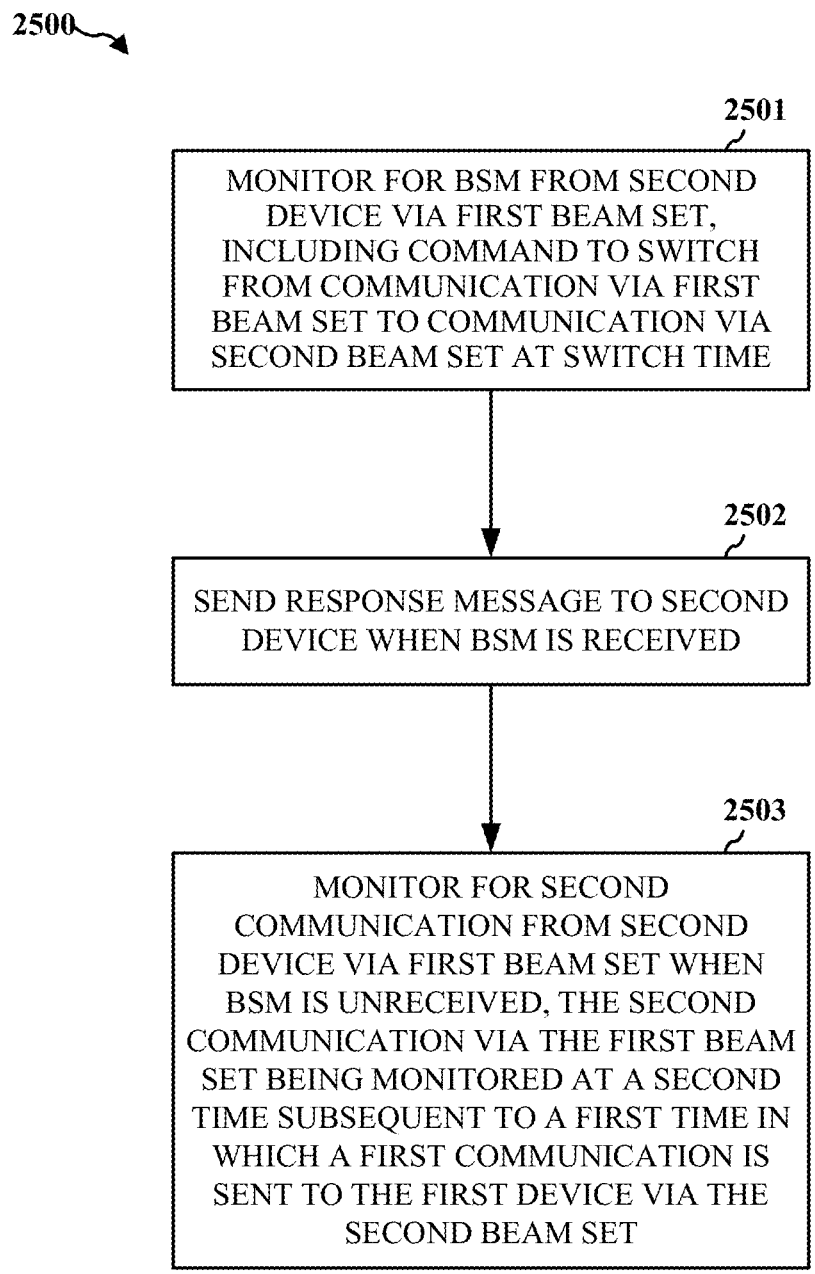
FIG. 25 is a flowchart illustrating an example method of wireless communication via multiple beams in accordance with various embodiments.

FIG. 25 is a flowchart 2500 illustrating an example method of wireless communication via multiple beams in accordance with various embodiments. A first device can monitor (2501) for a BSM from a second device via a first beam set, the BSM including a command to switch from communication via the first beam set to communication via a second beam set at a switch time. The first device can send (2502) a response message to the second device when the BSM is received and can monitor (2503) for a second communication from the second device via the first beam set when the BSM is unreceived. The second communication via the first beam set can be monitored at a second time subsequent to a first time in which a first communication is sent to the first device via the second beam set. Referring to FIGS. 15 and 16, for example, UE 1503 and UE 1603 can monitor for BSMs. FIG. 15 illustrates when BSM 1507 is received, UE 1503 can send a response message, i.e., ACK 1525. On the other hand, FIG. 16 illustrates when BSM 1607 is unreceived, UE 1603 can monitor for a second communication, i.e., signal 1623, at a time subsequent to the time a first communication, i.e., signal 1617, is sent via second beam set 1609.

Figure 26:
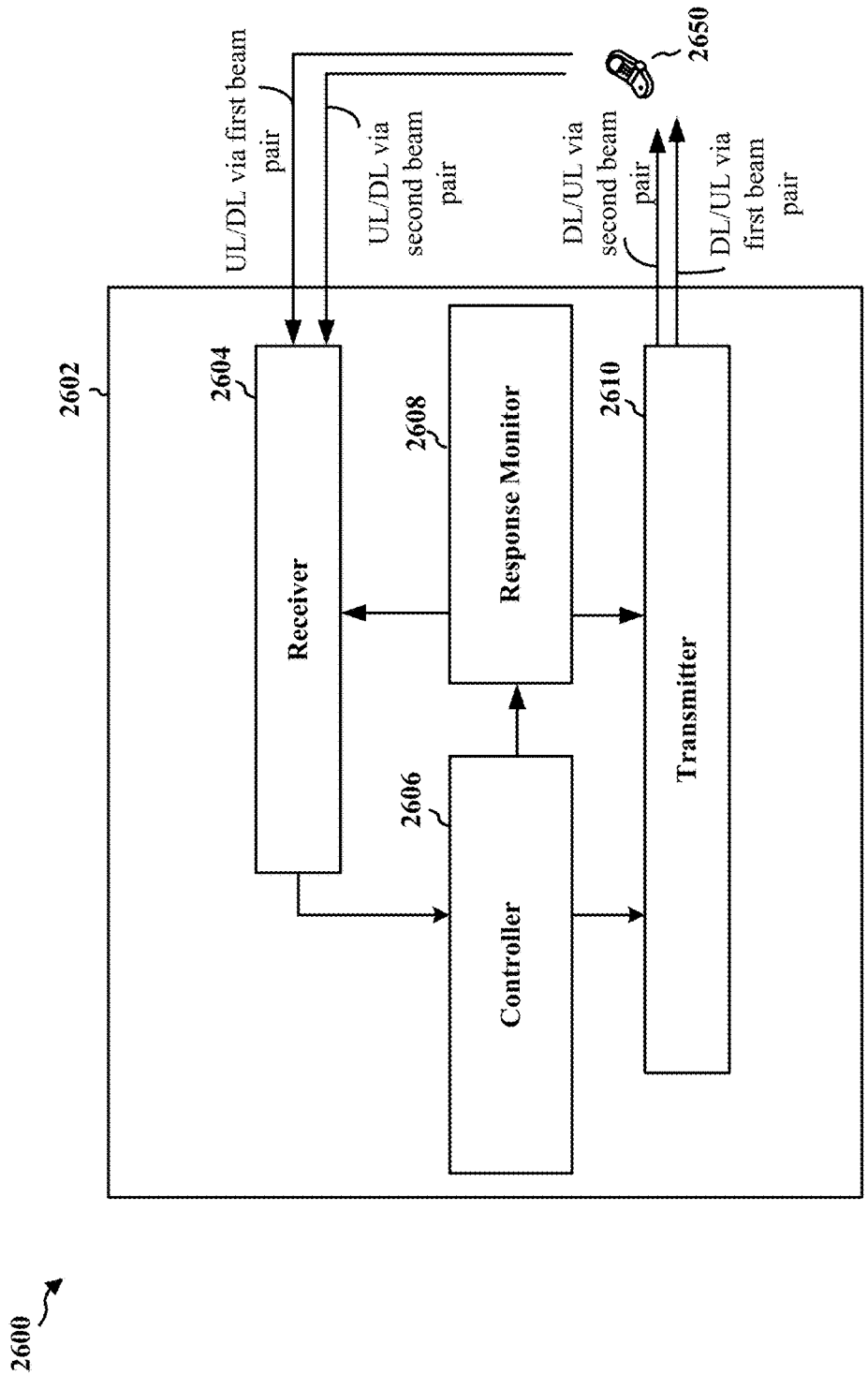
FIG. 26 is a conceptual data flow diagram illustrating the data flow between different means/components in an exemplary apparatus.

FIG. 26 is a conceptual data flow diagram 2600 illustrating the data flow between different means/components in an exemplary apparatus 2602. The apparatus may be a base station, for example. The apparatus includes a receiver 2604 that receives signals, a controller 2606 that controls various functions of apparatus 2602, a response monitor 2608 that monitors for a response, and a transmitter 2610 that transmits signals. For example, UL/DL signals can be received from and transmitted to an apparatus 2650 via first and second beam pairs. Apparatus 2650 can be a UE, for example. Response monitor 2608 can, for example, determine whether a response message is received from apparatus 2650 via a first beam set, the response message indicating that apparatus 2650 received a BSM sent by apparatus 2602. Transmitter 2610 can, for example, send to apparatus 2650, a communication via a second beam set after a switch time when the response message is received.

The apparatus may include additional components that perform each of the blocks of the algorithm in the aforementioned flowchart of FIG. 20. As such, each block in the aforementioned flowchart of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 27:
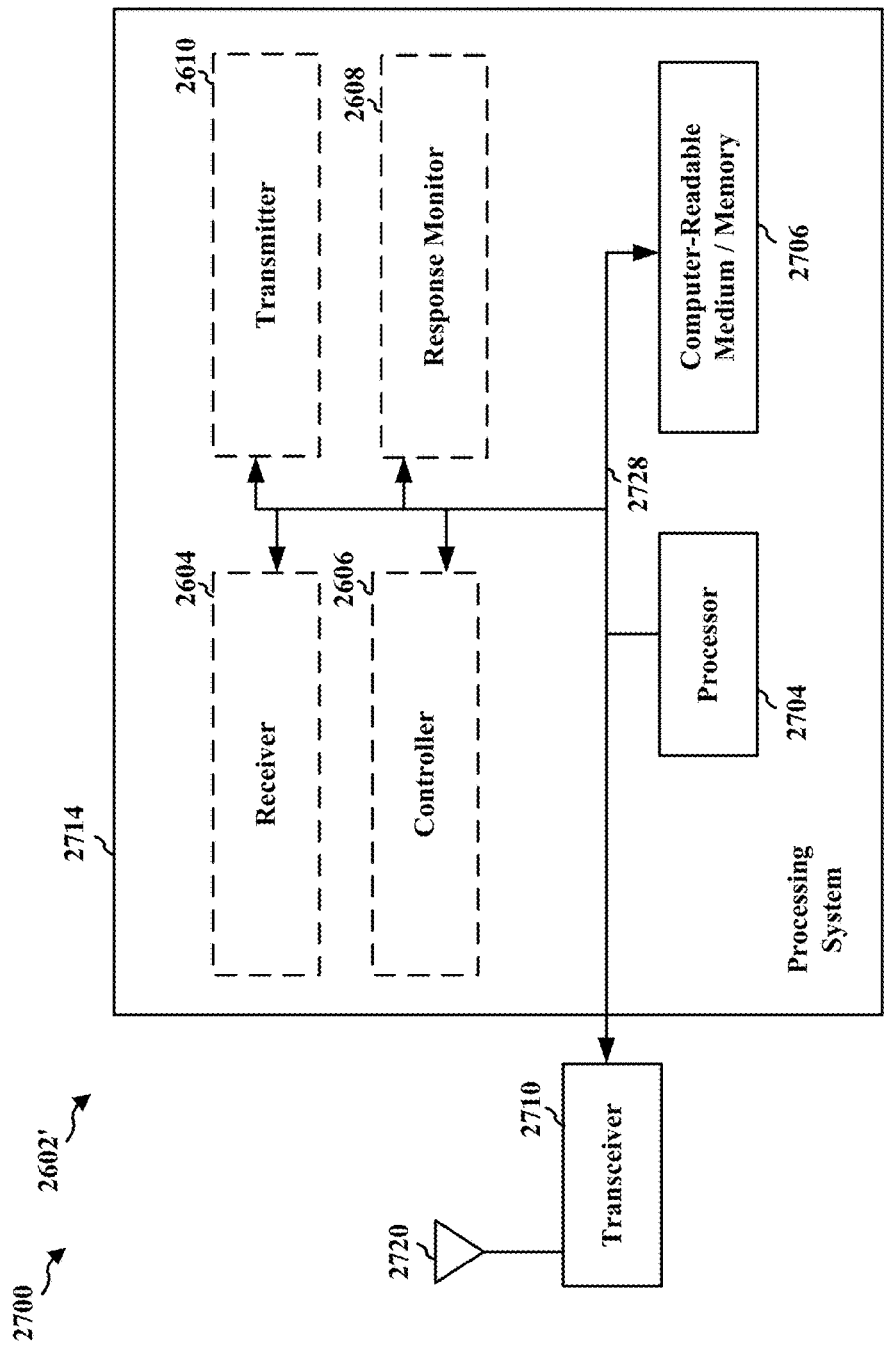
FIG. 27 is a diagram illustrating an example of a hardware implementation for an apparatus employing a processing system.

FIG. 27 is a diagram 2700 illustrating an example of a hardware implementation for an apparatus 2602' employing a processing system 2714. The processing system 2714 may be implemented with a bus architecture, represented generally by the bus 2724. The bus 2724 may include any number of interconnecting buses and bridges depending on the specific application of the processing system 2714 and the overall design constraints. The bus 2724 links together various circuits including one or more processors and/or hardware components, represented by the processor 2704, the components 2604, 2606, 2608, 2610, and the computer-readable medium/memory 2706. The bus 2724 may also link various other circuits such as timing sources, peripherals, voltage regulators, and power management circuits, which are well known in the art, and therefore, will not be described any further.

The processing system 2714 may be coupled to a transceiver 2710. The transceiver 2710 is coupled to one or more antennas 2720. The transceiver 2710 provides a means for communicating with various other apparatus over a transmission medium. The transceiver 2710 receives a signal from the one or more antennas 2720, extracts information from the received signal, and provides the extracted information to the processing system 2714, specifically the receiver 2604. In addition, the transceiver 2710 receives information from the processing system 2714, specifically the transmitter 2610, and based on the received information, generates a signal to be applied to the one or more antennas 2720. The processing system 2714 includes a processor 2704 coupled to a computer-readable medium/memory 2706. The processor 2704 is responsible for general processing, including the execution of software stored on the computer-readable medium/memory 2706. The software, when executed by the processor 2704, causes the processing system 2714 to perform the various functions described supra for any particular apparatus. The computer-readable medium/memory 2706 may also be used for storing data that is manipulated by the processor 2704 when executing software. The processing system 2714 further includes at least one of the components 2604, 2606, 2608, 2610. The components may be software components running in the processor 2704, resident/stored in the computer readable medium/memory 2706, one or more hardware components coupled to the processor 2704, or some combination thereof. The processing system 2714 may be a component of the base station 310 and may include the memory 376 and/or at least one of the TX processor 316, the RX processor 370, and the controller/processor 375.

In one configuration, the apparatus 2602/2602' for wireless communication includes means for transmitting a BSM to a second device via a first beam set, the BSM including a command to switch from communication via the first beam set to communication via a second beam set at a switch time, means for receiving a response message from the second device via the first beam set, the response message indicating that the second device received the BSM, and means for sending, to the second device, a communication via the second beam set after the switch time if the response message is received. The aforementioned means may be one or more of the aforementioned components of the apparatus 2602 and/or the processing system 2714 of the apparatus 2602' configured to perform the functions recited by the aforementioned means. As described supra, the processing system 2714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 28:
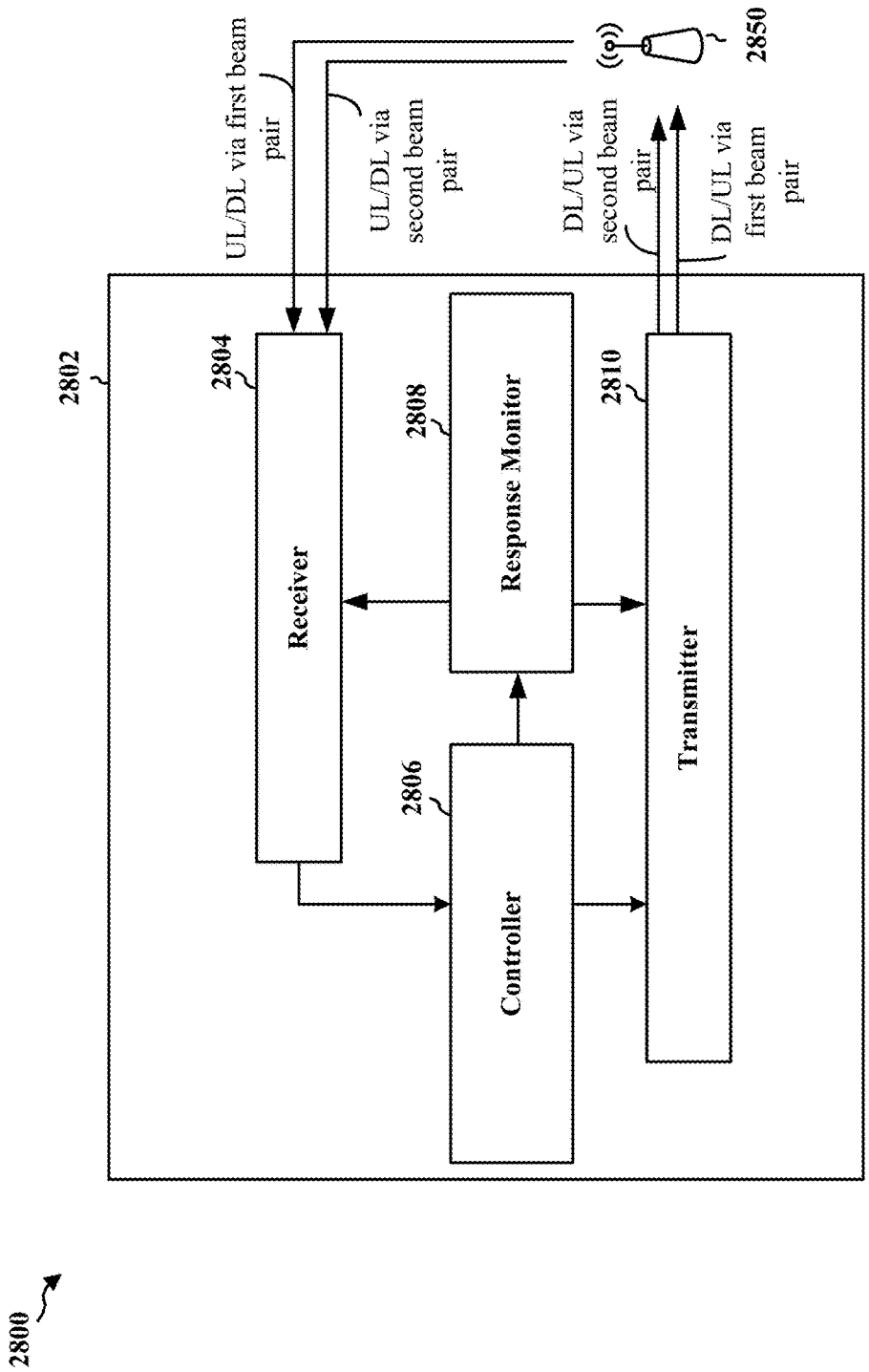
FIG. 28 is a conceptual data flow diagram illustrating the data flow between different means/components in an exemplary apparatus.

FIG. 28 is a conceptual data flow diagram 2800 illustrating the data flow between different means/components in an exemplary apparatus 2802. The apparatus may be a UE, for example. The apparatus includes a receiver 2804 that receives signals, a controller 2806 that controls various functions of apparatus 2802, a response monitor 2808 that monitors for a response, and a transmitter 2810 that transmits signals. For example, UL/DL signals can be received from and transmitted to an apparatus 2850 via first and second beam pairs. Apparatus 2850 can be a base station, for example. Response monitor 2808 can, for example, monitor for a BSM from apparatus 2850 via a first beam set, the BSM including a command to switch from communication via the first beam set to communication via a second beam set at a switch time, can send a response message to apparatus 2850 via the first beam set when the BSM is received, and can switch from communication via the first beam set to communication via the second beam set at the switch time.

The apparatus may include additional components that perform each of the blocks of the algorithm in the aforementioned flowchart of FIG. 21. As such, each block in the aforementioned flowchart of FIG. 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 29:
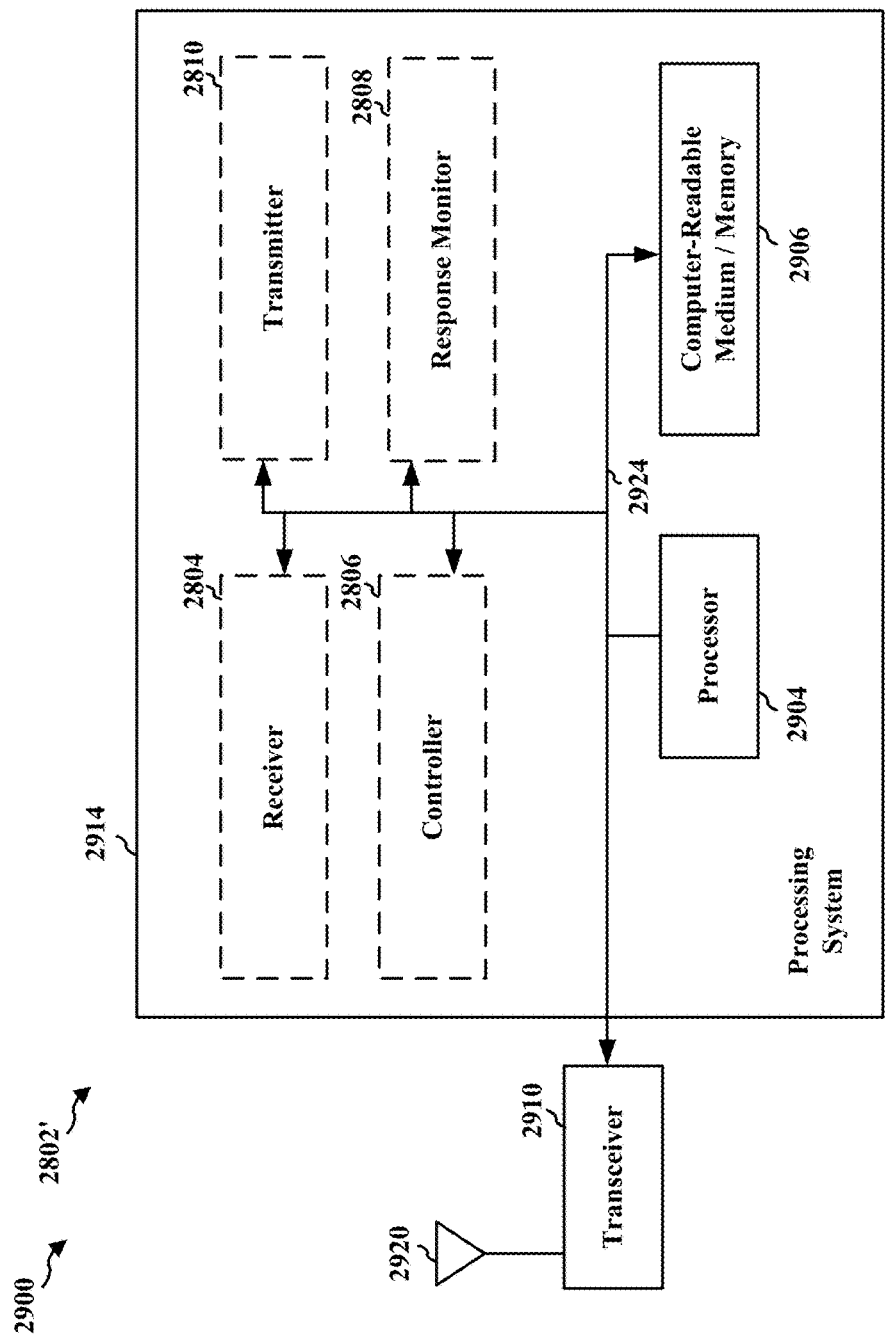
FIG. 29 is a diagram illustrating an example of a hardware implementation for an apparatus employing a processing system.

FIG. 29 is a diagram 2900 illustrating an example of a hardware implementation for an apparatus 2802' employing a processing system 2914. The processing system 2914 may be implemented with a bus architecture, represented generally by the bus 2924. The bus 2924 may include any number of interconnecting buses and bridges depending on the specific application of the processing system 2914 and the overall design constraints. The bus 2924 links together various circuits including one or more processors and/or hardware components, represented by the processor 2904, the components 2804, 2806, 2808, 2810, and the computer-readable medium/memory 2906. The bus 2924 may also link various other circuits such as timing sources, peripherals, voltage regulators, and power management circuits, which are well known in the art, and therefore, will not be described any further.

The processing system 2914 may be coupled to a transceiver 2910. The transceiver 2910 is coupled to one or more antennas 2920. The transceiver 2910 provides a means for communicating with various other apparatus over a transmission medium. The transceiver 2910 receives a signal from the one or more antennas 2920, extracts information from the received signal, and provides the extracted information to the processing system 2914, specifically the receiver 2804. In addition, the transceiver 2910 receives information from the processing system 2914, specifically the transmitter 2810, and based on the received information, generates a signal to be applied to the one or more antennas 2920. The processing system 2914 includes a processor 2904 coupled to a computer-readable medium/memory 2906. The processor 2904 is responsible for general processing, including the execution of software stored on the computer-readable medium/memory 2906. The software, when executed by the processor 2904, causes the processing system 2914 to perform the various functions described supra for any particular apparatus. The computer-readable medium/memory 2906 may also be used for storing data that is manipulated by the processor 2904 when executing software. The processing system 2914 further includes at least one of the components 2804, 2806, 2808, 2810. The components may be software components running in the processor 2904, resident/stored in the computer readable medium/memory 2906, one or more hardware components coupled to the processor 2904, or some combination thereof. The processing system 2914 may be a component of the UE 350 and may include the memory 360 and/or at least one of the TX processor 368, the RX processor 356, In one configuration, the apparatus 2802/2802' for wireless communication includes means for monitoring for a BSM from a second device via a first beam set, the BSM including a command to switch from communication via the first beam set to communication via a second beam set at a switch time, means for sending a response message to the second device when the BSM is received, and means for switching from communication via the first beam set to communication via the second beam set at the switch time. The aforementioned means may be one or more of the aforementioned components of the apparatus 2802 and/or the processing system 2914 of the apparatus 2802' configured to perform the functions recited by the aforementioned means. As described supra, the processing system 2914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 30:
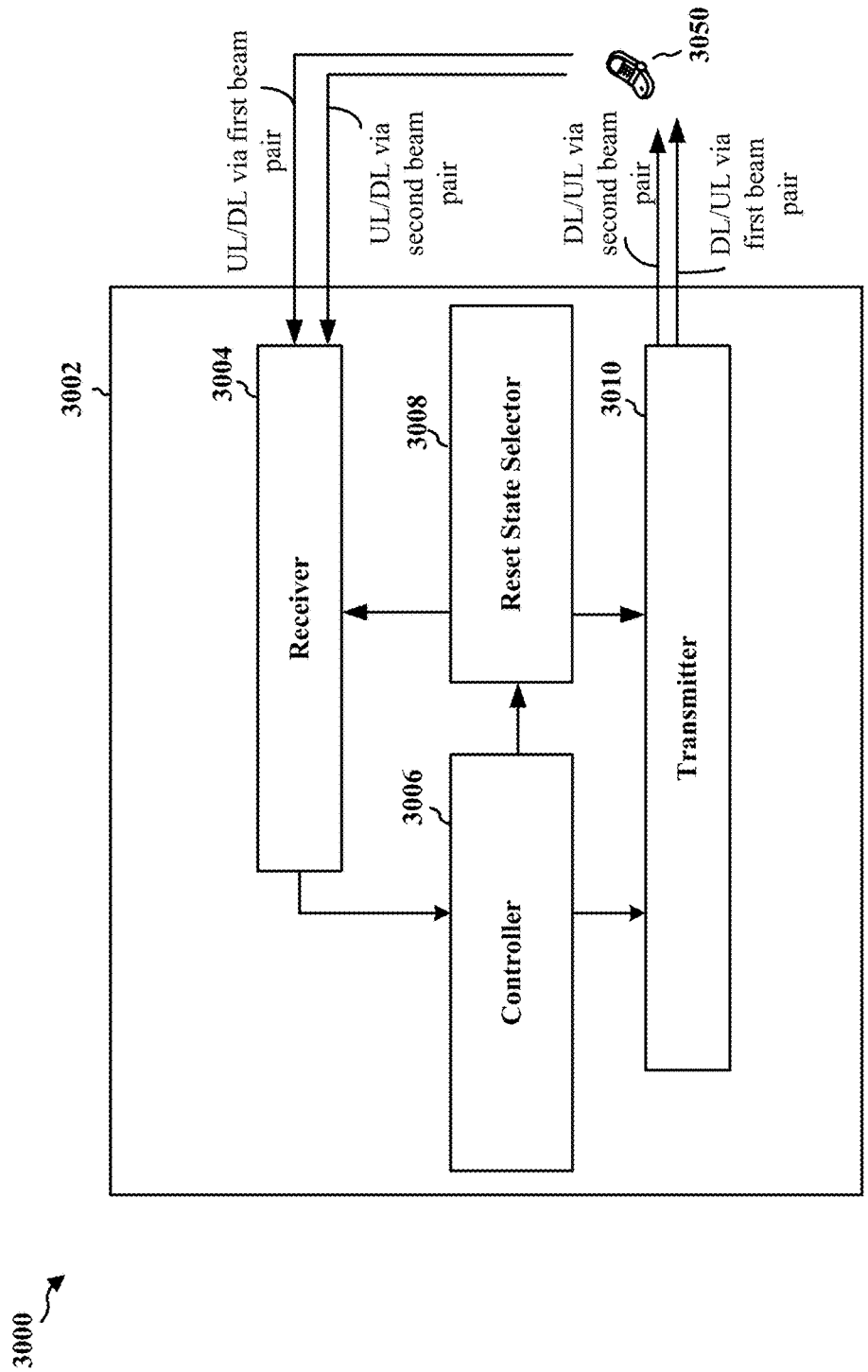
FIG. 30 is a conceptual data flow diagram illustrating the data flow between different means/components in an exemplary apparatus.

FIG. 30 is a conceptual data flow diagram 3000 illustrating the data flow between different means/components in an exemplary apparatus 3002. The apparatus may be a base station, for example. The apparatus includes a receiver 3004 that receives signals, a controller 3006 that controls various functions of apparatus 3002, a reset state selector 3008 that selects a reset state, and a transmitter 3010 that transmits signals. For example, UL/DL signals can be received from and transmitted to an apparatus 3050 via first and second beam pairs. Apparatus 3050 can be a UE, for example. Reset state selector 3008 can, for example, select a reset state from a plurality of reset states including a first state indicating to disregard a first beam switch instruction and a second state to maintain execution of the first instruction.

The apparatus may include additional components that perform each of the blocks of the algorithm in the aforementioned flowchart of FIG. 22. As such, each block in the aforementioned flowchart of FIG. 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 31:
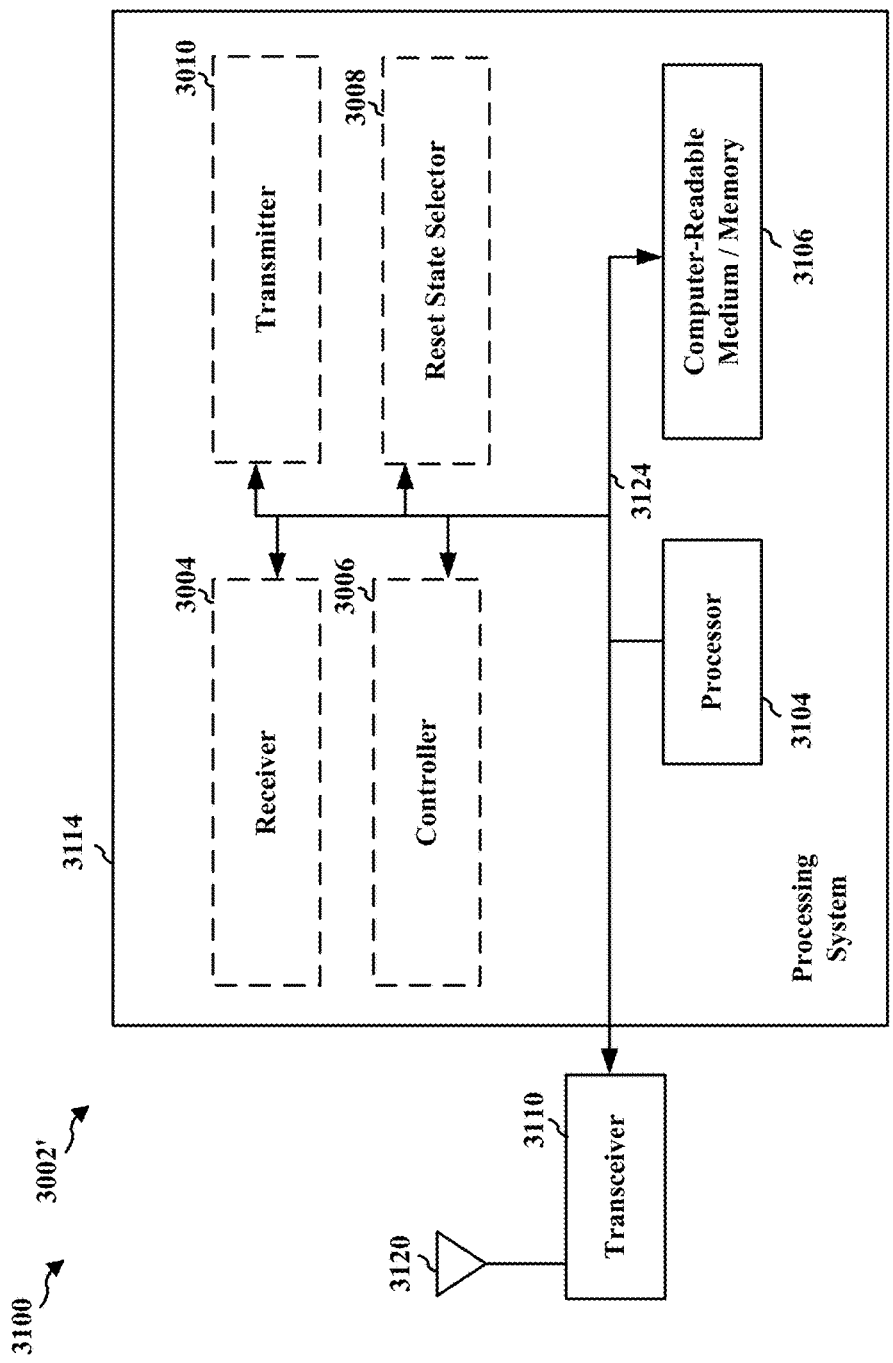
FIG. 31 is a diagram illustrating an example of a hardware implementation for an apparatus employing a processing system.

FIG. 31 is a diagram 3100 illustrating an example of a hardware implementation for an apparatus 3002' employing a processing system 3114. The processing system 3114 may be implemented with a bus architecture, represented generally by the bus 3124. The bus 3124 may include any number of interconnecting buses and bridges depending on the specific application of the processing system 3114 and the overall design constraints. The bus 3124 links together various circuits including one or more processors and/or hardware components, represented by the processor 3104, the components 3004, 3006, 3008, 3010, and the computer-readable medium/memory 3106. The bus 3124 may also link various other circuits such as timing sources, peripherals, voltage regulators, and power management circuits, which are well known in the art, and therefore, will not be described any further.

The processing system 3114 may be coupled to a transceiver 3110. The transceiver 3110 is coupled to one or more antennas 3120. The transceiver 3110 provides a means for communicating with various other apparatus over a transmission medium. The transceiver 3110 receives a signal from the one or more antennas 3120, extracts information from the received signal, and provides the extracted information to the processing system 3114, specifically the receiver 3004. In addition, the transceiver 3110 receives information from the processing system 3114, specifically the transmitter 3010, and based on the received information, generates a signal to be applied to the one or more antennas 3120. The processing system 3114 includes a processor 3104 coupled to a computer-readable medium/memory 3106. The processor 3104 is responsible for general processing, including the execution of software stored on the computer-readable medium/memory 3106. The software, when executed by the processor 3104, causes the processing system 3114 to perform the various functions described supra for any particular apparatus. The computer-readable medium/memory 3106 may also be used for storing data that is manipulated by the processor 3104 when executing software. The processing system 3114 further includes at least one of the components 3004, 3006, 3008, 3010. The components may be software components running in the processor 3104, resident/stored in the computer readable medium/memory 3106, one or more hardware components coupled to the processor 3104, or some combination thereof. The processing system 3114 may be a component of the base station 310 and may include the memory 376 and/or at least one of the TX processor 316, the RX processor 370, and the controller/processor 375.

In one configuration, the apparatus 3002/3002' for wireless communication includes means for transmitting a first BSM to a second device, the first BSM including a first instruction for switching beams, means for selecting a reset state from a plurality of reset states including a first state for the second device to disregard the first instruction and a second state for the second device to maintain execution of the first instruction, and means for transmitting a second BSM to the second device before the second device completes execution of the first instruction, the second BSM including a second instruction for switching beams and indicating which of the reset states is selected. The aforementioned means may be one or more of the aforementioned components of the apparatus 3002 and/or the processing system 3114 of the apparatus 3002' configured to perform the functions recited by the aforementioned means. As described supra, the processing system 3114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 32:
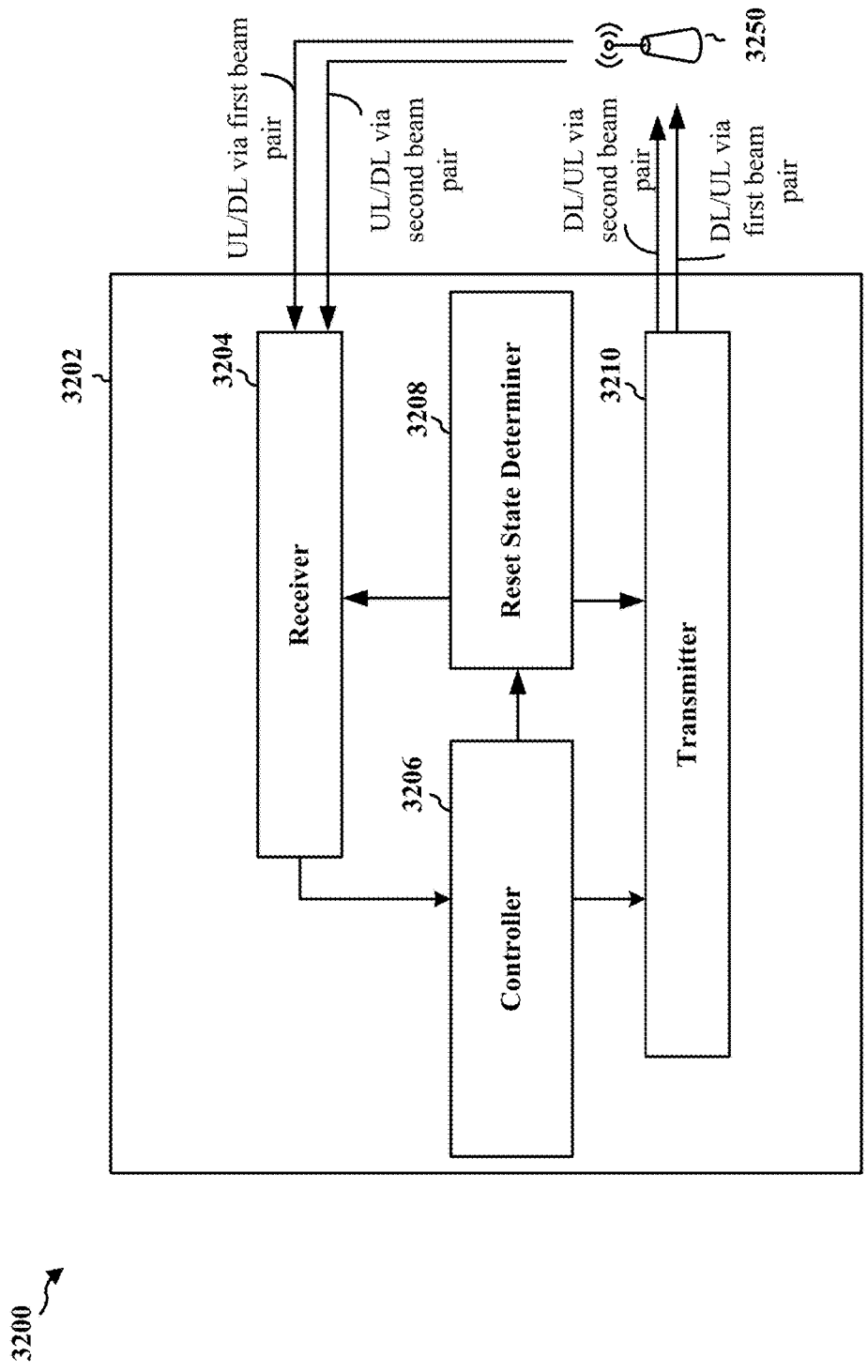
FIG. 32 is a conceptual data flow diagram illustrating the data flow between different means/components in an exemplary apparatus.

FIG. 32 is a conceptual data flow diagram 3200 illustrating the data flow between different means/components in an exemplary apparatus 3202. The apparatus may be a UE, for example. The apparatus includes a receiver 3204 that receives signals, a controller 3206 that controls various functions of apparatus 3202, a reset state determiner 3208 that determines a reset state, and a transmitter 3210 that transmits signals. For example, UL/DL signals can be received from and transmitted to an apparatus 3250 via first and second beam pairs. Apparatus 3250 can be a base station, for example. Reset state determiner 3208 can, for example, determine whether to disregard a first beam switch instruction or to maintain execution of the first beam switch instruction based on an indicated reset state of a BSM.

The apparatus may include additional components that perform each of the blocks of the algorithm in the aforementioned flowchart of FIG. 23. As such, each block in the aforementioned flowchart of FIG. 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 33:
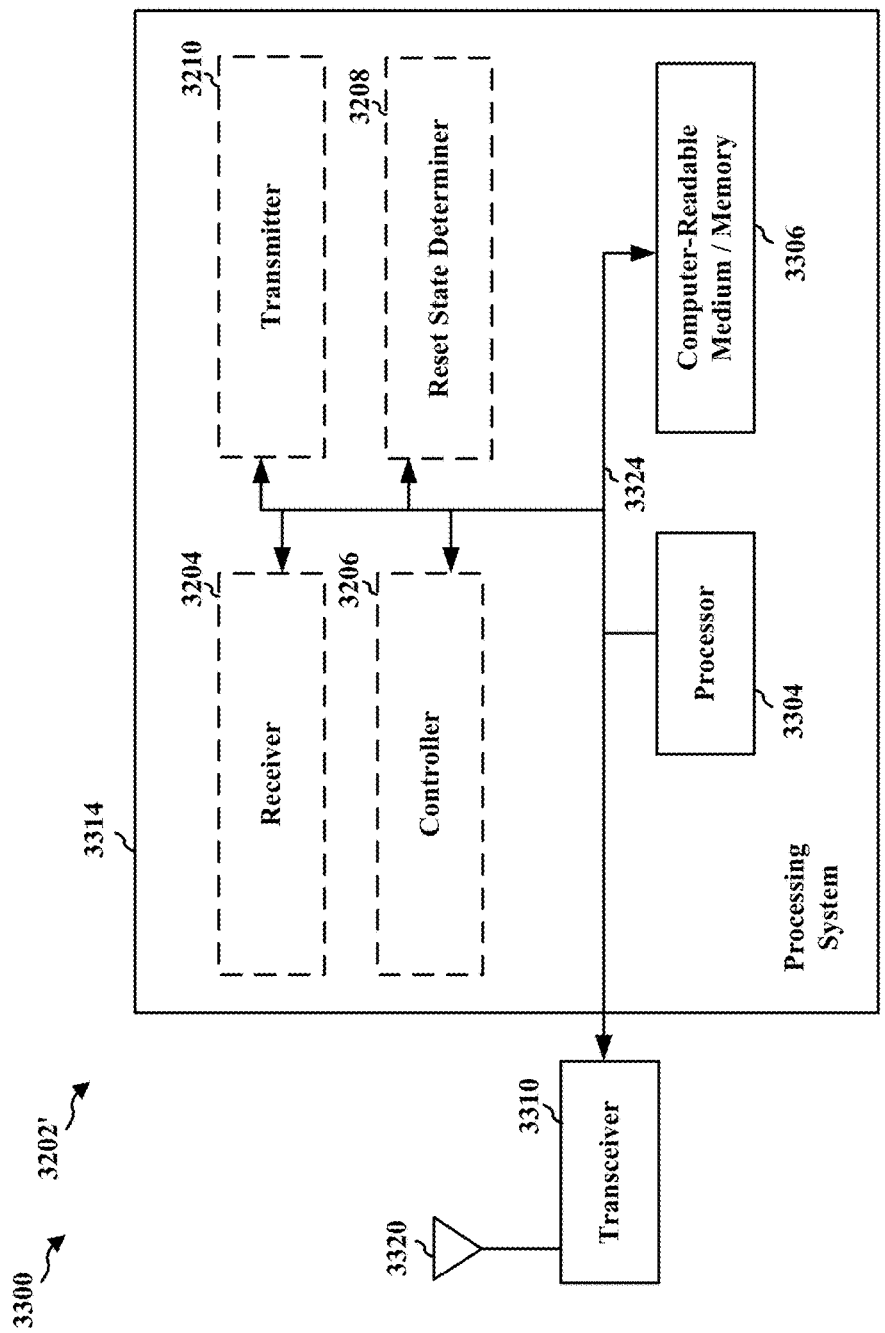
FIG. 33 is a diagram illustrating an example of a hardware implementation for an apparatus employing a processing system.

FIG. 33 is a diagram 3300 illustrating an example of a hardware implementation for an apparatus 3202' employing a processing system 3314. The processing system 3314 may be implemented with a bus architecture, represented generally by the bus 3324. The bus 3324 may include any number of interconnecting buses and bridges depending on the specific application of the processing system 3314 and the overall design constraints. The bus 3324 links together various circuits including one or more processors and/or hardware components, represented by the processor 3304, the components 3204, 3206, 3208, 3210, and the computer-readable medium/memory 3306. The bus 3324 may also link various other circuits such as timing sources, peripherals, voltage regulators, and power management circuits, which are well known in the art, and therefore, will not be described any further.

The processing system 3314 may be coupled to a transceiver 3310. The transceiver 3310 is coupled to one or more antennas 3320. The transceiver 3310 provides a means for communicating with various other apparatus over a transmission medium. The transceiver 3310 receives a signal from the one or more antennas 3320, extracts information from the received signal, and provides the extracted information to the processing system 3314, specifically the receiver 3204. In addition, the transceiver 3310 receives information from the processing system 3314, specifically the transmitter 3210, and based on the received information, generates a signal to be applied to the one or more antennas 3320. The processing system 3314 includes a processor 3304 coupled to a computer-readable medium/memory 3306. The processor 3304 is responsible for general processing, including the execution of software stored on the computer-readable medium/memory 3306. The software, when executed by the processor 3304, causes the processing system 3314 to perform the various functions described supra for any particular apparatus. The computer-readable medium/memory 3306 may also be used for storing data that is manipulated by the processor 3304 when executing software. The processing system 3314 further includes at least one of the components 3204, 3206, 3208, 3210. The components may be software components running in the processor 3304, resident/stored in the computer readable medium/memory 3306, one or more hardware components coupled to the processor 3304, or some combination thereof. The processing system 3314 may be a component of the UE 350 and may include the memory 360 and/or at least one of the TX processor 368, the RX processor 356, and the controller/processor 359.

In one configuration, the apparatus 3202/3202' for wireless communication includes means for receiving a second BSM from a second device, the second BSM including a second instruction for switching beams and indicating a reset state associated with a first BSM including a first instruction for switching beams, and means for determining whether to disregard the first instruction or to maintain execution of the first instruction based on the indicated reset state. The aforementioned means may be one or more of the aforementioned components of the apparatus 3202 and/or the processing system 3314 of the apparatus 3202' configured to perform the functions recited by the aforementioned means. As described supra, the processing system 3314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 34:
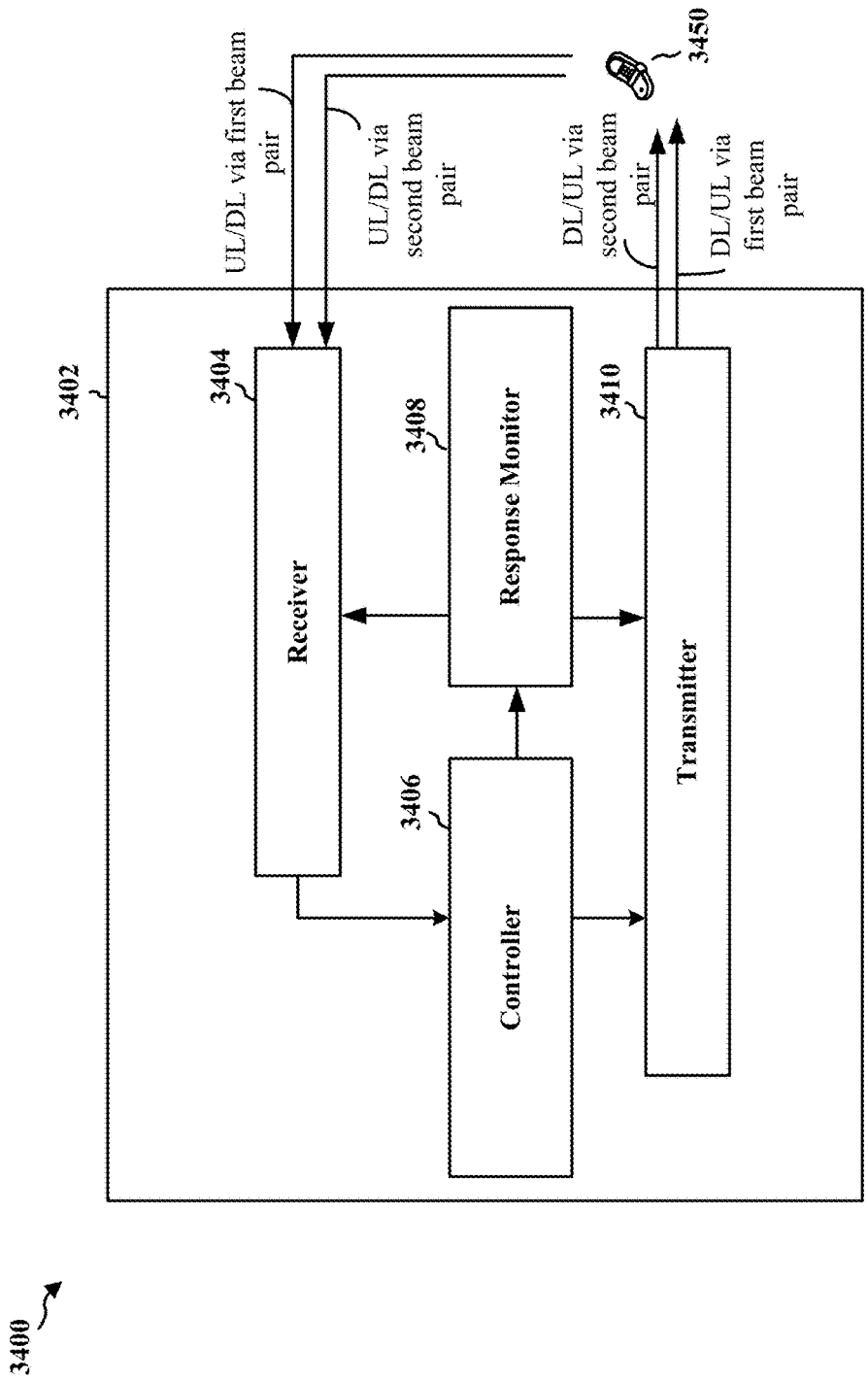
FIG. 34 is a conceptual data flow diagram illustrating the data flow between different means/components in an exemplary apparatus.

FIG. 34 is a conceptual data flow diagram 3400 illustrating the data flow between different means/components in an exemplary apparatus 3402. The apparatus may be a base station, for example. The apparatus includes a receiver 3404 that receives signals, a controller 3406 that controls various functions of apparatus 3402, a response monitor 3408 that monitors for a response, and a transmitter 3410 that transmits signals. For example, UL/DL signals can be received from and transmitted to an apparatus 3450 via first and second beam pairs. Apparatus 3450 can be a UE, for example. Response monitor 3408 can, for example, determine whether a response message is received from apparatus 3450 via a first beam set, the response message indicating that apparatus 3450 received a BSM sent by apparatus 3402. Transmitter 3410 can, for example, send to apparatus 3450, a communication via a second beam set after a switch time when the response message is unreceived.

The apparatus may include additional components that perform each of the blocks of the algorithm in the aforementioned flowchart of FIG. 24. As such, each block in the aforementioned flowchart of FIG. 24 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 35:
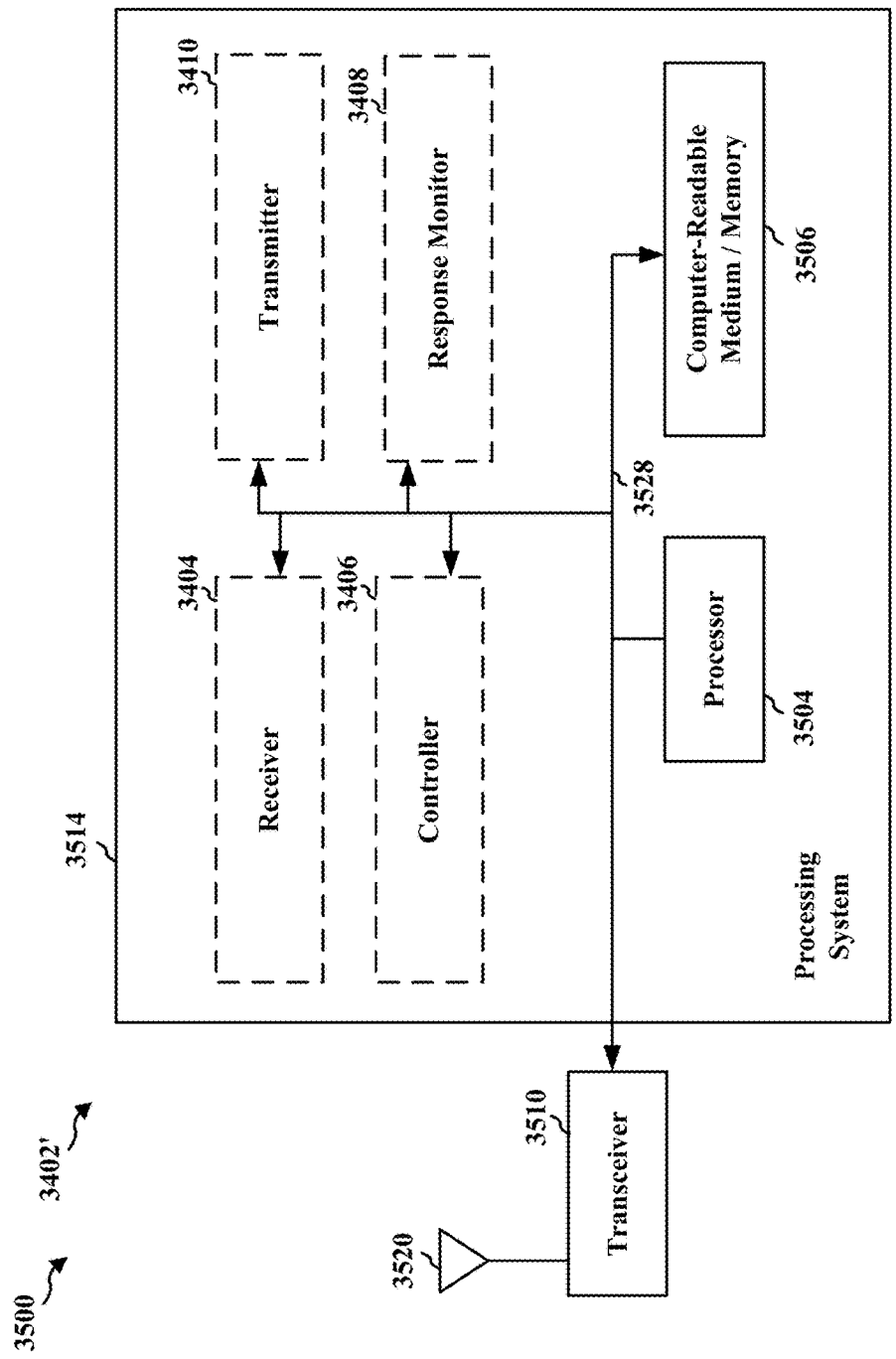
FIG. 35 is a diagram illustrating an example of a hardware implementation for an apparatus employing a processing system.

FIG. 35 is a diagram 3500 illustrating an example of a hardware implementation for an apparatus 3402' employing a processing system 3514. The processing system 3514 may be implemented with a bus architecture, represented generally by the bus 3524. The bus 3524 may include any number of interconnecting buses and bridges depending on the specific application of the processing system 3514 and the overall design constraints. The bus 3524 links together various circuits including one or more processors and/or hardware components, represented by the processor 3504, the components 3404, 3406, 3408, 3410, and the computer-readable medium/memory 3506. The bus 3524 may also link various other circuits such as timing sources, peripherals, voltage regulators, and power management circuits, which are well known in the art, and therefore, will not be described any further.

The processing system 3514 may be coupled to a transceiver 3510. The transceiver 3510 is coupled to one or more antennas 3520. The transceiver 3510 provides a means for communicating with various other apparatus over a transmission medium. The transceiver 3510 receives a signal from the one or more antennas 3520, extracts information from the received signal, and provides the extracted information to the processing system 3514, specifically the receiver 3404. In addition, the transceiver 3510 receives information from the processing system 3514, specifically the transmitter 3410, and based on the received information, generates a signal to be applied to the one or more antennas 3520. The processing system 3514 includes a processor 3504 coupled to a computer-readable medium/memory 3506. The processor 3504 is responsible for general processing, including the execution of software stored on the computer-readable medium/memory 3506. The software, when executed by the processor 3504, causes the processing system 3514 to perform the various functions described supra for any particular apparatus. The computer-readable medium/memory 3506 may also be used for storing data that is manipulated by the processor 3504 when executing software. The processing system 3514 further includes at least one of the components 3404, 3406, 3408, 3410. The components may be software components running in the processor 3504, resident/stored in the computer readable medium/memory 3506, one or more hardware components coupled to the processor 3504, or some combination thereof. The processing system 3514 may be a component of the base station 310 and may include the memory 376 and/or at least one of the TX processor 316, the RX processor 370, and the controller/processor 375.

In one configuration, the apparatus 3402/3402' for wireless communication includes means for transmitting a BSM to a second device via a first beam set, the BSM including a command to switch from communication via the first beam set to communication via a second beam set at a switch time, means for determining whether a response message is received from the second device via the first beam set, the response message indicating that the second device received the BSM, and means for sending, to the second device, a communication via the second beam set after the switch time when the response message is unreceived. The aforementioned means may be one or more of the aforementioned components of the apparatus 3402 and/or the processing system 3514 of the apparatus 3402' configured to perform the functions recited by the aforementioned means. As described supra, the processing system 3514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 36:
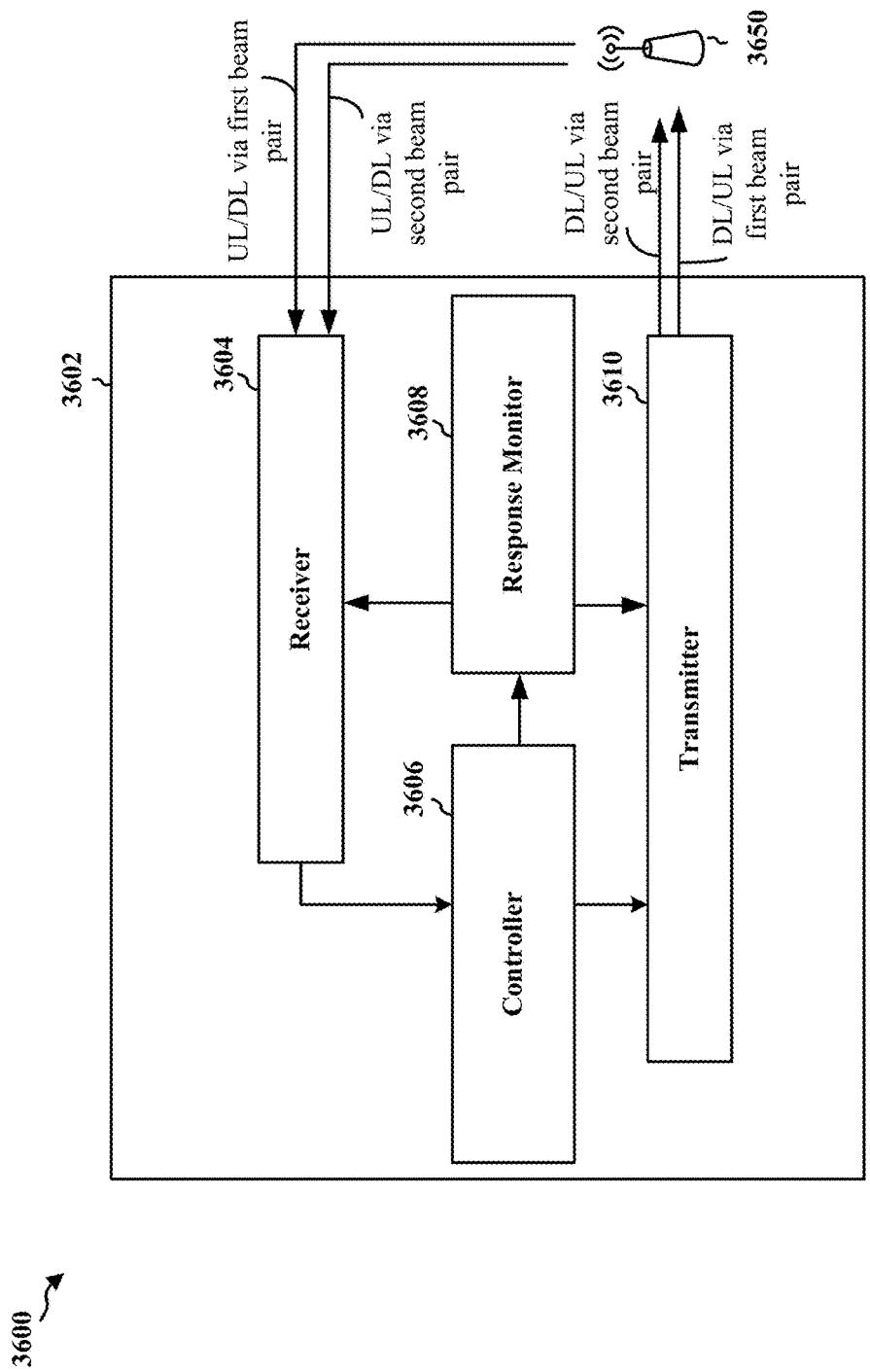
FIG. 36 is a conceptual data flow diagram illustrating the data flow between different means/components in an exemplary apparatus.

FIG. 36 is a conceptual data flow diagram 3600 illustrating the data flow between different means/components in an exemplary apparatus 3602. The apparatus may be a UE, for example. The apparatus includes a receiver 3604 that receives signals, a controller 3606 that controls various functions of apparatus 3602, a response monitor 3608 that monitors for a response, and a transmitter 3610 that transmits signals. For example, UL/DL signals can be received from and transmitted to an apparatus 3650 via first and second beam pairs. Apparatus 3650 can be a base station, for example. Response monitor 3608 can, for example, monitor for a BSM from apparatus 3650 via a first beam set, the BSM including a command to switch from communication via the first beam set to communication via a second beam set at a switch time, and can monitor for a second communication from apparatus 3650 via the first beam set when the BSM is unreceived, the second communication via the first beam set being monitored at a second time subsequent to a first time in which a first communication is sent to apparatus 3602 via the second beam set.

The apparatus may include additional components that perform each of the blocks of the algorithm in the aforementioned flowchart of FIG. 25. As such, each block in the aforementioned flowchart of FIG. 25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 37:
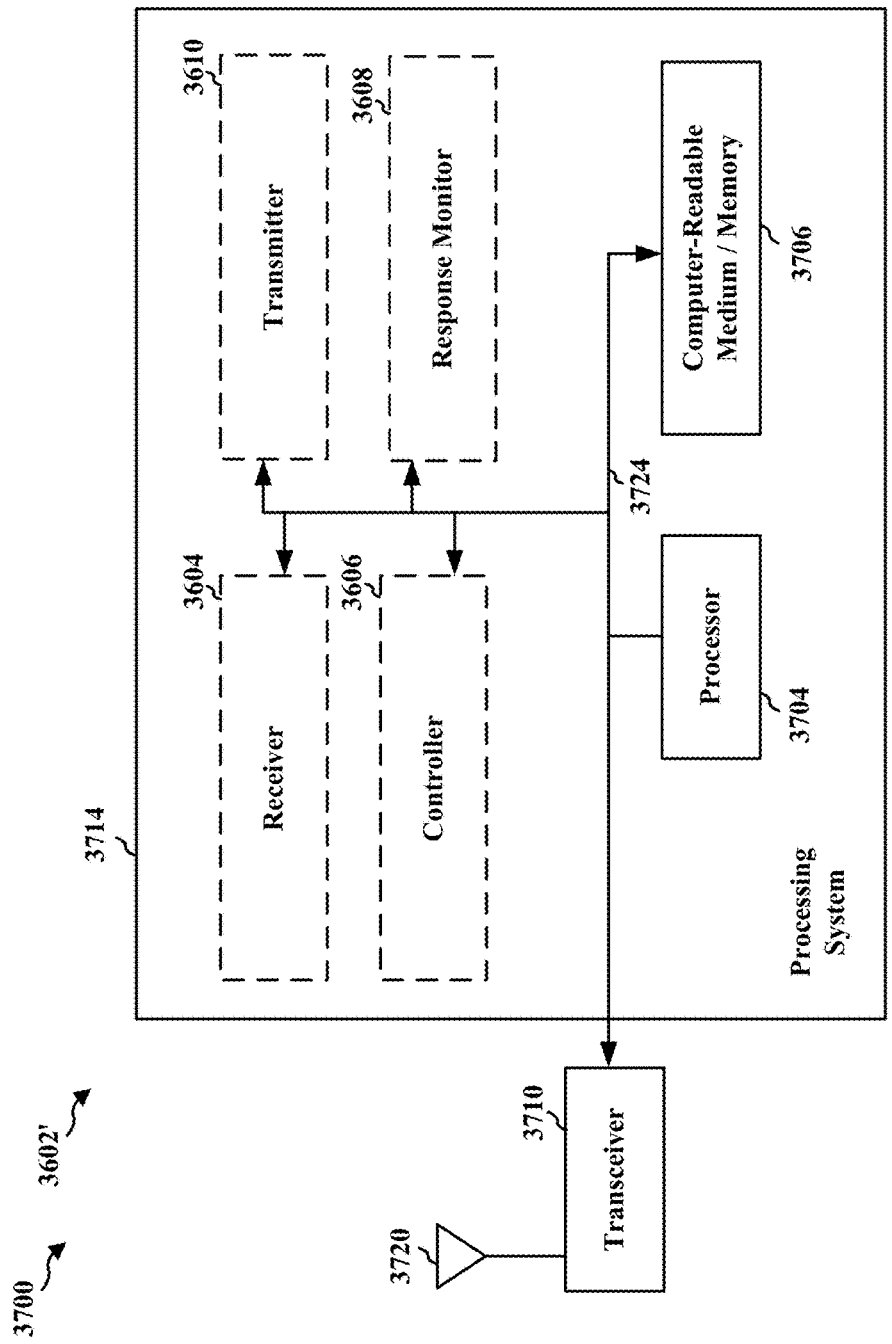
FIG. 37 is a diagram illustrating an example of a hardware implementation for an apparatus employing a processing system.

FIG. 37 is a diagram 3700 illustrating an example of a hardware implementation for an apparatus 3602' employing a processing system 3714. The processing system 3714 may be implemented with a bus architecture, represented generally by the bus 3724. The bus 3724 may include any number of interconnecting buses and bridges depending on the specific application of the processing system 3714 and the overall design constraints. The bus 3724 links together various circuits including one or more processors and/or hardware components, represented by the processor 3704, the components 3604, 3606, 3608, 3610, and the computer-readable medium/memory 3706. The bus 3724 may also link various other circuits such as timing sources, peripherals, voltage regulators, and power management circuits, which are well known in the art, and therefore, will not be described any further.

The processing system 3714 may be coupled to a transceiver 3710. The transceiver 3710 is coupled to one or more antennas 3720. The transceiver 3710 provides a means for communicating with various other apparatus over a transmission medium. The transceiver 3710 receives a signal from the one or more antennas 3720, extracts information from the received signal, and provides the extracted information to the processing system 3714, specifically the receiver 3604. In addition, the transceiver 3710 receives information from the processing system 3714, specifically the transmitter 3610, and based on the received information, generates a signal to be applied to the one or more antennas 3720. The processing system 3714 includes a processor 3704 coupled to a computer-readable medium/memory 3706. The processor 3704 is responsible for general processing, including the execution of software stored on the computer-readable medium/memory 3706. The software, when executed by the processor 3704, causes the processing system 3714 to perform the various functions described supra for any particular apparatus. The computer-readable medium/memory 3706 may also be used for storing data that is manipulated by the processor 3704 when executing software. The processing system 3714 further includes at least one of the components 3604, 3606, 3608, 3610. The components may be software components running in the processor 3704, resident/stored in the computer readable medium/memory 3706, one or more hardware components coupled to the processor 3704, or some combination thereof. The processing system 3714 may be a component of the UE 350 and may include the memory 360 and/or at least one of the TX processor 368, the RX processor 356, In one configuration, the apparatus 3602/3602' for wireless communication includes means for monitoring for a BSM from a second device via a first beam set, the BSM including a command to switch from communication via the first beam set to communication via a second beam set at a switch time, means for sending a response message to the second device when the BSM is received, and monitoring for a second communication from the second device via the first beam set when the BSM is unreceived, the second communication via the first beam set being monitored at a second time subsequent to a first time in which a first communication is sent to the first device via the second beam set. The aforementioned means may be one or more of the aforementioned components of the apparatus 3602 and/or the processing system 3714 of the apparatus 3602' configured to perform the functions recited by the aforementioned means. As described supra, the processing system 3714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a first device, comprising:
   transmitting a beam switch message (BSM) to a second device via a first beam set, the BSM including a command to switch from communication via the first beam set to communication via a second beam set at a switch time;
   determining that a response message is unreceived from the second device via the first beam set, the response message indicating that the second device received the BSM; and
   sending, to the second device, a communication via the second beam set after the switch time when the response message is unreceived.

2. The method of claim 1, wherein the communication is at least one of data, control information, or reference signals.

3. The method of claim 1, further comprising:
   determining whether a second response message is received from the second device in response to the communication; and
   maintaining the second beam set for communication with the second device upon determining that the second response message is received.

4. The method of claim 3, further comprising:
   sending, to the second device, a second communication via the first beam set upon determining that the second response message is unreceived; and
   determining whether a third response message is received from the second device via the first beam set, the third response message indicating that the second device received the second communication.

5. The method of claim 1, wherein the response message comprises at least one of a reference signal strength indicator (RSSI), reference signal received power (RSRP), reference signal received quality (RSRQ), a signal to noise ratio (SNR), a signal to interference plus noise ratio (SINR), an acknowledgment (ACK), or a measurement report.

6. A method of wireless communication for a first device, comprising:
   monitoring for a beam switch message (BSM) from a second device via a first beam set, the BSM including a command to switch from communication via the first beam set to communication via a second beam set at a switch time;
   sending a response message to the second device when the BSM is received; and
   monitoring for a second communication via the first beam set from the second device when the BSM is unreceived, the second communication via the first beam set being monitored at a second time subsequent to a first time in which a first communication is sent to the first device via the second beam set.

7. The method of claim 6, wherein the first communication is at least one of data, control information, or reference signals, and the second communication is at least one of data, control information, or reference signals.

8. The method of claim 6, wherein the BSM from the second device is unreceived, and the method further comprises:
   receiving the second communication from the second device via the first beam set; and
   sending a second response message via the first beam set to the second device in response to receiving the second communication.

9. The method of claim 6, further comprising:
   receiving the BSM from the second device via the first beam set;
   switching to the second beam set from the first beam set;
   receiving the first communication from the first device via the second beam set; and
   sending a second response message to the second device in response to receiving the first communication.

10. The method of claim 6, wherein the response message comprises at least one of a reference signal strength indicator (RSSI), reference signal received power (RSRP), reference signal received quality (RSRQ), a signal to noise ratio (SNR), a signal to interference plus noise ratio (SINR), an acknowledgment (ACK), or a measurement report.

11. An apparatus for wireless communication, the apparatus being a first device, comprising:
a memory; and
at least one processor coupled to the memory and configured to:
transmit a beam switch message (BSM) to a second device via a first beam set, the BSM including a command to switch from communication via the first beam set to communication via a second beam set at a switch time;
determine that a response message is unreceived from the second device via the first beam set, the response message indicating that the second device received the BSM; and
send, to the second device, a communication via the second beam set after the switch time when the response message is unreceived.

12. The apparatus of claim 11, wherein the communication is at least one of data, control information, or reference signals.

13. The apparatus of claim 11, wherein the at least one processor is further configured to:
determine whether a second response message is received from the second device in response to the communication; and
maintain the second beam set for communication with the second device upon determining that the second response message is received.

14. The apparatus of claim 13, wherein the at least one processor is further configured to:
send, to the second device, a second communication via the first beam set upon determining that the second response message is unreceived; and
determine whether a third response message is received from the second device via the first beam set, the third response message indicating that the second device received the second communication.

15. The apparatus of claim 11, wherein the response message comprises at least one of a reference signal strength indicator (RSSI), reference signal received power (RSRP), reference signal received quality (RSRQ), a signal to noise ratio (SNR), a signal to interference plus noise ratio (SINR), an acknowledgment (ACK), or a measurement report.

16. An apparatus for wireless communication, the apparatus being a first device, comprising:
a memory; and
at least one processor coupled to the memory and configured to:
monitor for a beam switch message (BSM) from a second device via a first beam set, the BSM including a command to switch from communication via the first beam set to communication via a second beam set at a switch time;
send a response message to the second device when the BSM is received; and
monitor for a second communication via the first beam set from the second device when the BSM is unreceived, the second communication via the first beam set being monitored at a second time subsequent to a first time in which a first communication is sent to the first device via the second beam set.

17. The apparatus of claim 16, wherein the first communication is at least one of data, control information, or reference signals, and the second communication is at least one of data, control information, or reference signals.

18. The apparatus of claim 16, wherein the BSM from the second device is unreceived, and the at least one processor is further configured to:
receive the second communication from the second device via the first beam set; and
send a second response message via the first beam set to the second device in response to receiving the second communication.

19. The apparatus of claim 16, wherein the at least one processor is further configured to:
receive the BSM from the second device via the first beam set;
switch to the second beam set from the first beam set;
receive the first communication from the first device via the second beam set; and
send a second response message to the second device in response to receiving the first communication.

20. The apparatus of claim 16, wherein the response message comprises at least one of a reference signal strength indicator (RSSI), reference signal received power (RSRP), reference signal received quality (RSRQ), a signal to noise ratio (SNR), a signal to interference plus noise ratio (SINR), an acknowledgment (ACK), or a measurement report.

* * * * *